(12) United States Patent
Navarro et al.

(10) Patent No.: US 11,084,428 B2
(45) Date of Patent: Aug. 10, 2021

(54) CARGO STORAGE SYSTEM FOR A VEHICLE

(71) Applicant: Pro-gard Products, LLC, Noblesville, IN (US)

(72) Inventors: Mike Navarro, Noblesville, IN (US); John Eichhorn, Indianapolis, IN (US)

(73) Assignee: Pro-gard Products, LLC, Noblesville, IN (US)

( * ) Notice: Subject to any disclaimer, the term of this patent is extended or adjusted under 35 U.S.C. 154(b) by 276 days.

(21) Appl. No.: 16/174,783

(22) Filed: Oct. 30, 2018

(65) Prior Publication Data

US 2019/0126836 A1 May 2, 2019

Related U.S. Application Data

(60) Provisional application No. 62/579,122, filed on Oct. 30, 2017.

(51) Int. Cl.
*B60R 5/00* (2006.01)
*B60R 5/04* (2006.01)

(52) U.S. Cl.
CPC .............. *B60R 5/003* (2013.01); *B60R 5/045* (2013.01)

(58) Field of Classification Search
CPC ........... B60R 5/04; B60R 5/045; B60R 5/044; B60R 11/00; B60R 7/02; B60R 21/026; B60R 7/04; B60R 7/08; B60R 11/06
USPC ..... 296/24.44, 37.16, 24.43, 107.08, 76, 69, 296/65.05; 108/44, 109, 110, 137, 149; 211/149, 153, 134, 191, 90.01
See application file for complete search history.

(56) References Cited

U.S. PATENT DOCUMENTS

| 6,406,085 | B1 * | 6/2002 | Stanesic ................. B60R 5/045 296/39.1 |
| 6,568,732 | B2 | 5/2003 | De Gaillard |
| 7,090,274 | B1 | 8/2006 | Khan et al. |
| 7,318,617 | B1 | 1/2008 | Scotton |
| 7,762,602 | B2 | 7/2010 | Bohlke et al. |
| 7,794,004 | B2 * | 9/2010 | Aebker ...................... B60R 5/04 296/37.8 |
| 7,806,453 | B2 | 10/2010 | Aebker |
| 9,073,499 | B1 | 7/2015 | Erickson |
| 9,676,339 | B2 | 6/2017 | Huebner et al. |
| 2002/0000734 | A1 * | 1/2002 | Bharj ...................... B60R 5/044 296/37.16 |
| 2004/0262345 | A1 * | 12/2004 | Polburn .................. B60R 7/005 224/275 |
| 2005/0116486 | A1 * | 6/2005 | Walter .................... B60R 21/06 296/24.43 |

(Continued)

OTHER PUBLICATIONS

Shelf for a Police Vehicle, San Diego Police Department, available at least as early as Apr. 2017, 4 pages.

*Primary Examiner* — D Glenn Dayoan
*Assistant Examiner* — Sunsurraye Westbrook
(74) *Attorney, Agent, or Firm* — Faegre Drinker Biddle & Reath LLP

(57) ABSTRACT

A cargo storage system for a vehicle configured to be installed in the rear storage area of the vehicle. The illustrative cargo storage system includes a plurality of upright support brackets and a cargo shelf. The cargo shelf illustratively includes at least one reinforcing rib for strengthening the cargo shelf. The cargo shelf may also include an adjustable sliding panel configured to move relative to the cargo shelf.

29 Claims, 35 Drawing Sheets

(56) References Cited

U.S. PATENT DOCUMENTS

| | | | |
|---|---|---|---|
| 2006/0113812 A1* | 6/2006 | Queveau | ............... B60J 7/203 296/24.43 |
| 2011/0101736 A1* | 5/2011 | Sogame | ............ B62D 25/087 296/203.04 |
| 2015/0283949 A1* | 10/2015 | V | .................... B60R 13/0268 296/24.43 |

* cited by examiner

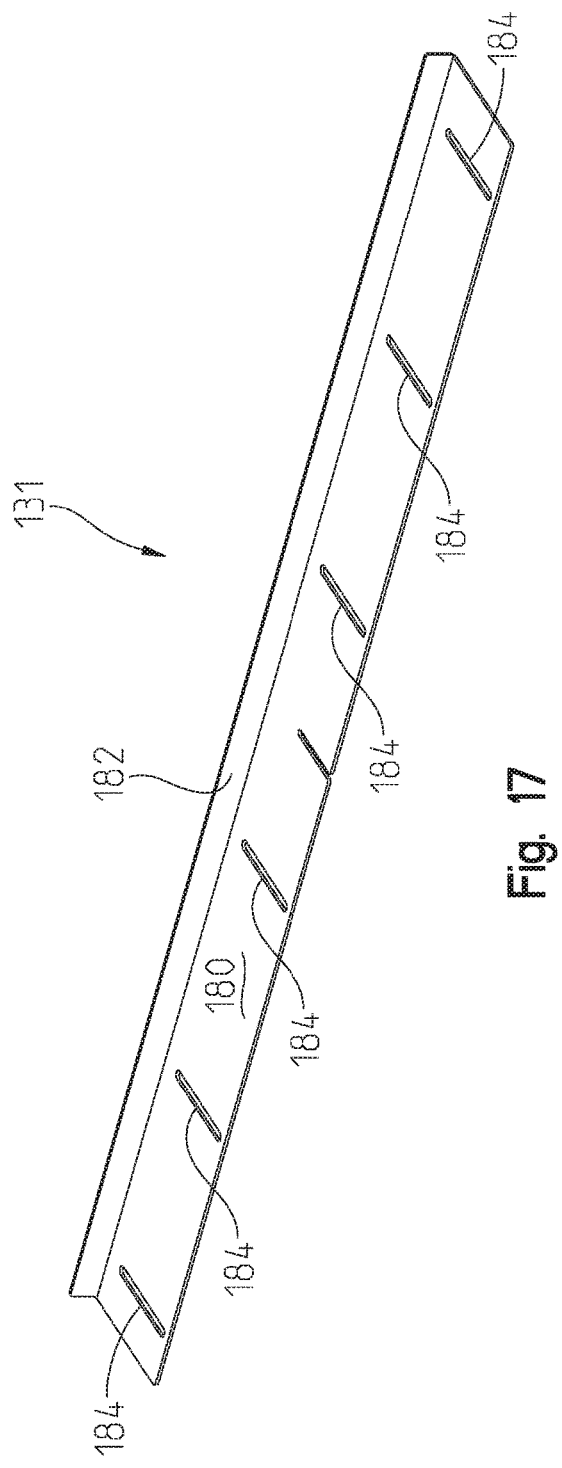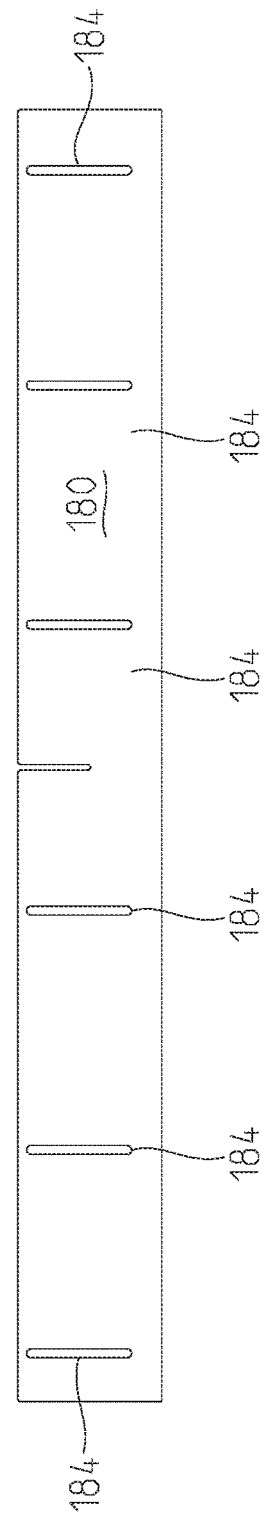
Fig. 17
Fig. 18

CARGO STORAGE SYSTEM FOR A VEHICLE

CROSS-REFERENCE TO RELATED APPLICATION

The present application claims priority to U.S. Provisional Patent Application Ser. No. 62/579,122, filed Oct. 30, 2017, the disclosure of which is expressly incorporated herein by reference.

BACKGROUND AND SUMMARY OF THE DISCLOSURE

The present disclosure relates generally to a cargo storage system for a vehicle and, more particularly, to a cargo storage system configured to be installed in a rear storage area of the vehicle.

According to an illustrative embodiment of the present disclosure, a cargo storage system for a vehicle including a rear storage area includes a cargo shelf comprising an upper surface, a lower surface opposite the upper surface, and a perimeter having a contoured shape. The perimeter illustratively further includes at least one relief configured to receive at least a portion of a cargo securing member. In another illustrative embodiment, the cargo storage system further includes a plurality of upright support brackets removably coupled to and extending outwardly from the cargo shelf. In an illustrative embodiment, at least one end of the plurality of upright support brackets is configured to removably couple to the vehicle. In another illustrative embodiment, the cargo storage system further includes a rear cross bracket removably coupled to a rear portion of the lower surface of the cargo shelf.

According to a further illustrative embodiment of the present disclosure, a cargo storage system for a vehicle including a rear storage area includes a cargo shelf comprising an upper surface, a lower surface opposite the upper surface, and a perimeter. In another illustrative embodiment, the cargo storage system further includes a plurality of upright support brackets removably coupled to the lower surface of the cargo shelf. In a further illustrative embodiment, the cargo storage system also includes a shelf extender coupled to a front portion of the cargo shelf. The shelf extender is configured to be movable from a retracted position to an extended position relative to the cargo shelf.

According to a further illustrative embodiment of the present disclosure, a cargo storage system for a vehicle including a rear seating area adjacent a rear storage area includes a cargo barrier positioned intermediate the rear seating area and the rear storage area. The cargo barrier is configured to at least partially physically separate at least a portion of the rear seating area and the rear storage area. The cargo barrier illustratively includes a first surface facing the rear seating area and a second surface of the cargo barrier facing the rear storage area. In another illustrative embodiment, the cargo storage system further includes a cargo shelf removably coupled to the second surface of the cargo barrier. The cargo shelf comprises an upper surface and a lower surface opposite the upper surface. In a further illustrative embodiment, the cargo storage system also includes a plurality of upright support brackets removably coupled to a lower surface of the cargo shelf. In another illustrative embodiment, the cargo storage system further includes a rear cross bracket removably coupled to a rear portion of the cargo shelf.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The detailed description of the drawings particularly refers to the accompanying figures in which:

FIG. 17 is a perspective view of an illustrative shelf extender of the cargo storage system of FIG. 15;

FIG. 18 is a top view of the illustrative shelf extender of FIG. 17;

DETAILED DESCRIPTION OF THE DRAWINGS

The embodiments of the invention described herein are not intended to be exhaustive or to limit the invention to the precise forms disclosed. Rather, the embodiments elected for description have been chosen to enable one skilled in the art to practice the invention.

Figure 1:
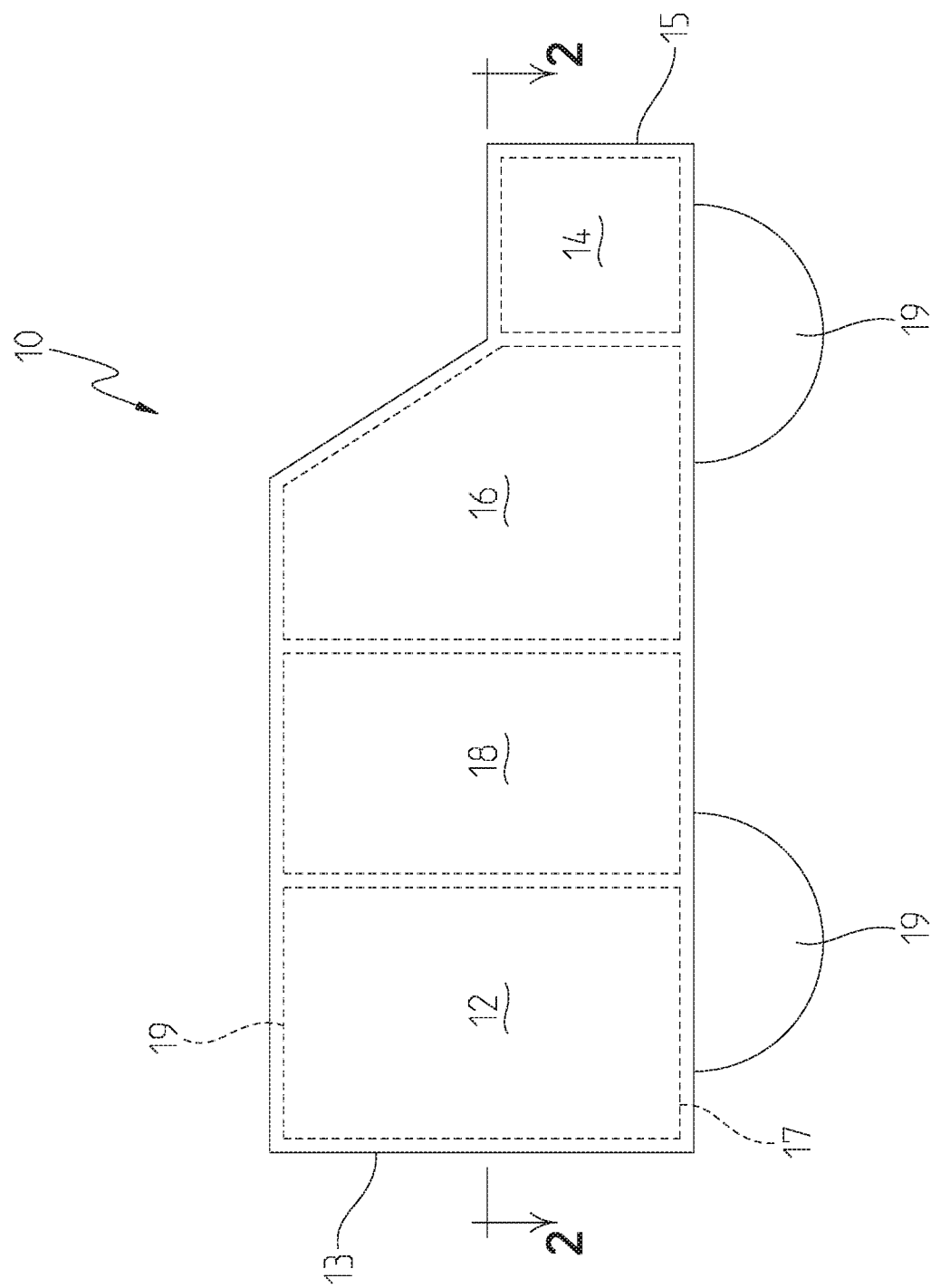
FIG. 1 is a diagrammatic view of an illustrative vehicle having a rear storage area, illustrating in phantom the engine compartment, front seating area, rear seating area, and the rear storage area of the vehicle.
Figure 2:
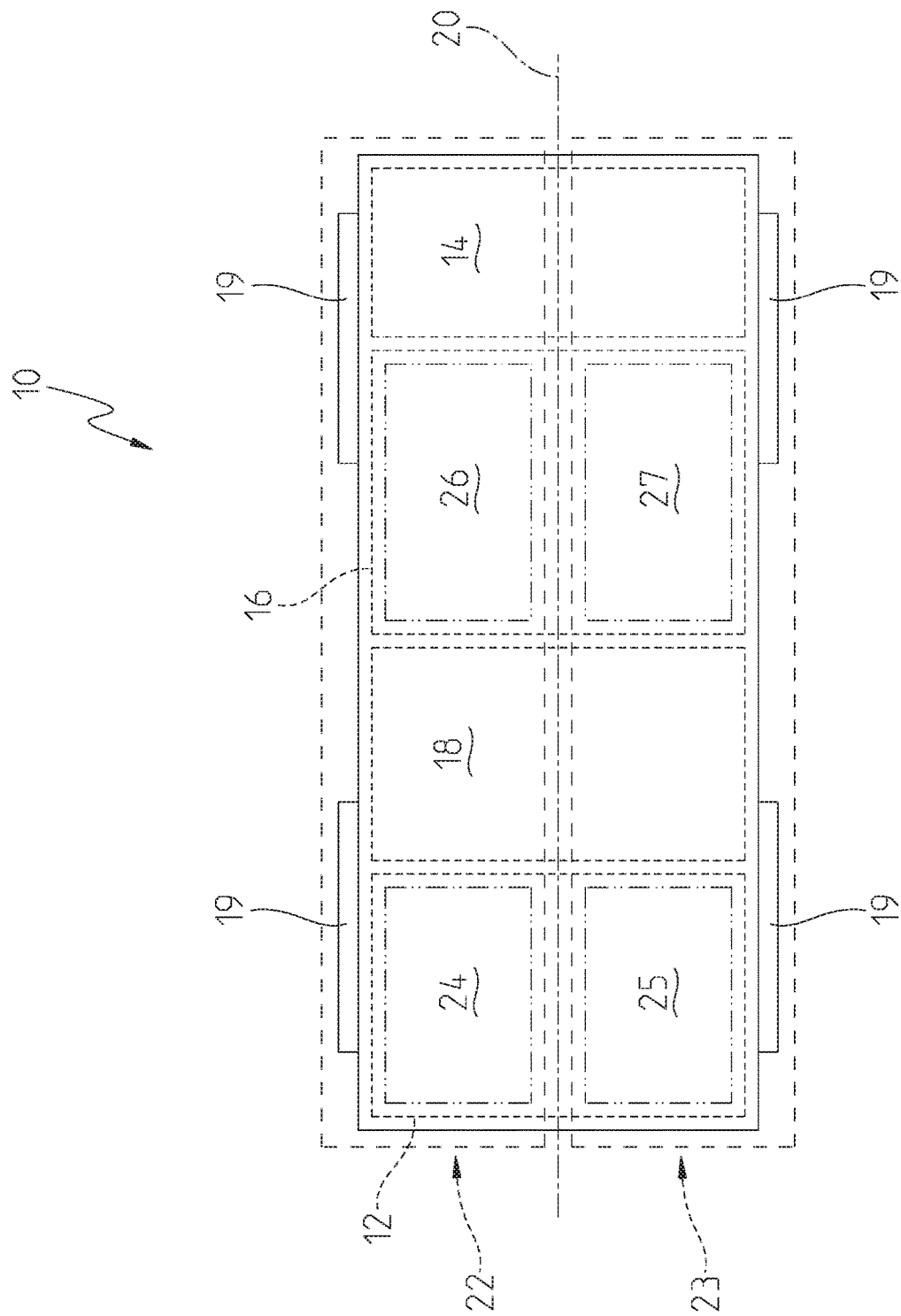
FIG. 2 is a top view of the illustrative vehicle of FIG. 1, taken along section line 2-2 of FIG. 1, further illustrating in phantom the driver side and passenger side of the vehicle.

Referring initially to FIG. 1, an illustrative vehicle 10 having a rear storage area 12 is shown. The illustrative vehicle 10 comprises an engine compartment 14, a front seating area 16, a rear seating area 18, and a rear storage area 12. The engine compartment 14 is located at a front 15 of the vehicle 10 and the rear storage area 12 is located at a rear 13 of the vehicle 10. The front seating area 16 and the rear seating area 18 are illustratively intermediate the engine compartment 14 and the rear storage area 12, with the front seating area 16 adjacent the engine compartment 14. Referring to FIG. 2, the illustrative vehicle 10 comprises a longitudinal axis 20. The longitudinal axis 20 conceptually divides the vehicle 10 into a driver side 22 and a passenger side 23 opposite the driver side 22. For example, the front seating area 16 comprises a driver side front seating area 26 and a passenger side front seating area 27. And to that end, the rear storage area 12 illustratively comprises a driver side rear storage area 24 and a passenger side rear storage area 25 opposite the driver side rear storage area 24. In another illustrative embodiment, vehicle 10 further includes a rear hatch 21 supported at the rear 13 of the vehicle 10, as shown in FIG. 3.

Figure 3:
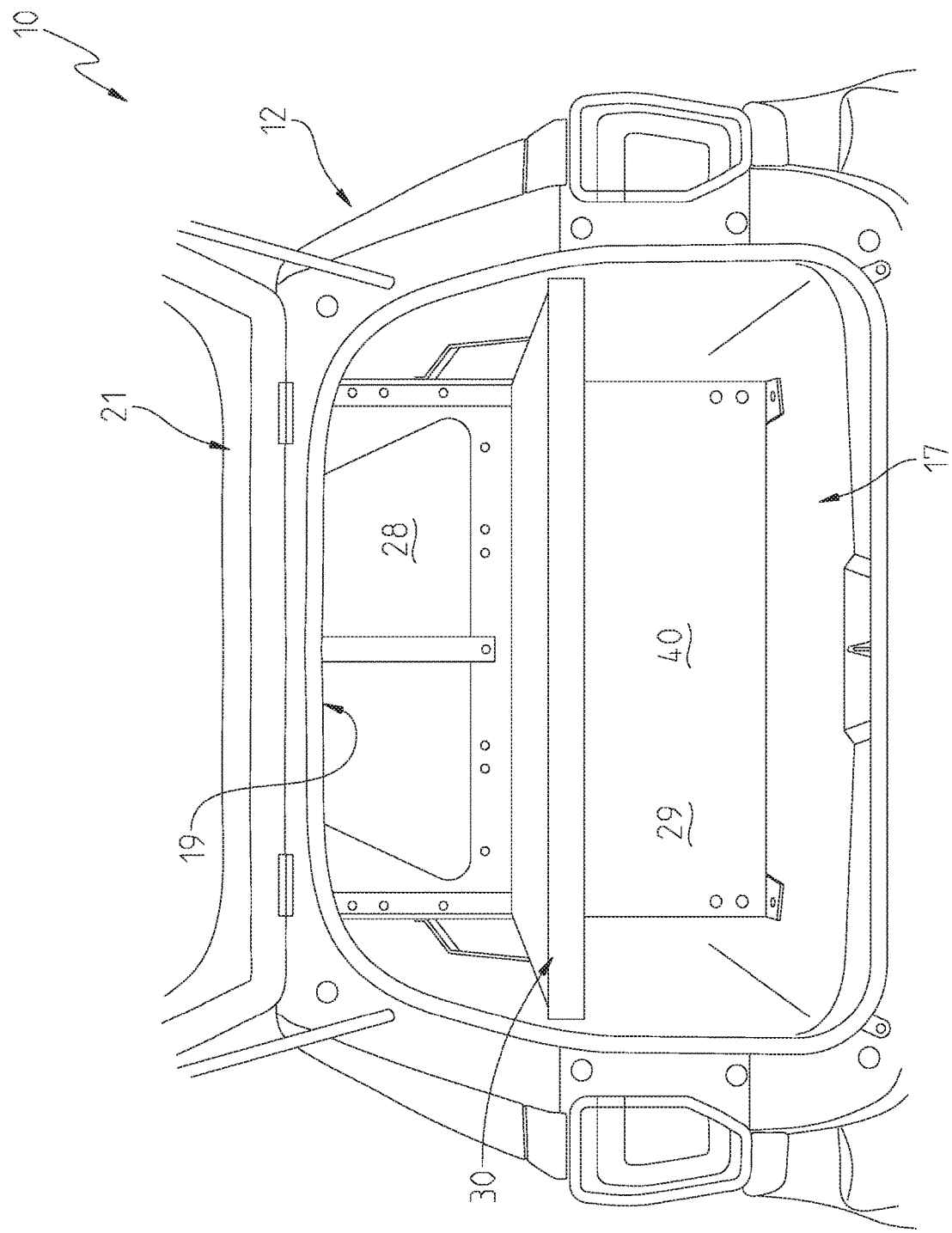
FIG. 3 is rear view of an illustrative cargo storage system of the present disclosure installed within a rear storage area of a vehicle.
Figure 4:
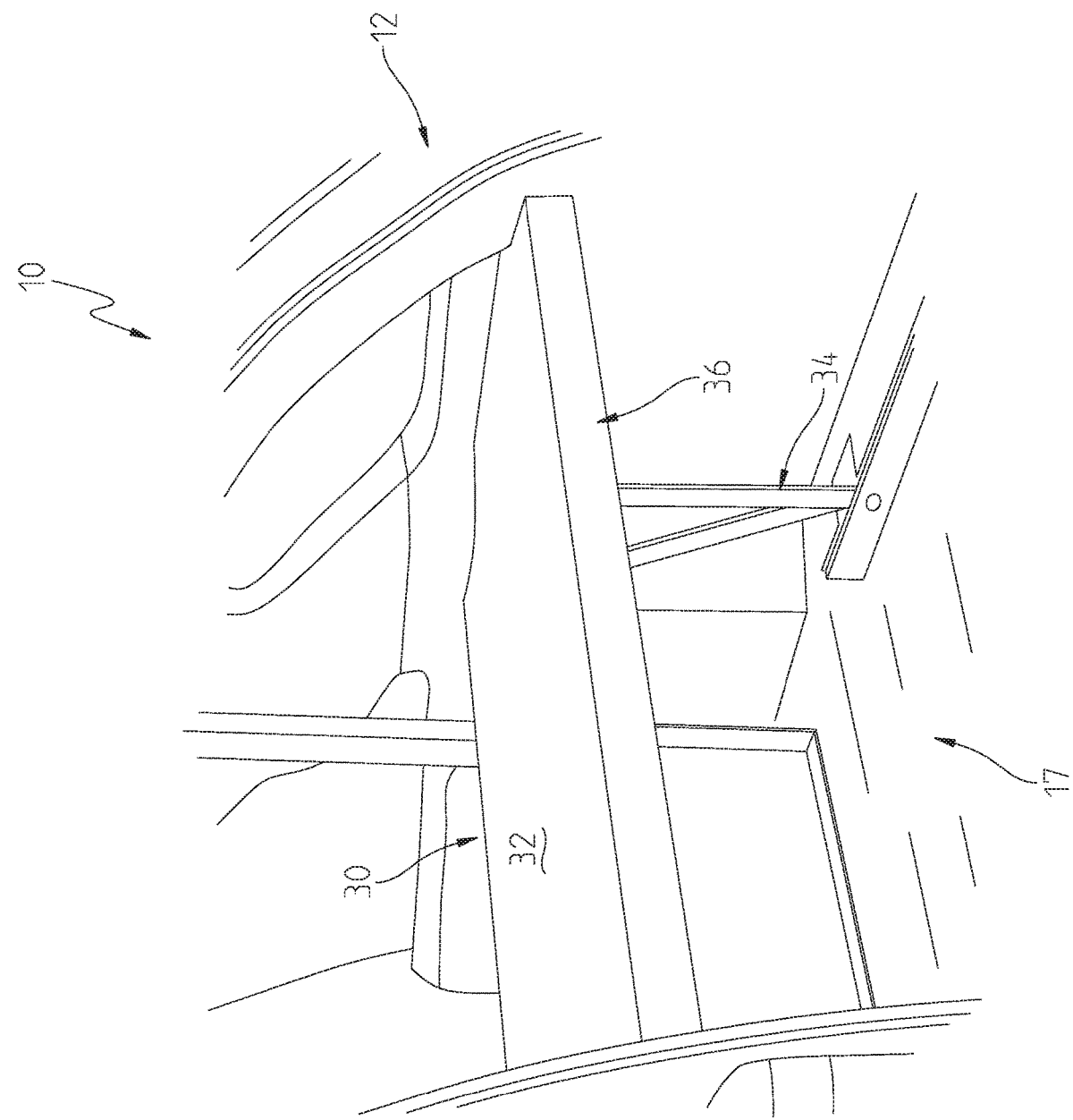
FIG. 4 is a perspective view of the illustrative cargo storage system of FIG. 3.

Referring now to FIGS. 3 and 4, an illustrative cargo storage system 30 is shown positioned within the rear storage area 12. The cargo storage system 30 illustratively includes a cargo shelf 32 spatially positioned intermediate a floor 17 and a ceiling 19 of the vehicle 10. The illustrative cargo storage system 30 further includes a plurality of upright support brackets 34 removably coupled to and extending downwardly from the cargo shelf 32. The cargo storage system 30 illustratively includes a rear cross bracket 36 removably coupled to the cargo shelf 32. If the vehicle 10 includes a cargo barrier 40 (or other partition) separating the rear storage area 12 from the rear seating area 18, the cargo storage system 30 is positioned rearward of the of the cargo barrier 40. Moreover, the plurality of upright support brackets 34 may be tailored to mount within different vehicle types and models. In one illustrative embodiment, cargo storage system 30 is tailored for a 2016 model Ford Utility Interceptor vehicle.

In the illustrative embodiment shown in FIG. 3, the cargo storage system 30 at least partially spatially delineates an upper and lower storage compartments 28, 29 of the rear storage area 12. That is, the lower storage compartment 29 is illustratively positioned intermediate the cargo shelf 32 and the floor 17 of the vehicle 10, while the upper storage compartment 28 is positioned intermediate the cargo shelf 32 and the ceiling of the vehicle 10. In this way, at least a portion of the upper storage compartment 28 is at least partially physically separated from at least a portion of the lower storage compartment 29 by at least a portion of the cargo shelf 32. Thus, the cargo storage system 30 permits a user to safely and securely store various items out-of-sight in the lower storage compartment 29. Moreover, the cargo shelf 32 and the rear hatch 21 secure the lower storage compartment 29 when the rear hatch 21 is closed in a locked position.

In addition, the cargo shelf 32 permits the user to store various additional items in the upper storage compartment 28. Moreover, the cargo shelf 32 permits the user to store or removably couple accessories or electronics in either of the upper or lower storage compartments 28, 29. In another illustrative embodiment, a user may secure equipment above or below cargo shelf 32 such as, for example, radios, firearm mounts, stop sticks, or first aid kits. In another illustrative embodiment, a user may customize cargo shelf 32 to support various accessories by drilling additional holes in the cargo shelf 32.

Figure 5:
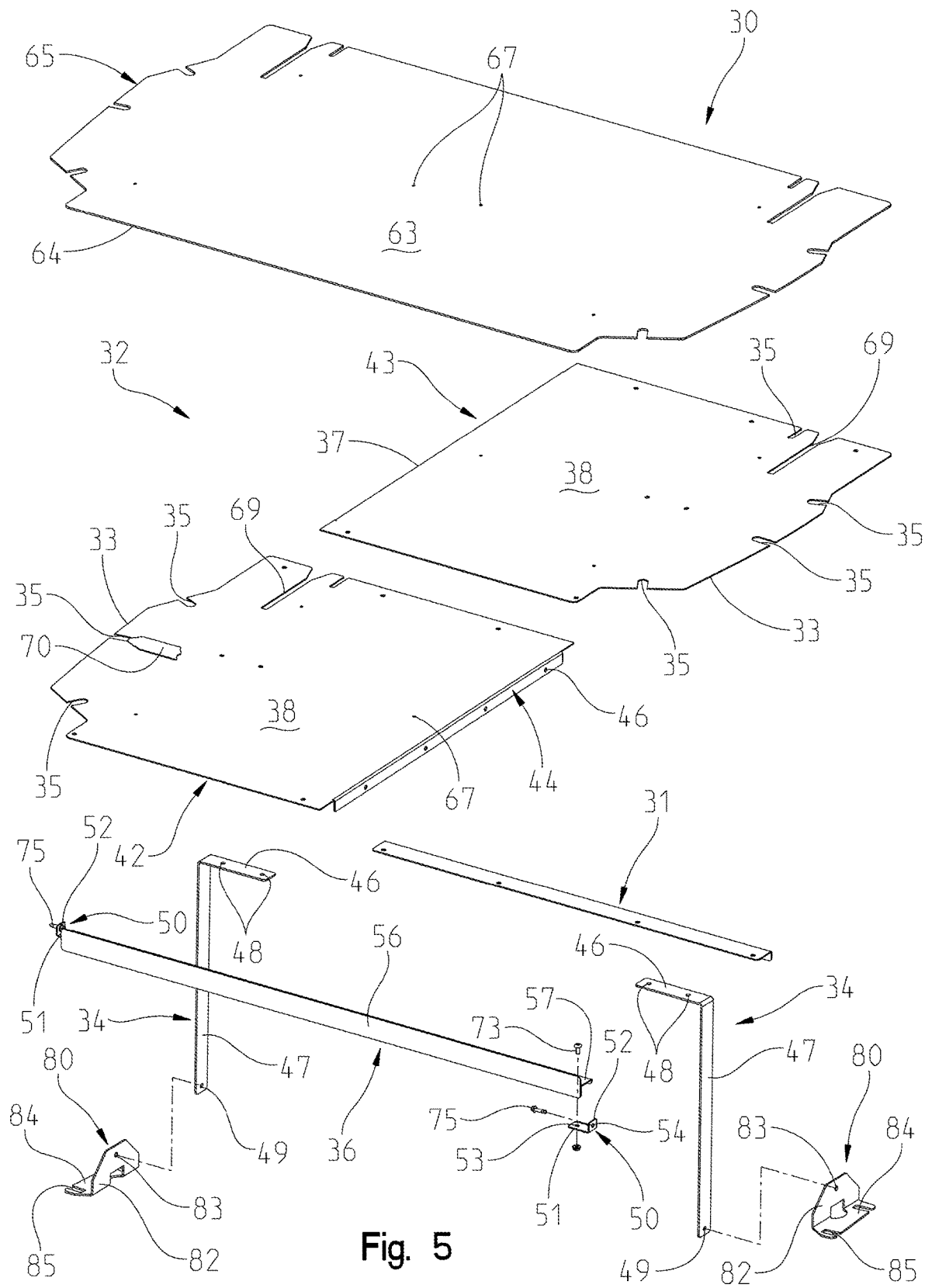
FIG. 5 is an exploded perspective view of the illustrative cargo storage system of FIG. 3.

Referring to the illustrative embodiment shown in FIG. 5, the cargo shelf 32 comprises an upper surface 38 and a lower surface 39 (see FIG. 14) opposite the upper surface 38. The upper and lower surfaces 38, 39 illustratively comprise substantially parallel surfaces. In another illustrative embodiment, the cargo shelf 32 comprises a rigid material, such as, for example, steel. In addition, the cargo shelf 32 includes a contoured perimeter 33 defined by a boundary edge of the cargo shelf 32, as illustrated in FIG. 5. The contoured perimeter 33 of the cargo shelf 32 is illustratively configured to at least partially track a contoured interior surface of the rear storage area 12. In this way, the cargo shelf 32 at least appears to be partially form-fitting to the contoured interior surface of the rear storage area 12. Further, the contoured perimeter 33 permits the cargo shelf 32 to fit around interior trim on vehicle frames and extend into window wells, as illustrated in FIG. 4.

Additionally, the contoured perimeter 33 of the cargo shelf 32 is illustratively further configured to receive at least a portion of a cargo securing member (such as cargo securing member 70 of FIG. 5). In the illustrative embodiment shown in FIG. 5, the contoured perimeter 33 includes at least one relief 35 therein. As shown in the illustrative embodiment of FIG. 5, the at least one relief 35 includes a generally oblong shape. The cargo securing member illustratively includes a variety of implements used to temporarily secure cargo or other accessories. For example, the cargo securing member may comprise a rope, cord, strap, chain, bungee cord, or other suitable tie-down.

Many cargo securing members include a hook or other curvilinear structure at each end for anchoring the cargo securing member. Because the contoured perimeter 33 of the cargo shelf 32 at least partially tracks the contoured interior surface of the rear storage area 12, sufficient space between the contoured perimeter 33 and the interior surface of the rear storage area 12 may not exist in which to anchor the cargo securing member to the contoured perimeter 33 of the cargo shelf 32. Therefore, the at least one relief 35 provides a location for a user to anchor at least one end of the cargo securing member before securing cargo to either the upper or lower surfaces 38, 39 of the cargo shelf 32.

In the illustrative embodiment shown in FIG. 5, the cargo shelf 32 further includes a driver side cargo panel 42 and a passenger side cargo panel 43. The driver side cargo panel 42 is positioned on the driver side 22 of the vehicle 10. Conversely, the passenger side cargo panel 43 is positioned on the passenger side 23 of the vehicle 10. The passenger side cargo panel 43 removably couples to the driver side cargo panel 42 along a lateral seam 37 of the cargo shelf 32. The lateral seam 37 is proximate the longitudinal axis 20 of the vehicle 10. In the illustrative embodiment shown in FIG. 5, the lateral seam 37 of the cargo shelf 32 is coaxial to the longitudinal axis 20 of the vehicle 10. In addition, the driver side and passenger side cargo panels 42, 43 are illustratively asymmetrical about the lateral seam 37.

The passenger side cargo panel 43 removably couples to the driver side cargo panel 42, as illustrated in FIG. 5. More specifically, each of the driver side and passenger side cargo panels 42, 43 illustratively includes a strengthening rib or lip 44, 45 (see FIG. 14) along an edge adjacent the lateral seam 37 of the cargo shelf 32. Illustratively, the strengthening ribs 44, 45 extend generally downwardly and orthogonally from their respective cargo panels 42, 43. In this way, the strengthening ribs 44, 45 form a mating surface that abuts the other when the cargo shelf 32 is installed. In the illustrative embodiment shown in FIG. 5, each strengthening rib 44, 45 includes at least one aperture 46 configured to receive a fastener 71 (see FIG. 14).

The illustrative two-piece construction of the cargo shelf 32 shown in FIG. 5 permits a user to install the cargo shelf 32 one panel at a time. This installation method increases the ease of installation. Moreover, the two-piece construction permits the contoured perimeter 33 to more closely track an interior surface of the rear storage area 12, as opposed to a single-piece shelf. That is, the cargo shelf 32 presents an impression that the contoured perimeter 33 is scribed to the contoured interior surface of the rear storage area 12. Although the illustrative embodiment shown in FIG. 5 comprises a cargo shelf 32 including two cargo panels 42 and 43, a cargo shelf comprising more or fewer than two cargo panels is contemplated.

In the illustrative embodiment shown in FIG. 5, the plurality of upright support brackets 34 are removably coupled to and extend outwardly from the lower surface 39 of the cargo shelf 32. In addition, at least one end of the plurality of upright support brackets 34 is configured to removably couple to a portion of the vehicle 10. The plurality of upright support brackets 34 illustratively couple to the vehicle 10 using existing mounting points. In this way, the plurality of upright support brackets 34 may be easily and securely fastened to the vehicle 10. Moreover, while the embodiment shown in FIGS. 3-5 removably couples to the vehicle 10 using threaded fasteners such as bolts or screws, the plurality of upright support brackets 34 may be attached to vehicle 10 using a variety of securing methods known in the art.

Figure 6:
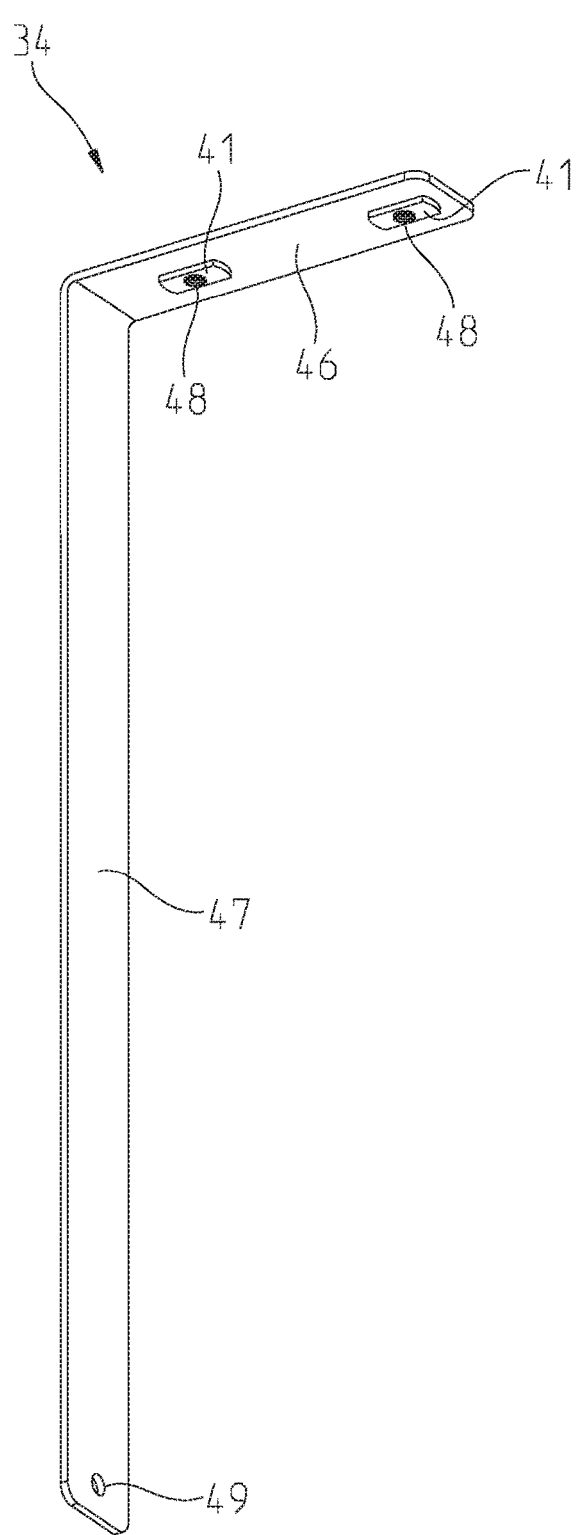
FIG. 6 is a perspective view of an illustrative upright support bracket of the cargo storage system of FIG. 5.
Figure 7:
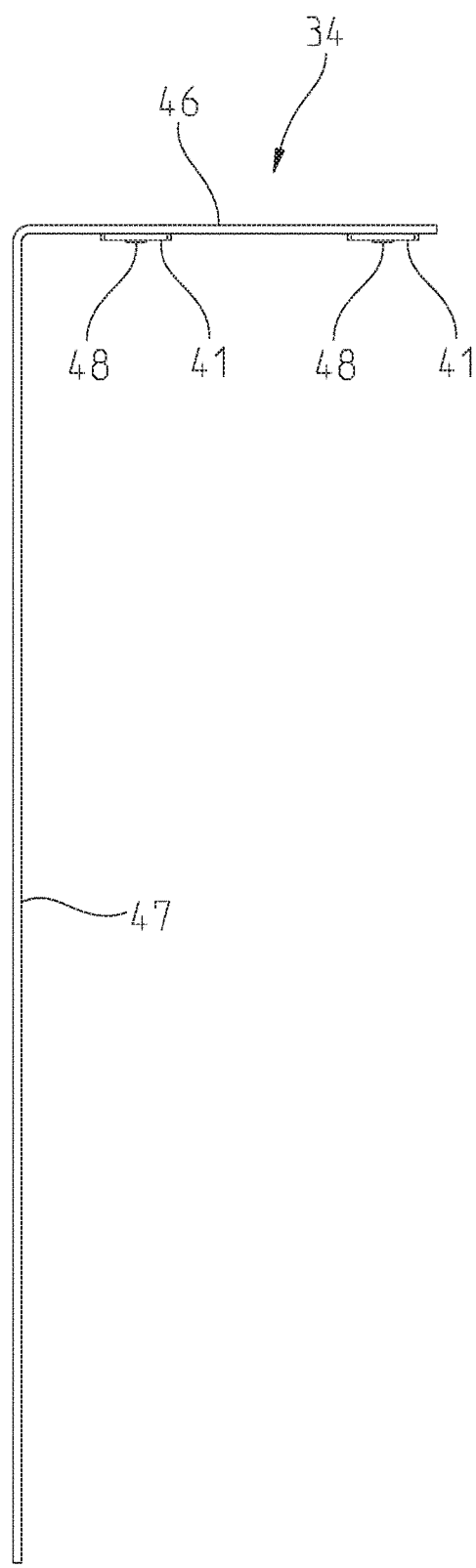
FIG. 7 is a side view of the illustrative upright support bracket of FIG. 6.

Referring to the illustrative embodiment shown in FIG. 5, the plurality of upright support brackets 34 includes two upright support brackets. The upright support brackets 34 shown in FIGS. 6 and 7 illustratively comprise a generally L-shaped profile. That is, each of the upright support brackets 34 comprise a short leg 46 integrally formed with a long leg 47. In the illustrative embodiment of FIG. 7, the short leg 46 is generally orthogonal to the long leg 47. Additionally, the short leg 46 illustratively further includes at least one aperture 48 configured to receive a fastener. The long leg 47 illustratively extends generally downwardly from the lower surface 39 of the cargo shelf 32 and includes at least one aperture 49 configured to receive a fastener opposite the short leg 46. The at least one aperture 49 of the long leg 47 receives a fastener for securely mounting the upright support bracket 34 to the vehicle 10.

In the exemplary embodiment shown in FIG. 5, the cargo storage system 30 illustratively further includes two rear mounting brackets 80. The rear mounting brackets 80 removably couple to the existing mounting points within the vehicle 10. The rear mounting brackets 80 illustratively include an upper mounting flange 82 and a lower mounting flange 84 integrally formed therewith. As shown in FIG. 5, the lower mounting flange 84 includes at least one aperture 85 for removably coupling the lower mounting flange 84 to the existing mounting points within the vehicle 10. Additionally, the upper mounting flange 82 illustratively includes at least one aperture 83 configured to receive a fastener for removably coupling one of the upright support brackets 34 thereto. In this way, a user may securely fasten the upright support brackets 34 to the rear mounting brackets 80, which are securely fastened to the existing mounting points with the vehicle 10. In the illustrative embodiment shown in FIG. 5, the upright support brackets 34 are securely fastened to the upper mounting flange 82 and the lower mounting flange 84 are securely fastened to the existing mounting points within the vehicle 10.

Figure 8:
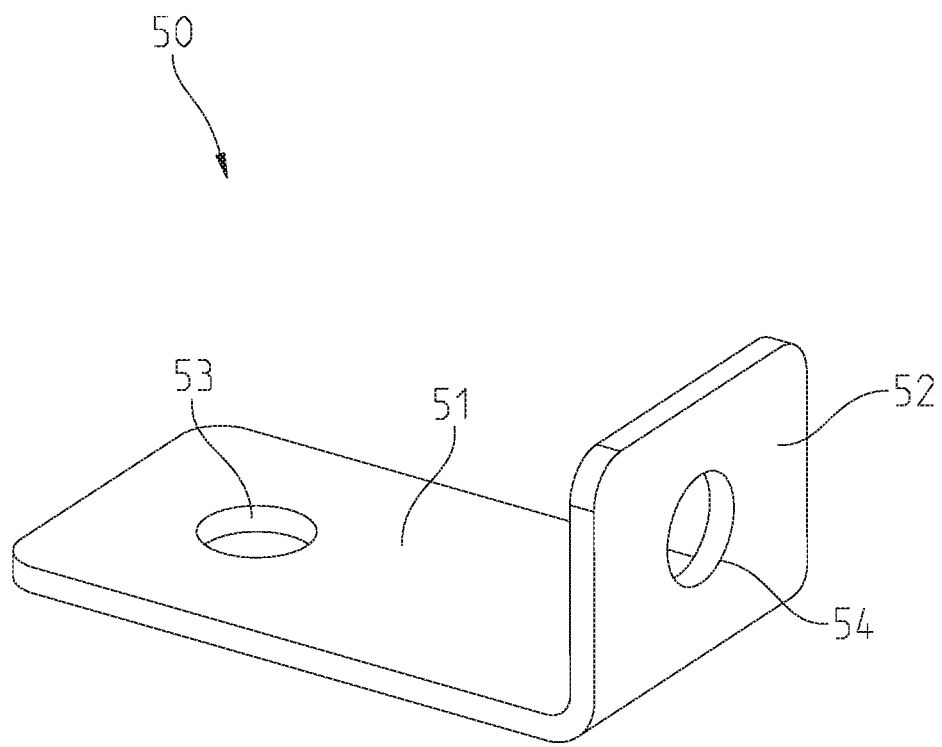
FIG. 8 is a side elevational view of an illustrative shelf support bracket of the cargo storage system of FIG. 5.

In the illustrative embodiment shown in FIG. 8, the cargo storage system 30 illustratively further includes at least one shelf support bracket 50 removably coupled to at least one of the rear cross bracket 36 and the cargo shelf 32. The shelf support bracket 50 illustratively includes a generally L-shaped profile comprising a long leg 51 and a short leg 52 integrally formed therewith. In the illustrative embodiment shown in FIG. 8, the long leg 51 of the shelf support bracket 50 includes at least one aperture 53 configured to receive a fastener 73 for securing the shelf support bracket 50 to at least one of the rear cross bracket 36 and the cargo shelf 32. Further, the short leg 52 of the shelf support bracket 50 includes at least one aperture 54 configured to receive a fastener 75 for securely mounting the shelf support bracket 50 to an existing mounting point within the vehicle 10. The shelf support bracket 50 securely links a rear portion of the lower surface 39 of the cargo shelf 32 to the vehicle 10.

Figure 9:
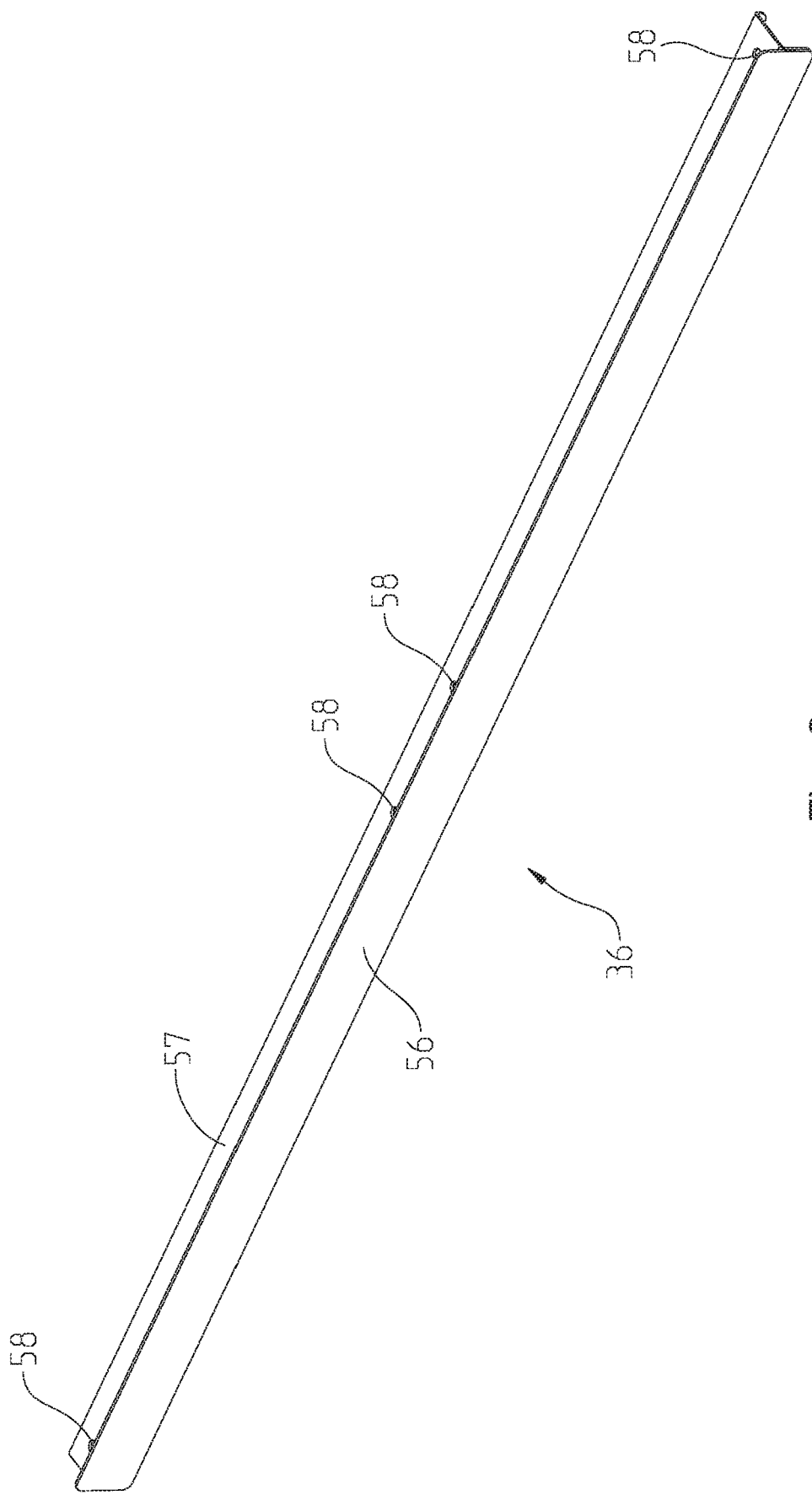
FIG. 9 is a perspective view of an illustrative rear cross bracket of the cargo storage system of FIG. 5.

In the illustrative embodiment shown in FIG. 5, the rear cross bracket 36 is illustratively coupled to a rear portion of the lower surface 39 of the cargo shelf 32. The rear cross bracket 36 illustratively comprises an elongated unitary body with a lateral cross-section having a generally T-shaped configuration. As illustrated in FIG. 9, the generally T-shaped configuration of the lateral cross-section includes a cap 56 coupled generally orthogonally to a stem 57. A portion of the cap 56 extends beyond the upper surface 38 of the cargo shelf 32. In one illustrative embodiment, the cap 56 extends beyond the upper surface 38 of the cargo shelf 32 and helps to prevent unsecured cargo stored on the upper surface 38 from striking the rear hatch 21 due to a change in the movement of the vehicle 10.

In addition, the stem 57 is removably coupled to a rear portion of the lower surface 39 of the cargo shelf 32. In the illustrative embodiment of FIG. 9, the stem 57 illustratively includes at least one aperture 58 configured to receive a fastener. In this way, a user may securely fasten the rear cross bracket 36 to the cargo shelf 32. Thus, the rear cross bracket 36 at least strengthens a rear portion of the cargo shelf 32 along the length of the rear cross bracket 36.

Figure 10:
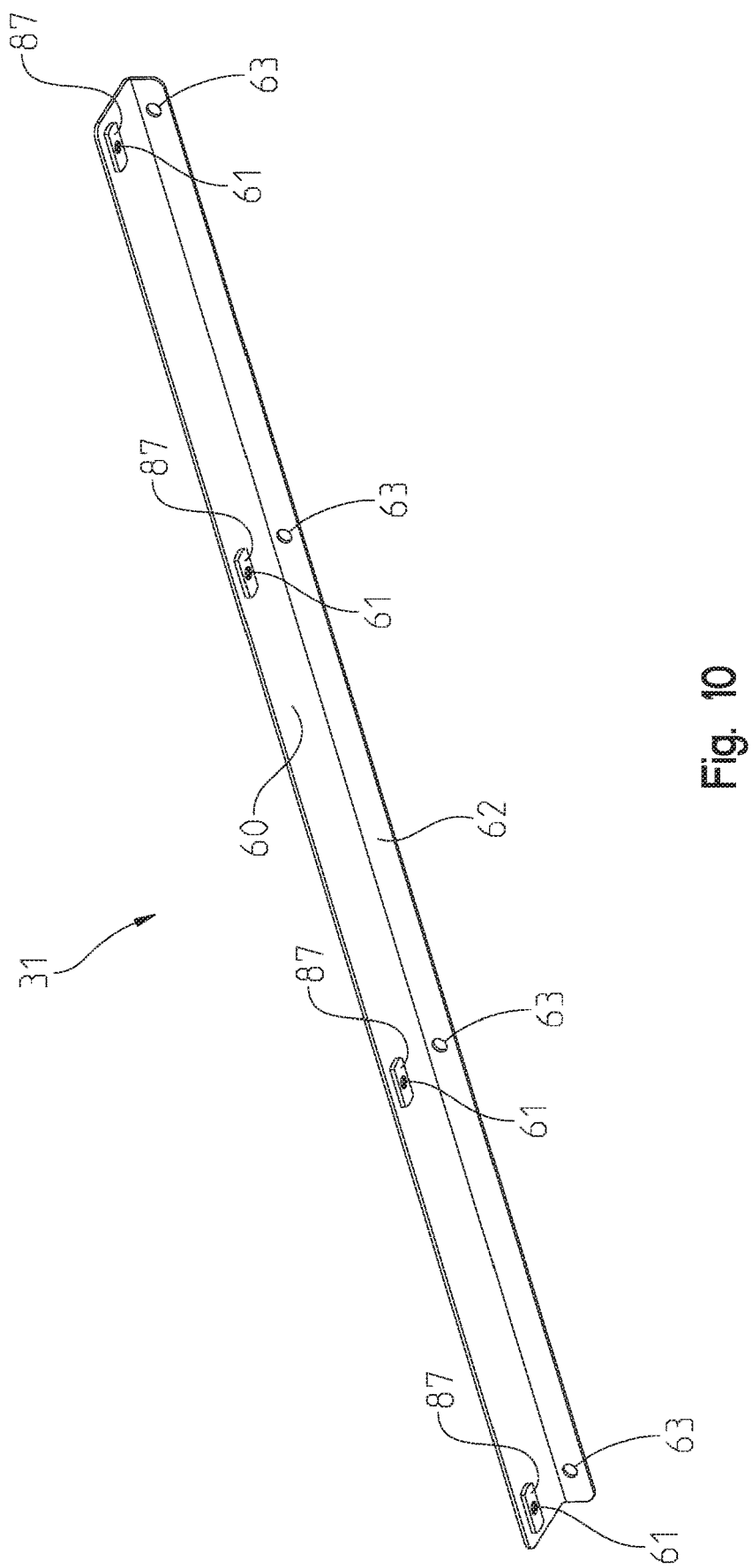
FIG. 10 is a perspective view of an illustrative front cross bracket of the cargo storage system of FIG. 5.

Referring to FIG. 5, the cargo storage system 30 further illustratively includes a front cross bracket 31 removably coupled to the cargo shelf 32. As shown in FIG. 5, the front cross bracket 31 illustratively extends from the driver side 22 to the passenger side 23 of the vehicle 10. In addition, the front cross bracket 31 comprises a lateral cross-section having a substantially L-shaped configuration. More specifically, the front cross bracket 31 comprises a mounting flange 60 and a strengthening flange 62 integrally formed with the mounting flange 60, as shown in FIG. 10. The strengthening flange 62 extends orthogonally downwardly from the mounting flange 60. This orientation of the strengthening flange 62 at least strengthens a front portion of the cargo shelf 32 along its length. Moreover, the mounting flange 60 illustratively includes at least one aperture 61 configured to receive a fastener. In the exemplary embodiment shown, the aperture 61 includes a corresponding weldnut 87 for securing a threaded fastener. Thus, a user may securely fasten the front cross bracket 31 to the cargo shelf 32.

Figure 11:
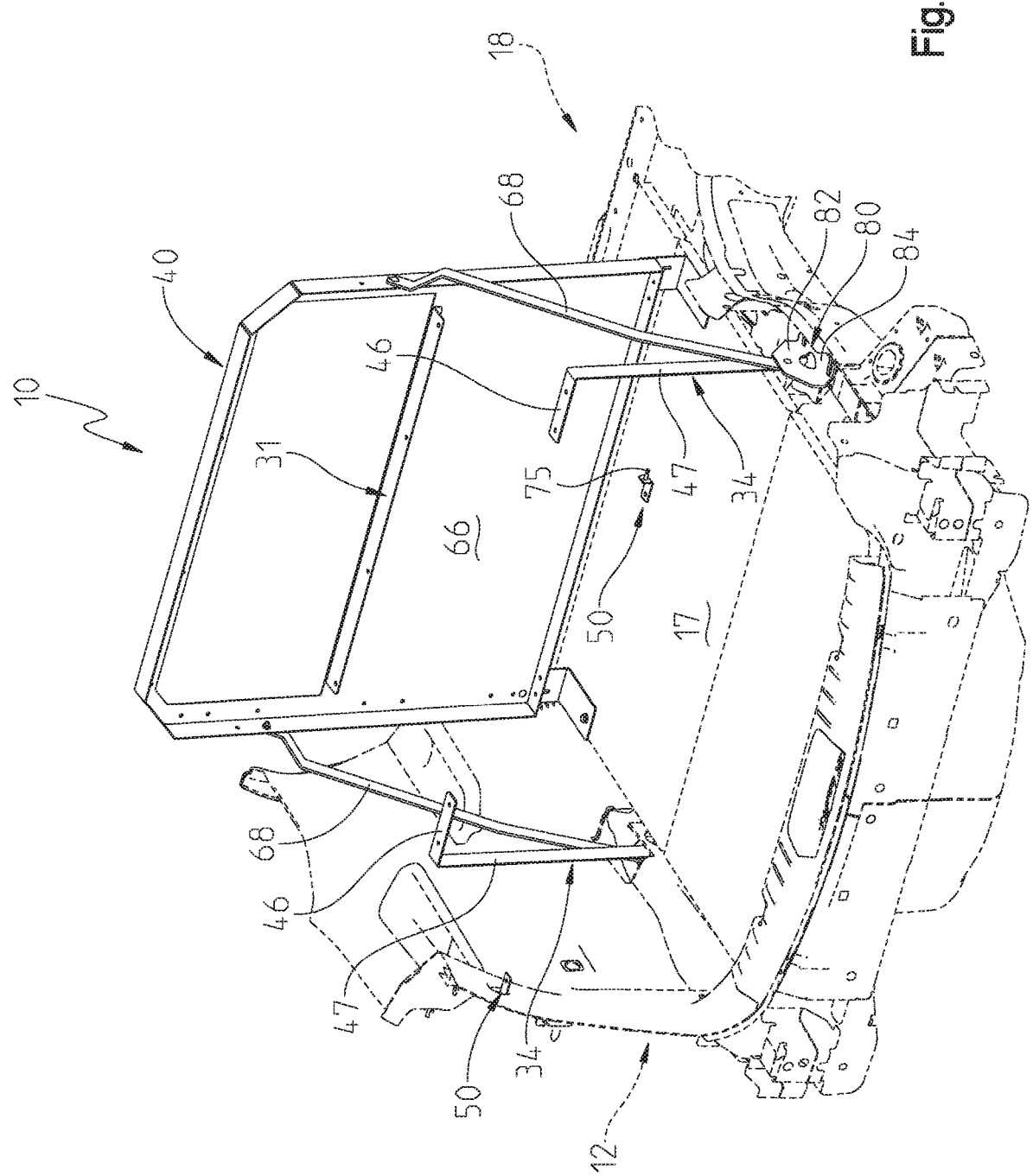
FIG. 11 is a perspective view of an illustrative step of installing the cargo storage system of FIG. 5 into the rear storage area of the vehicle.

Referring to FIG. 11, the vehicle 10 further includes a partition positioned intermediate the rear seating area 18 and the rear storage area 12. In the illustrative embodiment of FIG. 11, the partition may be a cargo barrier 40 available from, for example, Pro-gard Products, LLC™ of Noblesville, Ind. Alternatively, the cargo barrier 40 may comprise a partition configured to at least partially physically separate at least a portion of the rear seating area 18 and the rear storage area 12.

The cargo barrier 40 illustratively includes a first generally planar surface (not shown) facing the rear seating area 18. As shown in FIG. 11, the cargo barrier 40 illustratively further includes a second surface 66 opposite the first surface that faces the rear storage area 12. In the illustrative embodiment of FIG. 11, the second surface 66 of the cargo barrier 40 includes at least one aperture (not shown) for removably coupling the strengthening flange 62 of the front cross bracket 31 thereto.

In addition, the cargo barrier 40 illustratively includes barrier support brackets 68 removably coupled to the cargo barrier 40 and an existing mounting point within the vehicle 10. In the illustrative embodiment of FIG. 11, the barrier support brackets 60 extend from proximate a top portion of the cargo barrier 40 to an existing mounting point located near the floor 17 within the rear storage area 12. Thus, the illustrative barrier support brackets 68 extend at an angle relative to the cargo barrier 40.

In order to accommodate the barrier support brackets 68 extending into the rear storage area 12, a front portion of the cargo shelf 32 is configured to receive the barrier support brackets 68. In the illustrative embodiment of FIG. 5, a front portion of the cargo shelf 32 includes at least one relief 69 shaped to receive the barrier support brackets 68. As shown in FIG. 5, the relief 69 comprises a generally oblong channel extending inward from the contoured perimeter 33 of the cargo shelf 32. In this way, the cargo shelf 32 is adapted to fit around the barrier support brackets 68 while still generally conforming to a contoured interior surface of the rear storage area 12 and abutting the second surface 66 of the cargo barrier 40. Moreover, the relief 69 simplifies and expedites the installation process.

Referring to FIG. 5, the cargo storage system 30 illustratively further includes a mat 63 positioned adjacent to and supported by the upper surface 38 of the cargo shelf 32. As shown in FIG. 5, the mat 63 illustratively includes an exterior boundary 65 defined by an outer edge 64 of the mat 63. The exterior boundary 65 at least partially mirrors the contoured perimeter 33 of the cargo shelf 32. Moreover, the exterior boundary 65 is illustratively proximate the contoured perimeter 33.

In the illustrative embodiment of FIG. 5, the mat 63 removably couples to the cargo shelf 32. Both the cargo shelf 32 and the mat 63 include at least one hole 67 configured to receive a fastener (not shown) for securing the mat 63 to the cargo shelf 32. In the illustrative embodiment shown in FIG. 5, the cargo shelf 32 comprises a first material and the mat 63 comprises a second material softer than the first material. More specifically, the mat 63 illustratively comprises a heavy-duty elastomer.

The design of the illustrative embodiments of FIGS. 3-10 permits a user to easily and efficiently install the cargo storage system 30. If the vehicle 10 contains the cargo barrier 40, the user removably couples the front cross bracket 31 to the second surface 66 of the cargo barrier 40. In the illustrative embodiment of FIG. 11, the user may removably couple the front cross bracket 31 to the second surface 66 using threaded fasteners already located on the cargo barrier 40.

As illustrated in FIG. 11, the user illustratively installs one of the plurality of upright support brackets 34 on the passenger side 23 of the vehicle 10 in the rear storage area 12. A user illustratively installs the long leg 47 of one of the plurality of upright support brackets 34 to an existing mounting point within the vehicle 10 using one of the rear mounting brackets 80. In the illustrative embodiment of FIG. 11, one of the barrier support brackets 68 attaches to the same existing mounting point using the one of the rear mounting brackets 80. The user installs the one of the upright support bracket 34 to the interior of the one of the barrier support brackets 68. That is, the one of the upright support brackets 34 is installed closer to the longitudinal axis 20 of the vehicle 10 than the corresponding one of the barrier support brackets 68. Once the user has installed the one of the upright brackets 34, the user repeats the installation process for the remaining one of the upright support brackets 34 on the driver side 22 of the vehicle 10.

The user installs the short leg 52 of the at least one shelf support bracket 50 in place of a rear cargo hook (not shown). In the illustrative embodiment of FIG. 11, the cargo storage system 30 comprises at least two rear shelf support brackets 50. The user installs the shelf support brackets 50 using a self-drilling fastener 75.

Figure 12:
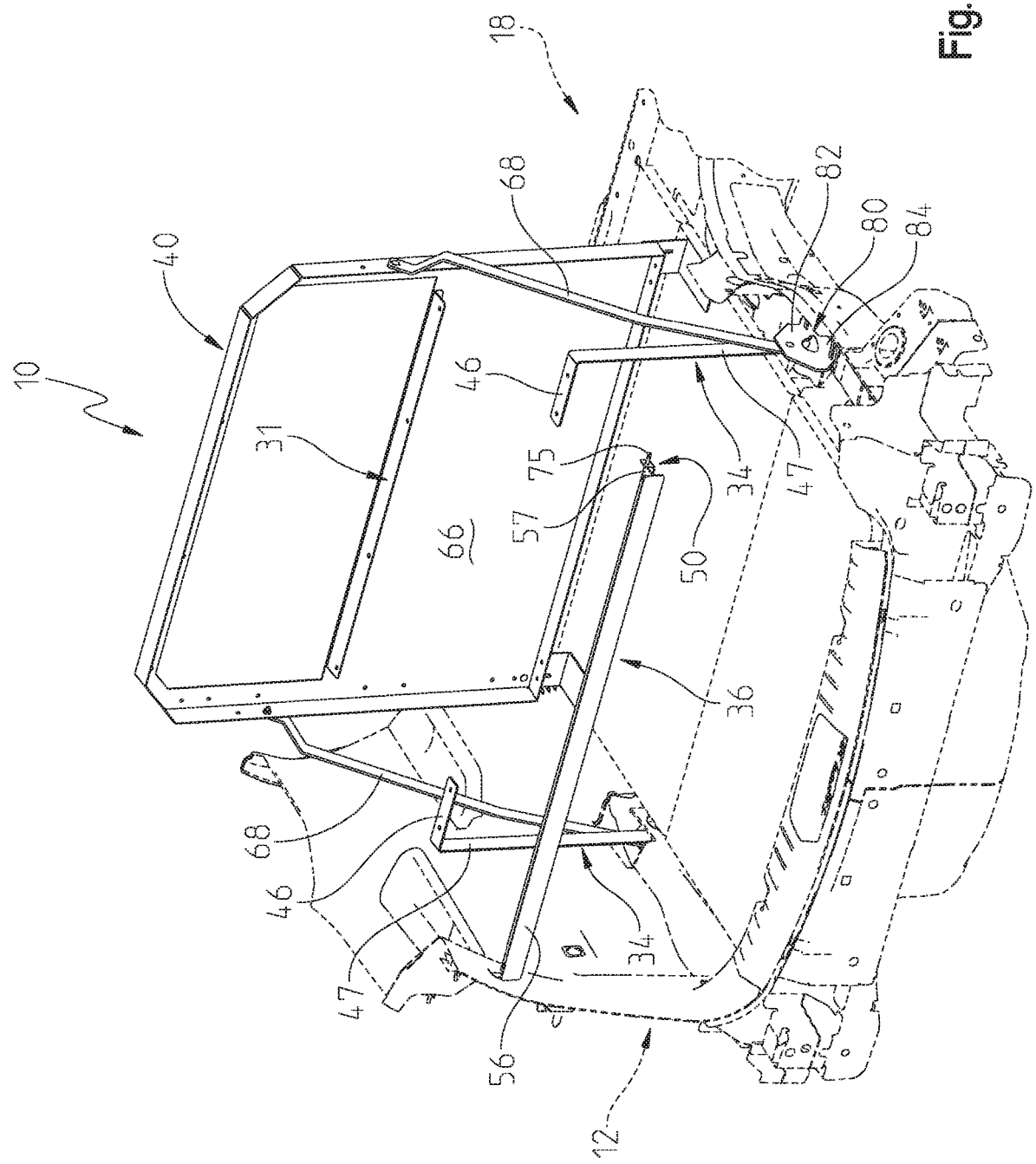
FIG. 12 is a perspective view of an illustrative step of installing the cargo storage system of FIG. 5 into the rear storage area of the vehicle.
Figure 13:
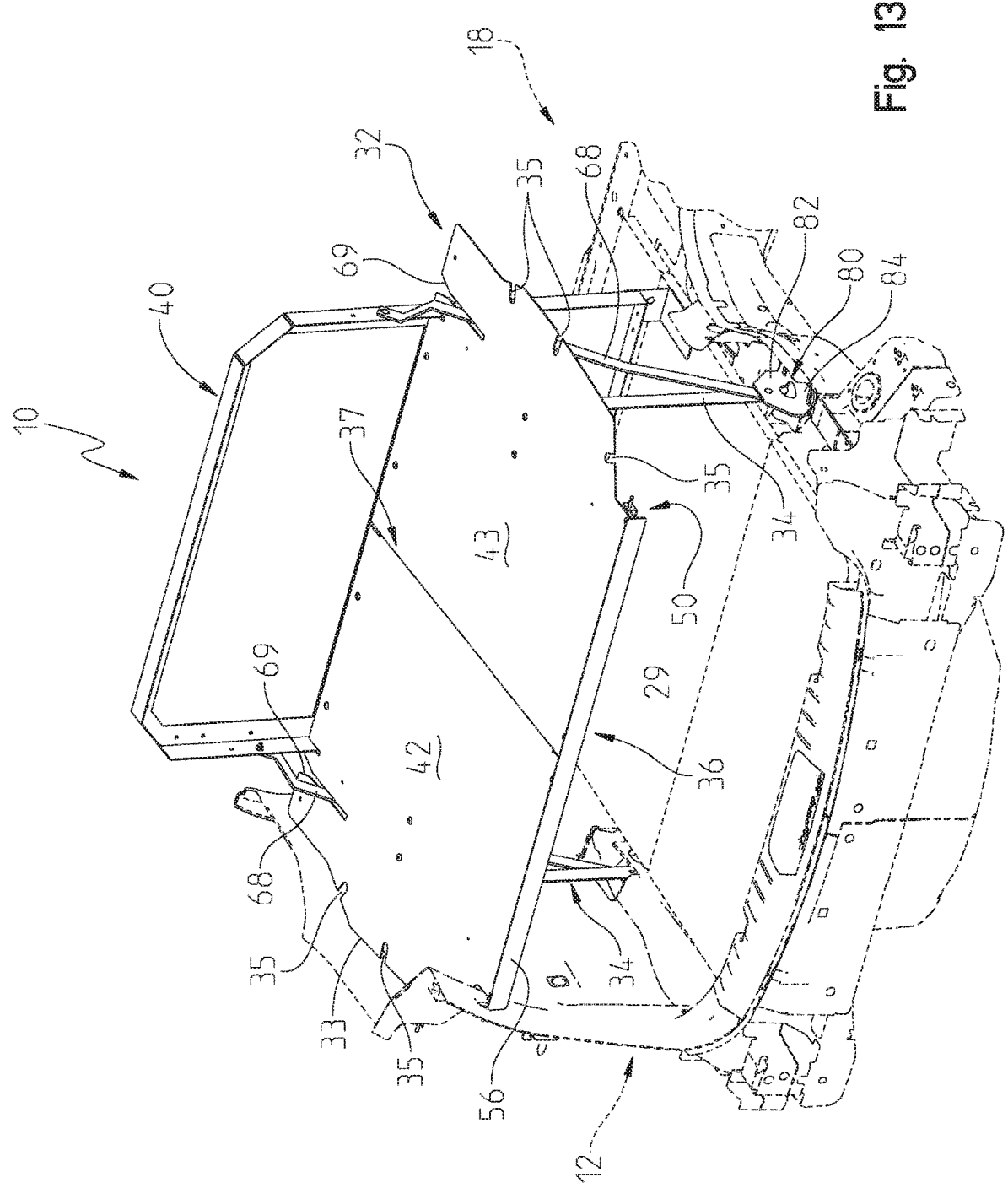
FIG. 13 is a perspective view of an illustrative step of installing the cargo storage system of FIG. 5 into the rear storage area of the vehicle.
Figure 14:
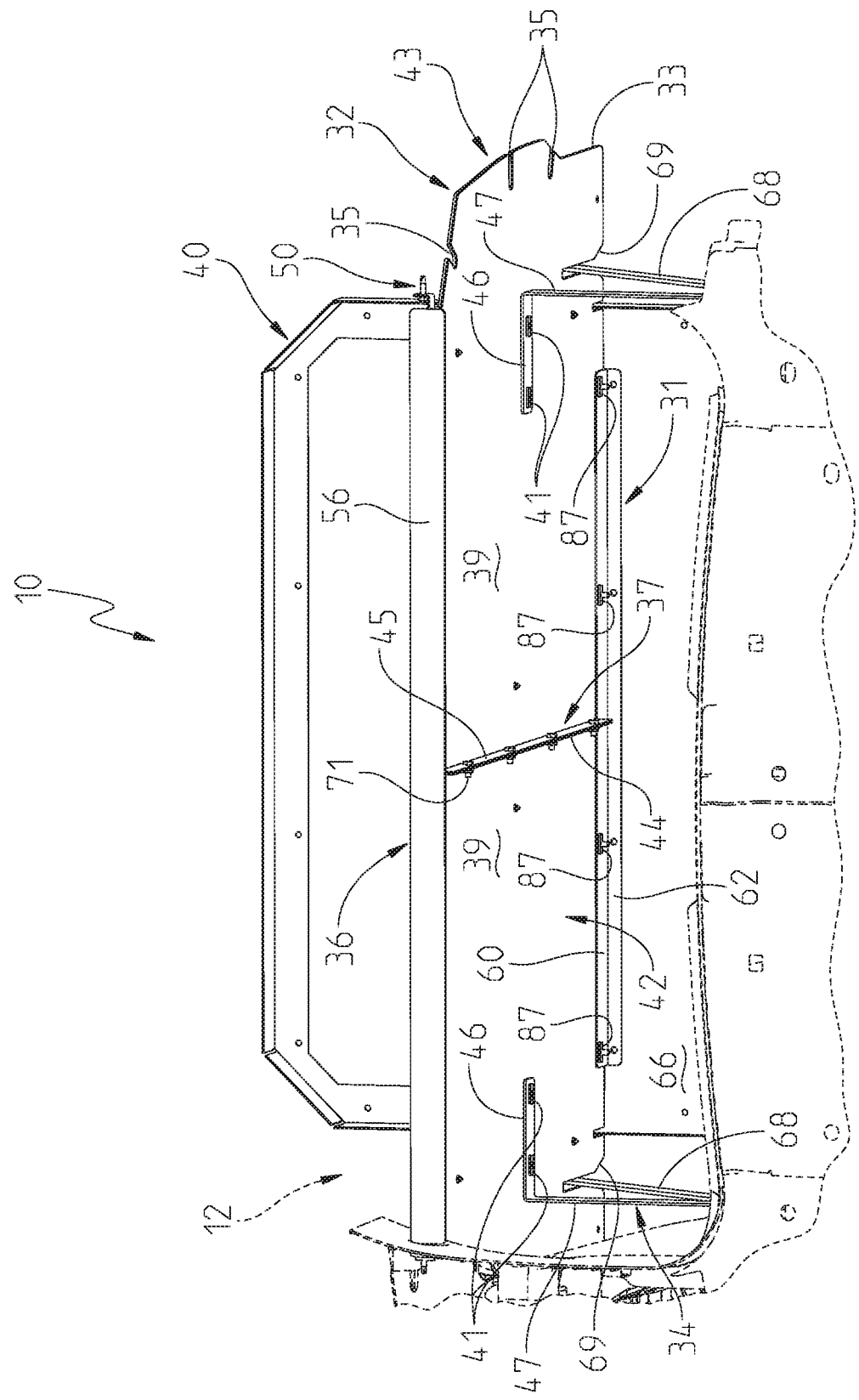
FIG. 14 is a perspective view of an illustrative step of installing the cargo storage system of FIG. 5 into the rear storage area of the vehicle.

Referring now to FIG. 12, the user places the rear cross bracket 36 into place over the long leg 51 of the shelf support brackets 50. Once the rear cross bracket 36 is aligned with the long leg 51 of the shelf support brackets 50, the user places the driver side cargo panel 42 over the rear cross bracket 36, the front cross bracket 31, and the upright support brackets 34 on the driver side 22 of the vehicle 10. As shown in FIG. 13, the user illustratively couples the driver side cargo panel 42 to the rear cross bracket 36, the front cross bracket 31, and the upright support brackets 34 using threaded fasteners. Upright support brackets 34 further include at least one weldnut 41 (see FIG. 6) for securing the threaded fasteners. Once the driver side cargo panel 42 is installed, the user repeats the process for the passenger side 23 of the vehicle 10 using the passenger side cargo panel 43. As illustrated in FIG. 14, the user then removably couples the driver side cargo panel 42 and the passenger side cargo panel 43 along the lateral seam 37 of the cargo shelf 32 using threaded fasteners.

While the installation instructions have recited installing either a passenger side or a driver side component prior to installing the other side, this order has been provided for illustrative purposes only. Thus, the recitation of installing a driver side component before a passenger side component does not limit the installation to that order unless necessary. Therefore, the user may be able to install a passenger side component prior to installing the driver side component.

Figure 15:
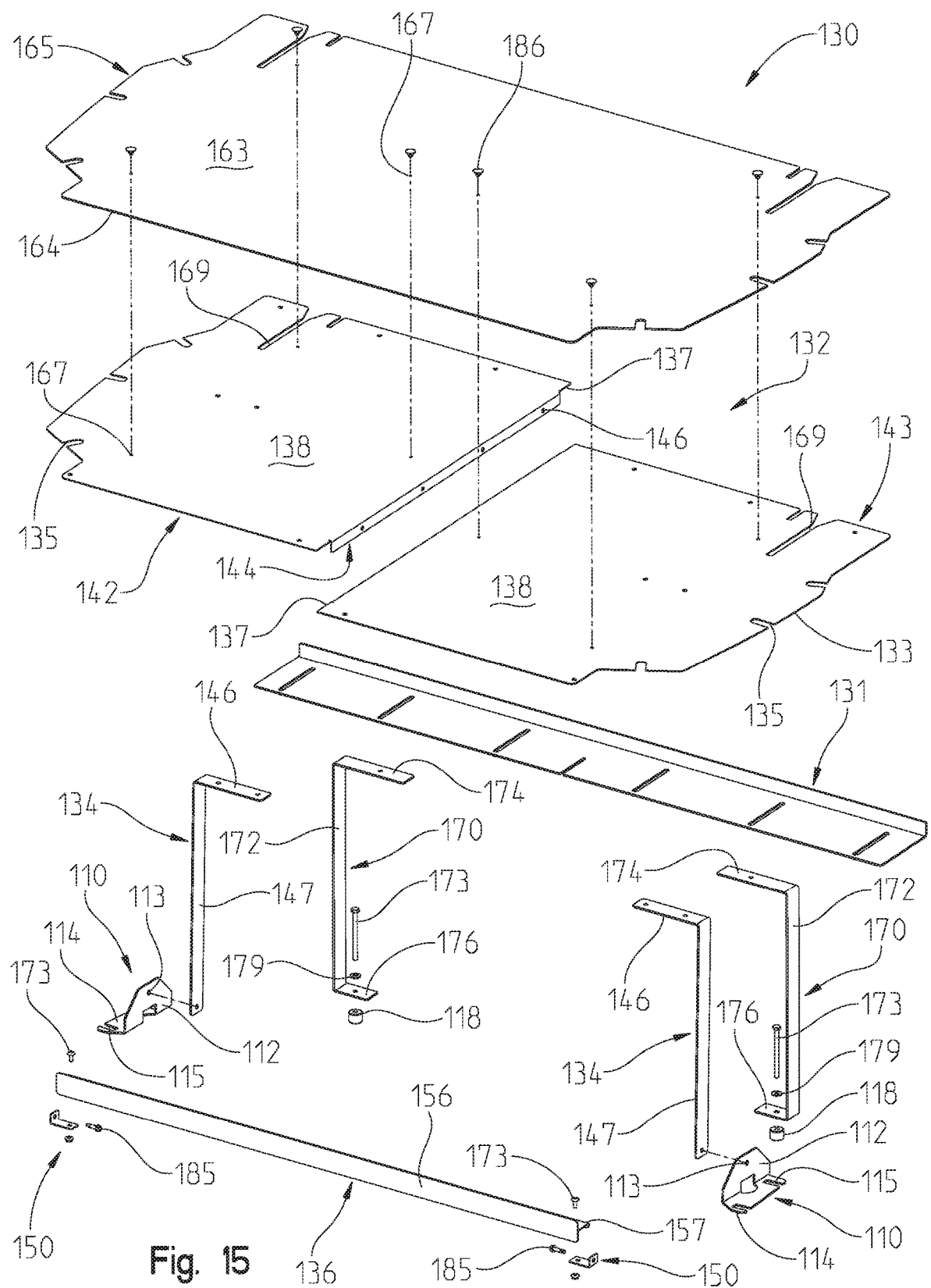
FIG. 15 is an exploded perspective view of another illustrative cargo storage system of the present disclosure.

Referring now to FIG. 15, an illustrative cargo storage system 130 comprises a cargo shelf 132, a plurality of upright support brackets 134, 170 removably coupled to and extending downwardly from the cargo shelf 132, and a rear cross bracket 136 removably coupled to the cargo shelf 132. In another illustrative embodiment, the plurality of upright support brackets 134, 170 may be tailored to mount within different vehicle types and models. For example, in one illustrative embodiment, cargo storage system 130 is tailored for a 2016 model Ford Utility Interceptor vehicle.

In the embodiment shown in FIG. 15, cargo shelf 132 comprises an upper surface 138 and a lower surface 139 opposite the upper surface 138. The upper and lower surfaces 138, 139 illustratively comprise substantially parallel surfaces. In another illustrative embodiment, the cargo shelf 132 comprises a rigid material, such as, for example, steel. In addition, the cargo shelf 132 includes a contoured perimeter 133 defined by a boundary edge of the cargo shelf 132, as illustrated in FIG. 15. The contoured perimeter 133 of the cargo shelf 132 is illustratively configured to at least partially track a contoured interior surface of the rear storage area 12. In this way, the cargo shelf 132 at least appears to be partially form-fitting to the contoured interior surface of the rear storage area 12. Further, the contoured perimeter 133 permits the cargo shelf 132 to fit around interior trim on vehicle frames and extend into window wells.

Additionally, the contoured perimeter 133 of the cargo shelf 132 is illustratively further configured to receive at least a portion of a cargo securing member (not shown). In the illustrative embodiment shown in FIG. 15, the contoured perimeter 133 of the cargo shelf 132 includes at least one relief 135 therein. As illustrated in FIG. 15, the at least one relief 135 includes a generally oblong shape. The cargo securing member illustratively includes a variety of implements used to temporarily secure cargo or other accessories. For example, the cargo securing member may comprise a rope, cord, strap, chain, bungee cord, or other suitable tie-down.

Many cargo securing members include a hook or other curvilinear structure at each end for anchoring the cargo securing member. Because the contoured perimeter 133 of the cargo shelf 132 at least partially tracks the contoured interior surface of the rear storage area 12, sufficient space between the contoured perimeter 133 and the interior surface of the rear storage area 12 may not exist in which to anchor the cargo securing member to the contoured perimeter 133 of the cargo shelf 132. Therefore, the at least one relief 135 provides a location for a user to anchor at least one end of the cargo securing member before securing cargo to the upper or lower surfaces 138, 139 of the cargo shelf 132.

Referring to the illustrative embodiment shown in FIG. 15, the cargo shelf 132 further includes a driver side cargo panel 142 and a passenger side cargo panel 143. The driver side cargo panel 142 is positioned on the driver side 22 of the vehicle 10. Conversely, the passenger side cargo panel 143 is positioned on the passenger side 23 of the vehicle 10. The passenger side cargo panel 143 removably couples to the driver side cargo panel 142 along a lateral seam 137 of the cargo shelf 132. The lateral seam 137 of the cargo shelf 132 is proximate the longitudinal axis 20. In the illustrative embodiment shown in FIG. 15, the lateral seam 137 of the cargo shelf 132 is coaxial to the longitudinal axis 20 of the vehicle 10. In addition, the driver side and passenger side cargo panels 142, 143 are illustratively asymmetrical about the lateral seam 137.

In the illustrative embodiment shown in FIG. 15, the passenger side cargo panel 143 removably couples to the driver side cargo panel 142. More specifically, each of the driver side and passenger side cargo panels 142, 143 illustratively includes a strengthening rib 144, 145 (see FIG. 23) along an edge adjacent the lateral seam 137 of the cargo shelf 132. Illustratively, the strengthening ribs 144, 145 extend generally downwardly and orthogonally from their respective cargo panels 142, 143. In this way, each strengthening rib 144, 145 forms a mating surface that abuts the other when the cargo shelf 132 is installed. In the illustrative embodiment shown in FIG. 15, each strengthening rib 144, 145 includes at least one aperture 146 configured to receive a fastener 190 (see FIG. 23).

The illustrative two-piece construction of the cargo shelf 132 shown in FIG. 15 permits a user to install the cargo shelf 132 one panel at a time. This installation method greatly increases the ease of installation. Moreover, the two-piece construction permits the contoured perimeter 133 to more closely track an interior surface of the rear storage area 12, as opposed to a single-piece shelf. That is, the cargo shelf 132 presents an impression that the contoured perimeter 133 is scribed to the contoured interior surface of the rear storage area 12. Although the illustrative embodiment shown in FIG. 15 comprises a cargo shelf 132 including two cargo panels 142 and 143, a cargo shelf comprising more or fewer than two cargo panels is contemplated.

In the illustrative embodiment shown in FIG. 15, the plurality of upright support brackets 134, 170 are removably coupled to and extend outwardly from the lower surface 139 of the cargo shelf 132. In addition, at least one end of the plurality of upright support brackets 134, 170 is configured to removably couple to a portion of the vehicle 10. The plurality of upright support brackets 134, 170 removably couple to the vehicle 10 using existing mounting points. In this way, the plurality of upright support brackets 134, 170 may be easily and securely fastened to the vehicle 10. Moreover, while the embodiment shown in FIG. 15 removably couples to the vehicle 10 using threaded fasteners such as bolts or screws, the plurality of upright support brackets 134, 170 may be attached to vehicle 10 using a variety of securing methods known in the art.

Referring to the illustrative embodiment of FIG. 15, the plurality of upright support brackets 134, 170 includes four upright support brackets. Illustratively, the upright support brackets comprise two front upright support brackets 170 removably coupled to a front portion of the lower surface 139 of cargo shelf 132 and two center upright support brackets 134 removably coupled to an intermediate portion of the lower surface 139 of cargo shelf 132.

Figure 16:
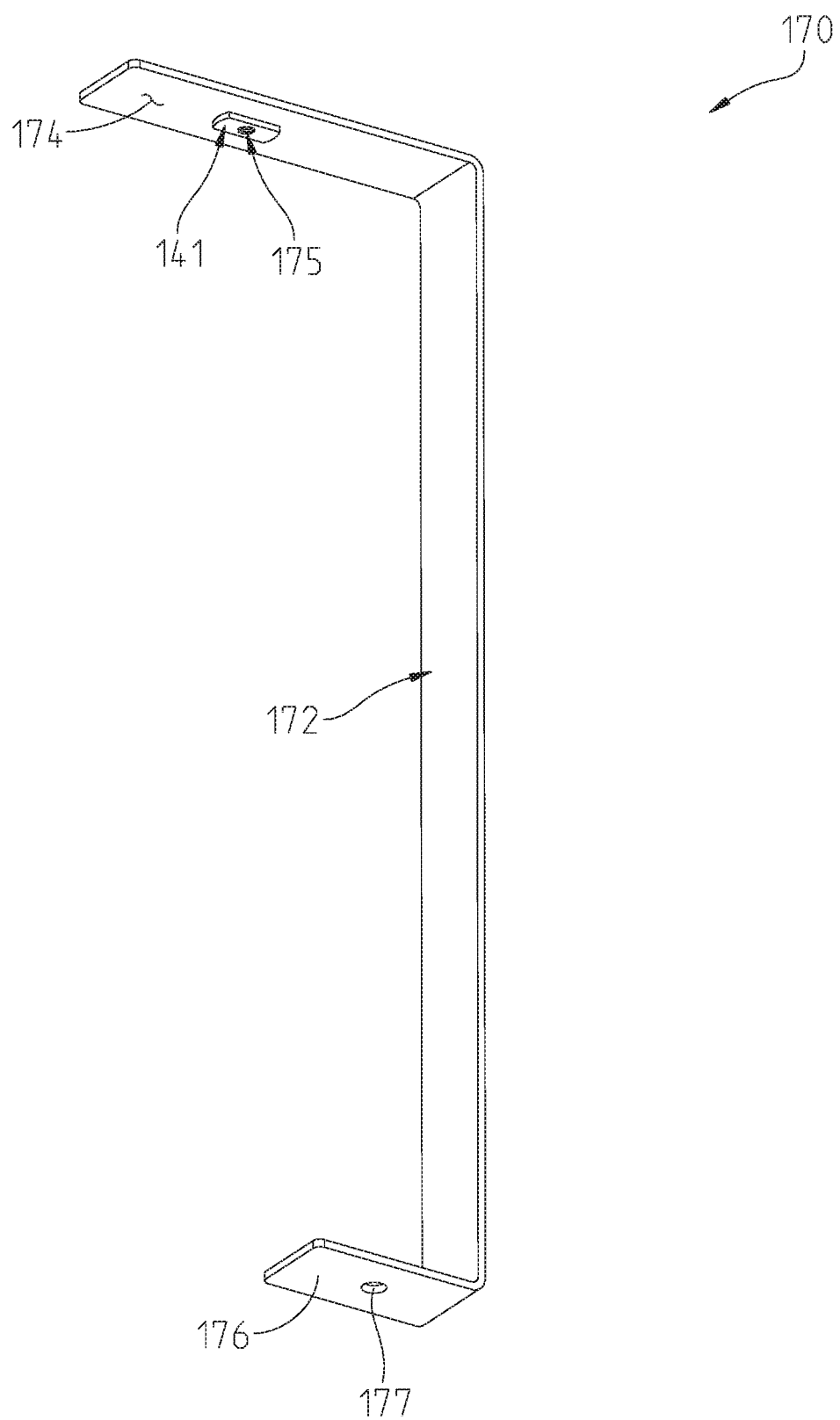
FIG. 16 is a perspective view of an illustrative front upright support bracket of the cargo storage system of FIG. 15.

Referring now to FIG. 16, the front upright support brackets 170 comprise a generally C-shaped profile. That is, the front upright support brackets 170 comprise an elongated stem 172 extending generally downwardly from the cargo shelf 132. An upper leg 174 is integrally formed with an end of the elongated stem 172 and extends generally orthogonally therefrom. A lower leg 176 is integrally formed with the elongated stem 172 opposite the upper leg 174 and extends generally orthogonally therefrom. In the illustrative embodiment of FIG. 16, the upper and lower legs 174, 176 extend generally orthogonally from the elongated stem 172 generally towards the longitudinal axis 20 of the vehicle 10. The lower leg 176 of front upright support brackets 170 includes at least one aperture 177 configured to receive a fastener 173 (see FIG. 15). Thus, a user may securely fasten the front upright support brackets 170 directly or indirectly to the existing mounting points within the vehicle 10. Similarly, the upper leg 174 of front upright support brackets 170 includes at least one aperture 175 configured to receive a fastener (not shown). In this way, a user may fasten the cargo shelf 132 to the front upright support brackets 170.

The center upright support brackets 134 shown in FIG. 15 comprise a generally L-shaped profile. That is, the center upright support brackets 134 include an elongated stem 147 and an upper leg 146 integrally formed therewith. In the illustrative embodiment shown in FIG. 15, the elongated stem 147 extends generally downwardly from the cargo shelf 132. The upper leg 146 extends generally orthogonally from the elongated stem 147 and includes at least one aperture 148 configured to receive a fastener for removably coupling the center upright support bracket 134 to the cargo shelf 132.

In the illustrative embodiment of FIG. 15, the cargo shelf 132 system further includes two rear barrier mount brackets 110. The rear barrier mount brackets 110 removably couple to the existing mounting points within the vehicle 10. The rear barrier mount brackets 110 illustratively include an upper mounting flange 112 and a lower mounting flange 114 integrally formed therewith. As shown in FIG. 15, the lower mounting flange 114 includes at least one aperture 115 for removably coupling the lower mounting flange 114 to the existing mounting points within the vehicle 10. Additionally, the upper mounting flange 112 illustratively includes at least one aperture 113 configured to receive a fastener (not shown) for removably coupling one of the center upright support brackets 134 thereto. In this way, a user may securely fasten the center upright support brackets 134 to the rear barrier mount brackets 110, which are securely fastened to the existing mounting points within the vehicle 10. In the illustrative embodiment shown in FIG. 15, the center upright support brackets 134 are securely fastened to the upper mounting flange 112. In turn, the front upright support brackets 170 and the lower mounting flange 114 are securely fastened to the existing mounting points within the vehicle 10.

The illustrative embodiment shown in FIG. 15 further includes at least one shelf support bracket 150 removably coupled to at least one of the rear cross bracket 136 and the cargo shelf 132. The shelf support bracket 150 is structured similarly and functions similarly to the shelf support bracket 50 discussed supra.

In the illustrative embodiment shown in FIG. 15, the rear cross bracket 136 is illustratively coupled to a rear portion of the lower surface 139 of the cargo shelf 132. The rear cross bracket 136 illustratively comprises an elongated unitary body with a lateral cross-section having a generally T-shaped configuration. As illustrated in FIG. 15, the generally T-shaped configuration of the lateral cross-section includes a cap 156 coupled generally orthogonally to a stem 157. A portion of the cap 156 extends beyond the upper surface 138 of the cargo shelf 132. In one illustrative embodiment, the cap 156 extends beyond the upper surface 138 of the cargo shelf 132 and helps to prevent unsecured cargo stored on the upper surface 138 from striking the rear hatch 21 due to a change in the movement of the vehicle 10. A user may securely fasten the rear cross bracket 136 to the cargo shelf 132. Therefore, the rear cross bracket 136 at least strengthens a rear portion of the cargo shelf 132 along its length.

In the illustrative embodiment shown in FIG. 15, the cargo storage system 130 further illustratively includes a shelf extender 131 removably coupled to a front portion of the lower surface 139 of the cargo shelf 132. The shelf extender 131 illustratively stretches from the driver side 22 to the passenger side 23 of vehicle 10. In the illustrative embodiment shown in FIGS. 17 and 18, the shelf extender 131 comprises a lower shelf 180 and a rib 182 integrally formed with a leading edge of the lower shelf 180. While the rib 182 is shown integrally formed with the lower shelf 180 in FIG. 17, the rib 182 could be coupled to the lower shelf 180 in a variety of manners known in the art. In the embodiment shown in FIG. 17, the rib 182 extends upright from the lower shelf 180 and is configured to provide strength along the length of the lower shelf 180. In addition, the rib 182 forms an interface that may abut the rear seating area 18 or the cargo barrier 40 (or other partition).

Lower shelf 180 illustratively includes a plurality of channels 184 positioned along the lower shelf 180. In the embodiment shown in FIGS. 17 and 18, the plurality of channels 184 extend between a trailing edge of the lower shelf 180 and the rib 182. In addition, the plurality of channels 184 are sized to receive a fastener 183 (see FIG. 22) for removably securing the shelf extender 131 to the cargo shelf 132. As shown in FIGS. 17 and 18, the plurality of channels 184 illustratively comprise a generally oblong shape.

The plurality of channels 184 are configured to permit the shelf extender 131 to move relative to the cargo shelf 132. Thus, a user may adjust the shelf extender 131 from a retracted position to a fully extended position and therebetween. As a result, the cargo storage system 130 shown in FIG. 15 may be used with a variety of different partitions (e.g., OEM seats) or cargo barriers (e.g. cargo barrier 40 or other partition) positioned between the rear seating area 18 and the rear storage area 12. As such, the shelf extender 131 permits the user to reduce or close any gap between the cargo shelf 132 and the cargo barrier 40 (or other partition) following installation of the cargo shelf 132.

Referring to FIG. 15, the cargo storage system 130 illustratively further includes a mat 163 positioned adjacent to and supported by the top surface 138 of the cargo shelf 132. As shown in FIG. 15, the mat 163 illustratively includes an exterior boundary 165 defined by an outer edge 164 of the mat 163. The exterior boundary 165 at least partially mirrors the contoured perimeter 133 of the cargo shelf 132. Moreover, the exterior boundary 165 is illustratively proximate the contoured perimeter 133.

In the illustrative embodiment of FIG. 15, the mat 163 removably couples to the cargo shelf 132. Both the cargo shelf 132 and the mat 163 include at least one hole 167 configured to receive a fastener for securing the mat 163 to the cargo shelf 132. In the illustrative embodiment shown in FIG. 15, the cargo shelf 132 comprises a first material and the mat 163 comprises a second material softer than the first material. More specifically, the mat 163 illustratively comprises a heavy-duty elastomer.

The design of the illustrative embodiment of FIG. 15 permits a user to easily and efficiently install the cargo storage system 130. To begin with, the user removes a driver side rear pocket trim panel, located on a driver side rear quarter trim, just below a driver side upper contents tray in the rear storage area 12 of the vehicle 10. The user then securely mounts one of the rear barrier mount brackets 110 using at least two threaded fasteners exposed when the driver side rear pocket trim panel was removed. Once the user has installed one of the rear barrier mount brackets 110 on the driver side 22, the process is repeated on the passenger side 23 for the other of the rear barrier mount brackets 110.

The user removably couples one of the front upright support brackets 170 to an existing mounting point on the driver side 22 using a threaded fastener 173 and washer 179. As illustrated in FIG. 15, a spacer 118 is placed between the floor 17 of the vehicle 10 and the lower leg 176 of one of the front upright support brackets 170 prior to installation. The user then repeats the process on the passenger side 23 for the other of the front upright support bracket 170.

Figure 19:
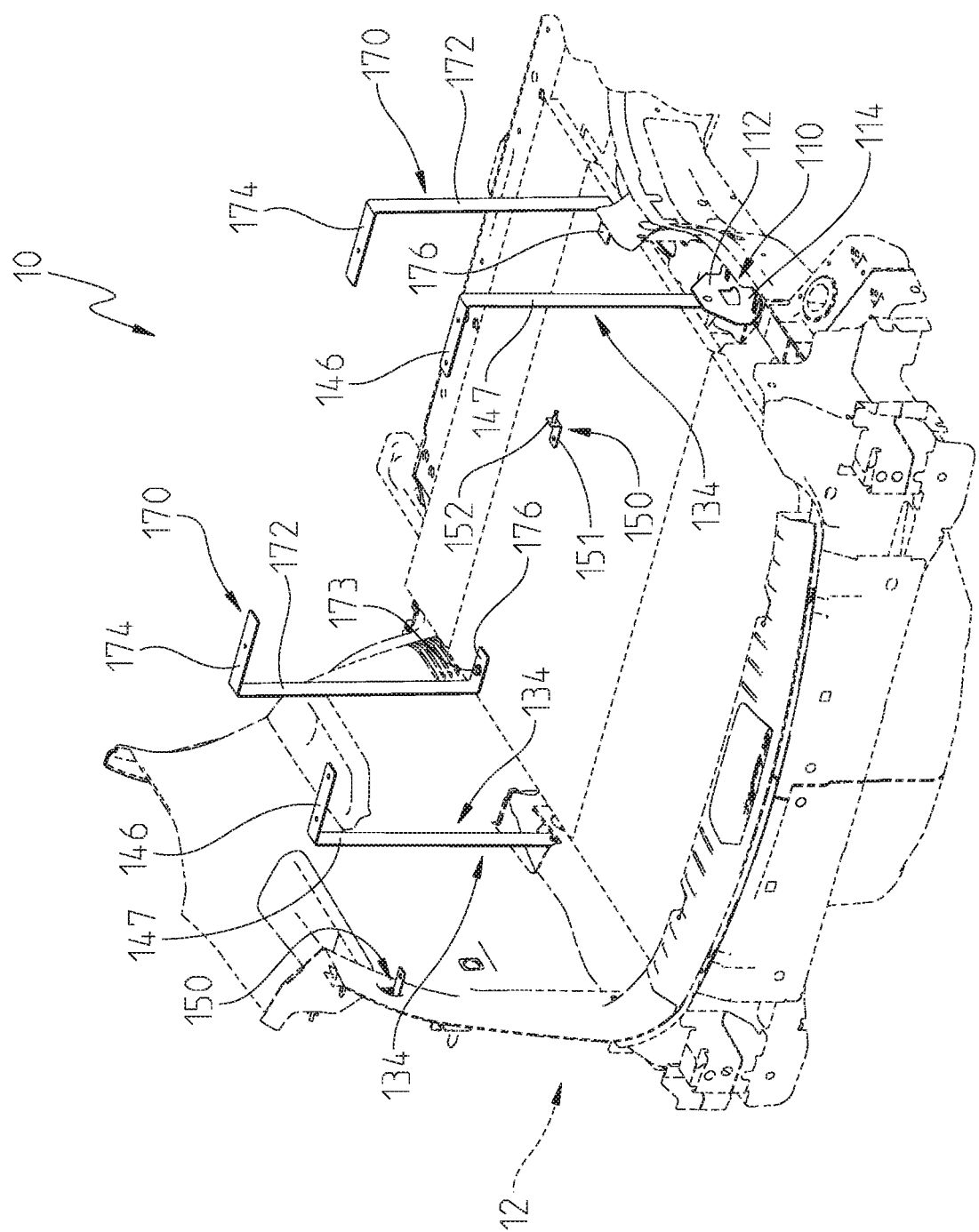
FIG. 19 is a perspective view of an illustrative step of installing the cargo storage system of FIG. 15.

The user loosely fastens one of the center upright support brackets 134 to the upper mounting flange 112 of the rear barrier mount bracket 110 on the passenger side 23 of the vehicle 10. In the illustrative embodiment of FIG. 19, the user positions the elongated stem 172 of the center upright brackets 134 nearer a center of the vehicle 10 than the upper mounting flange 112 of the rear barrier mount bracket 110. That is, the elongated stem 172 of the center upright bracket 134 is placed closer to the longitudinal axis 20 of the vehicle 10 than the upper mounting flange 112. Once one of the center upright support brackets 134 has been installed to the upper mounting flange 112 of the rear barrier mount bracket 110 on the passenger side 23 of the vehicle 10, the user repeats the process for the remaining center upright support bracket 134 on the driver side 22.

The user installs the short leg 152 of the at least one shelf support bracket 150 in place of a rear cargo hook (not shown). In the illustrative embodiment of FIG. 15, the cargo storage system 130 comprises at least two rear shelf support brackets 150. The user installs the shelf support brackets 150 using a self-drilling fastener 185.

Figure 20:
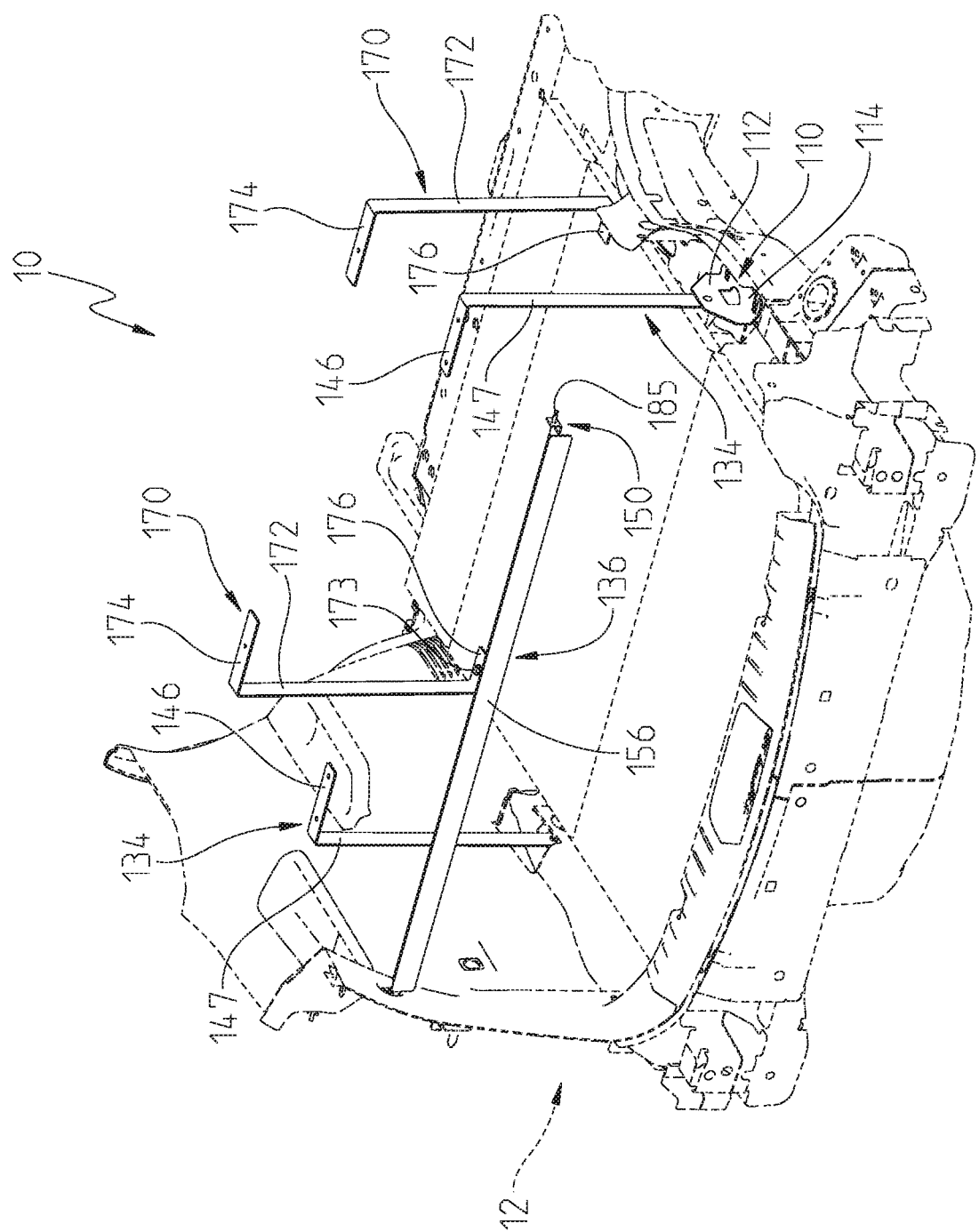
FIG. 20 is a perspective view of an illustrative step of installing the cargo storage system of FIG. 15.
Figure 21:
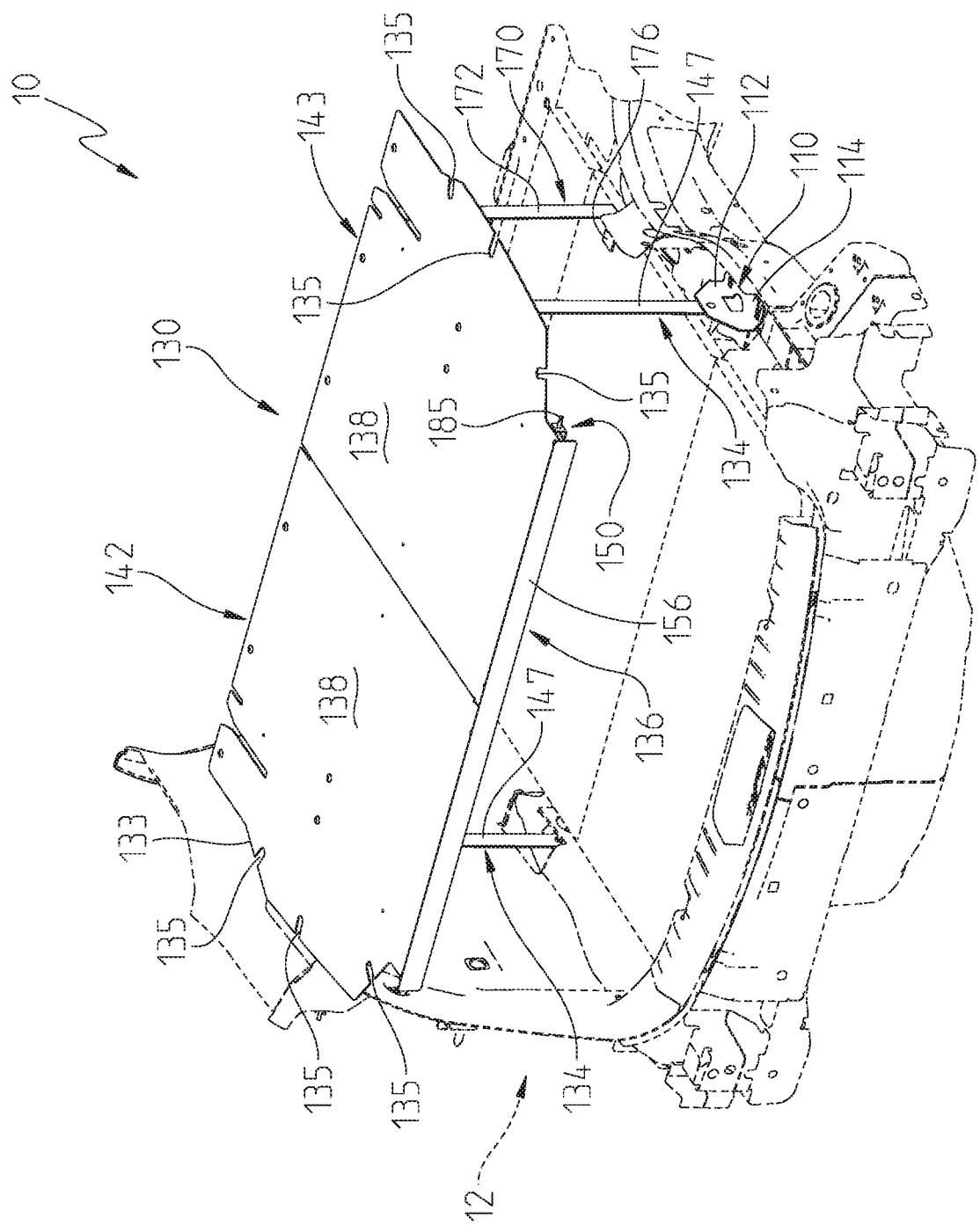
FIG. 21 is a perspective view of an illustrative step of installing the cargo storage system of FIG. 15.

As illustrated in FIG. 20, the user places the rear cross bracket 136 into place over the long leg 151 of the shelf support brackets 150. Once the rear cross bracket 136 is aligned with the long leg 151 of the shelf support brackets 150, the user places the driver side cargo panel 142 over the rear cross bracket 136, the front upright support brackets 170, and the center upright support brackets 134 on the driver side 22 of the vehicle 10. As illustrated in FIG. 21, the user illustratively couples the cargo shelf 132 to the rear cross bracket 136, the front upright support brackets 170, and the center upright support brackets 134 using threaded fasteners (not shown). Once the driver side cargo panel 142 is installed, the user repeats the process for the passenger side 23 using the passenger side cargo panel 143. The front upright support brackets 170 and the center upright support brackets 134 include weldnuts 141 (see FIG. 23) for securing the threaded fasteners (not shown).

Figure 22:
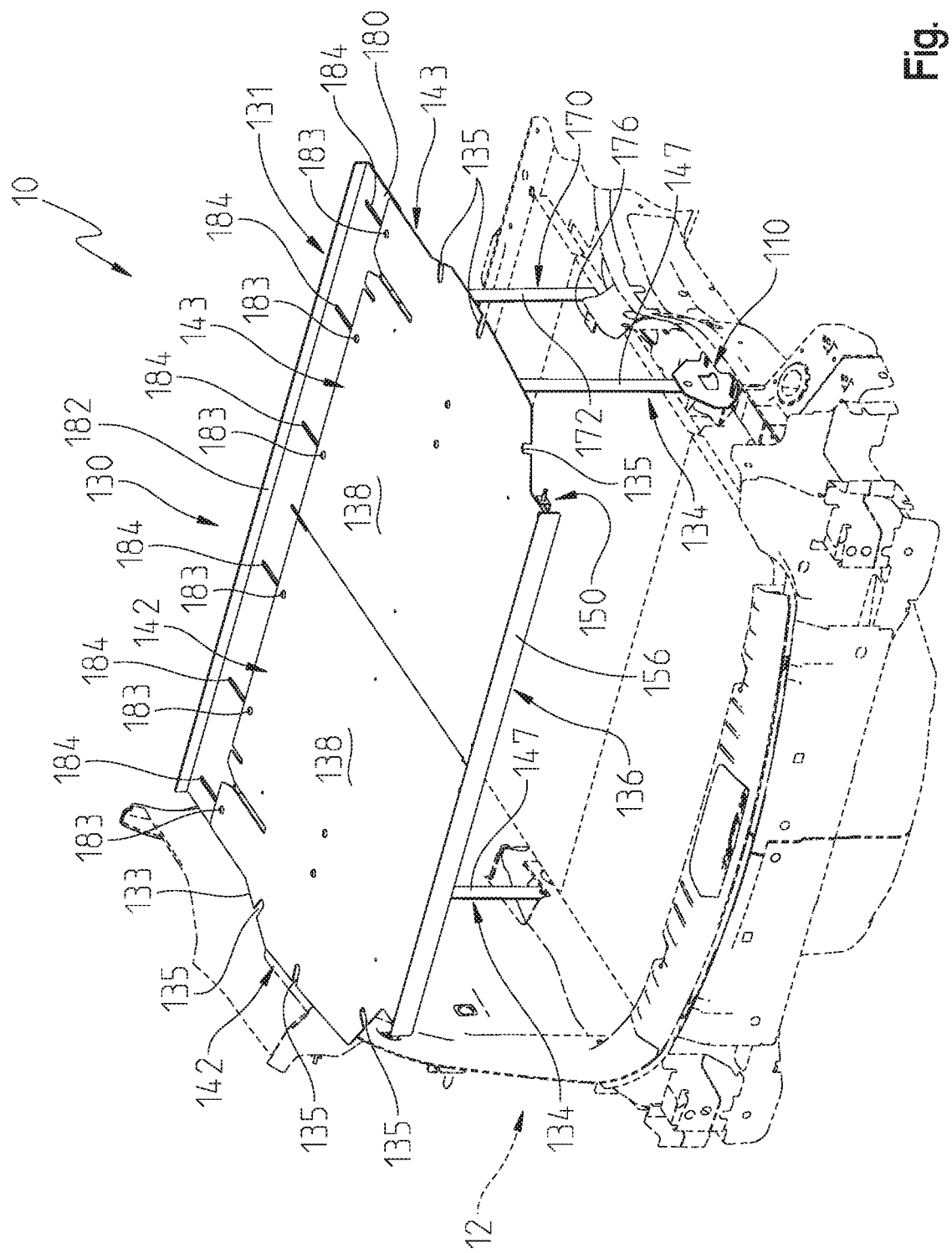
FIG. 22 is a perspective view of an illustrative step of installing the cargo storage system of FIG. 15.

As illustrated in FIG. 21, the user then places the shelf extender 131 between the upper leg 174 of the front upright support brackets 170 and the lower surface 139 of the cargo shelf 132. The user aligns the plurality of channels 184 on the lower shelf 180 of the shelf extender 131 with the corresponding fasteners 183 in the cargo shelf 132. As shown in FIG. 22, the user adjusts the shelf extender 131 to a desired position between a retracted position and fully extended position and therebetween. Once the shelf extender 131 is in the desired position, the user securely fastens the shelf extender 131 to the cargo shelf 132 and front upright support brackets 170.

Figure 23:
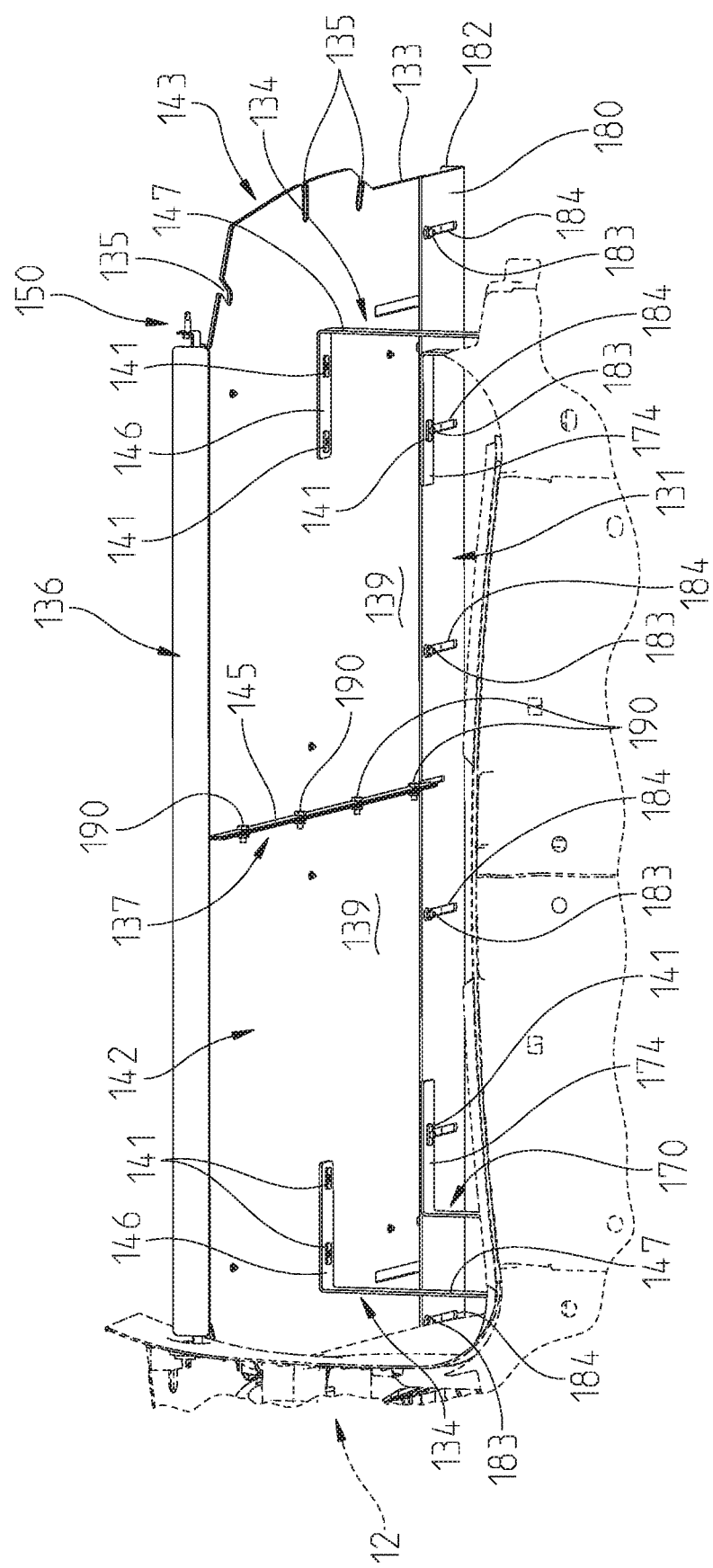
FIG. 23 is a perspective view of an illustrative step of installing the cargo storage system of FIG. 15.

The user places the mat 163 adjacent the upper surface 138 of the cargo shelf 132 and aligns the mat 163 with the cargo shelf 132. In the illustrative embodiment of FIG. 15, the user inserts a fastener 186 in each of the remaining holes 167 on the upper surface 138 of the cargo shelf 132 and the mat 163 to secure the mat 163 to the cargo shelf 132. The fastener 186 shown in FIG. 15 is illustratively a push-in rivet comprising a polymer. On the lower surface 139 of the cargo shelf 132, the user removably couples the driver side cargo panel 142 and the passenger side cargo panel 143 along the lateral seam 137 of the cargo shelf 132 using threaded fasteners, as shown in FIG. 23.

While the installation instructions have recited installing either a passenger side or a driver side component prior to installing the other side, this order has been provided for illustrative purposes only. Thus, the recitation of installing a driver side component before a passenger side component does not limit the installation to that order unless necessary. Therefore, the user may be able to install a passenger side component prior to installing the driver side component.

Figure 24:
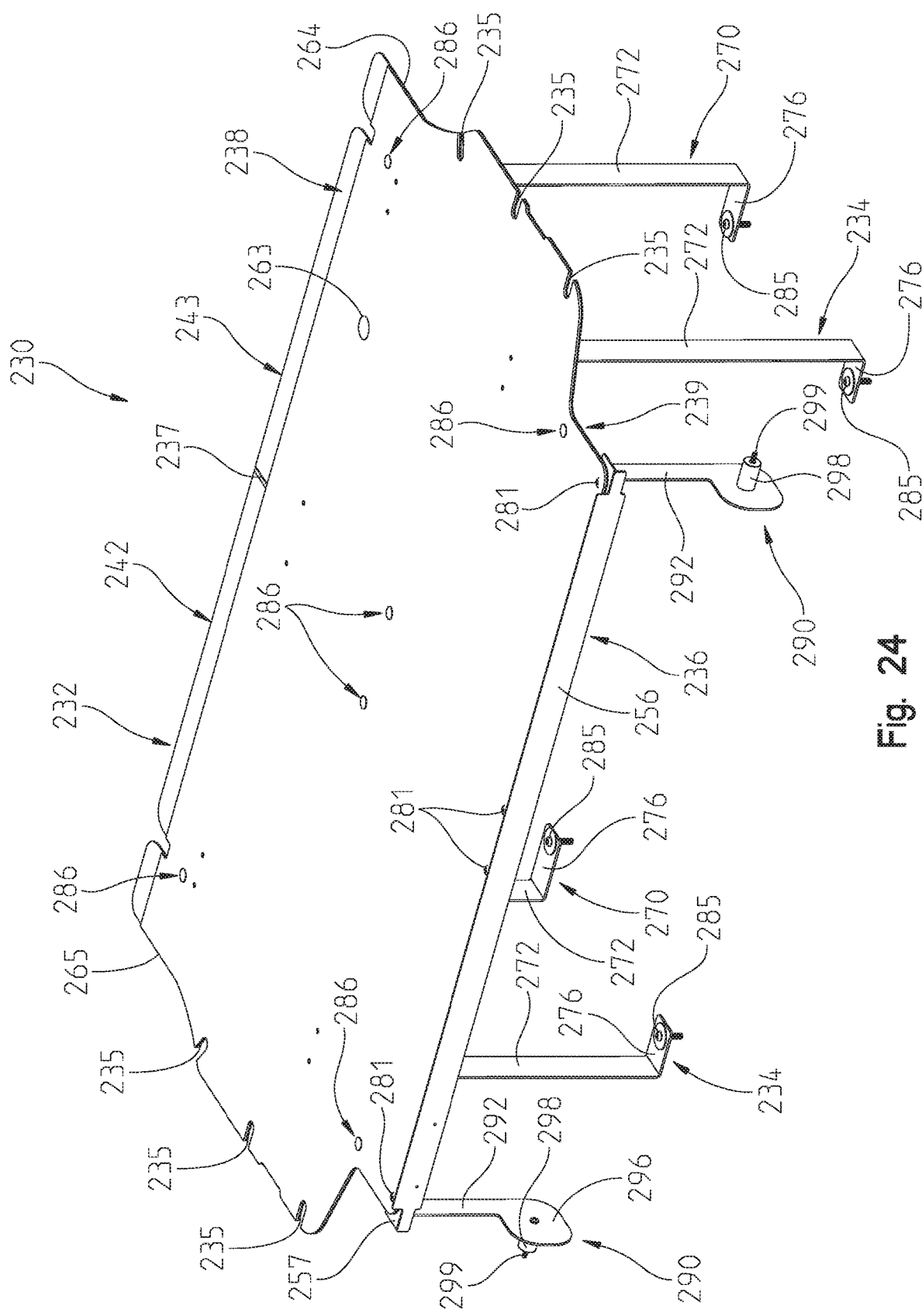
FIG. 24 is a perspective view of another illustrative cargo storage system of the present disclosure.

Referring now to FIG. 24, an illustrative cargo storage system 230 comprises a cargo shelf 232, a plurality of upright support brackets 234, 270, 290 coupled to and extending downwardly from the cargo shelf 232, and a rear cross bracket 236 removably coupled to the cargo shelf 232. In another illustrative embodiment, the plurality of upright support brackets 234, 270, 290 may be tailored to mount within different vehicle types and models. For example, in one illustrative embodiment, cargo storage system 230 is tailored for a 2016 model Chevrolet Tahoe vehicle.

In the illustrative embodiment shown in FIG. 24, the cargo shelf 232 comprises an upper surface 238 and a lower surface 239 opposite the upper surface 238. The upper and lower surfaces 238, 239 illustratively comprise substantially parallel surfaces. In another illustrative embodiment, the cargo shelf 232 comprises a rigid material, such as, for example, steel. In addition, the cargo shelf 232 includes a contoured perimeter 233 defined by a boundary edge of the cargo shelf 232, as illustrated in FIG. 24. The contoured perimeter 233 of the cargo shelf 232 is illustratively configured to at least partially track a contoured interior surface of the rear storage area 12. In this way, the cargo shelf 232 at least appears to be partially form-fitting to the contoured interior surface of the rear storage area 12. Further, the contoured perimeter 233 permits the cargo shelf 232 to fit around interior trim on vehicle frames and extend into window wells.

Additionally, the contoured perimeter 233 of the cargo shelf 232 is illustratively further configured to receive at least a portion of a cargo securing member (not shown). In the illustrative embodiment shown in FIG. 24, the contoured perimeter 233 of the cargo shelf 232 includes at least one relief 235 therein. As illustrated in FIG. 24, the at least one relief 235 includes a generally oblong shape. The cargo securing member illustratively includes a variety of implements used to temporarily secure cargo or other accessories. For example, the cargo securing member may comprise a rope, cord, strap, chain, bungee cord, or other suitable tie-down.

Many cargo securing members include a hook or other curvilinear structure at each end for anchoring the cargo securing member. Because the contoured perimeter 233 of the cargo shelf 232 at least partially tracks the contoured interior surface of the rear storage area 12, sufficient space between the contoured perimeter 233 and the interior surface of the rear storage area 12 may not exist in which to anchor the cargo securing member to the contoured perimeter 232 of the cargo shelf 232. Therefore, the at least one relief 235 provides a location for a user to anchor at least one end of the cargo securing member before securing cargo to the upper or lower surfaces 238, 239 of the cargo shelf 232.

Referring to the illustrative embodiment shown in FIG. 24, the cargo shelf 232 further includes a driver side cargo panel 242 and a passenger side cargo panel 243. The driver side cargo panel 242 is positioned on the driver side 22 of the vehicle 10. Conversely, the passenger side cargo panel 243 is positioned on the passenger side 23 of the vehicle 10. The passenger side cargo panel 243 removably couples to the driver side cargo panel 242 along a lateral seam 237 of the cargo shelf 232. The lateral seam 237 of the cargo shelf 232 is proximate the longitudinal axis 20 of the vehicle 10. In the illustrative embodiment shown in FIG. 24, the lateral seam 237 of the cargo shelf 232 is coaxial to the longitudinal axis 20 of the vehicle 10. In addition, the driver side and passenger side cargo panels 242, 243 are illustratively asymmetrical about the lateral seam 237.

In the illustrative embodiment shown in FIG. 24, the passenger side cargo panel 243 removably couples to the driver side cargo panel 242. More specifically, each of the driver side and passenger side cargo panels 242, 243 illustratively includes a strengthening rib along an edge adjacent the lateral seam 237 of the cargo shelf 232. Illustratively, the strengthening ribs extend generally downwardly and orthogonally from their respective cargo panel 242, 243. In this way, each strengthening rib forms a mating surface that abuts the other when the cargo shelf 232 is installed. Illustratively, each strengthening rib includes at least one aperture configured to receive a fastener.

The illustrative two-piece construction of the cargo shelf 232 shown in FIG. 24 permits a user to install the cargo shelf 232 one panel at a time. This installation method greatly increases the ease of installation. Moreover, the two-piece construction permits the contoured perimeter 233 to more closely track an interior surface of the rear storage area 12, as opposed to a single-piece shelf. That is, the cargo shelf 232 presents an impression that the contoured perimeter 233 is scribed to the contoured interior surface of the rear storage area 12. Although the illustrative embodiment shown in FIG. 24 comprises a cargo shelf 232 including two cargo panels 242 and 243, a cargo shelf comprising more or fewer than two cargo panels is contemplated.

In the illustrative embodiment shown in FIG. 24, the plurality of upright support brackets 234, 270, 290 are removably coupled to and extend outwardly from the lower surface 239 of the cargo shelf 232. In addition, at least one end of the plurality of upright support brackets 234, 270, 290 is configured to removably couple to a portion of the vehicle 10. The plurality of upright support brackets 234, 270, 290 removably couple to vehicle 10 using existing mounting points. In this way, the plurality of upright support brackets 234, 270, 290 may be easily and securely fastened to the vehicle 10. Moreover, while the embodiment shown in FIG. 24 removably couples to the vehicle 10 using threaded fasteners such as bolts or screws, the plurality of upright support brackets 234, 270, 290 may be attached to vehicle 10 using a variety of securing methods known in the art.

Referring to the illustrative embodiment shown in FIG. 24, the plurality of upright support brackets 234, 270, 290 comprises six upright support brackets. More specifically, the illustrative embodiment shown in FIG. 15 comprises two front upright support brackets 270, two center upright support brackets 234, and two rear support brackets 290. In the illustrative embodiment of FIG. 15, the two front upright support brackets 270 are removably coupled to a front portion of the lower surface 239 of the cargo shelf 232. In addition, the two center upright support brackets 234 are removably coupled to an intermediate portion of the lower surface 239 of the cargo shelf 232. Further, the two rear support brackets 290 are removably coupled to a rear portion of the lower surface 239 of the cargo shelf 232.

Figure 25:
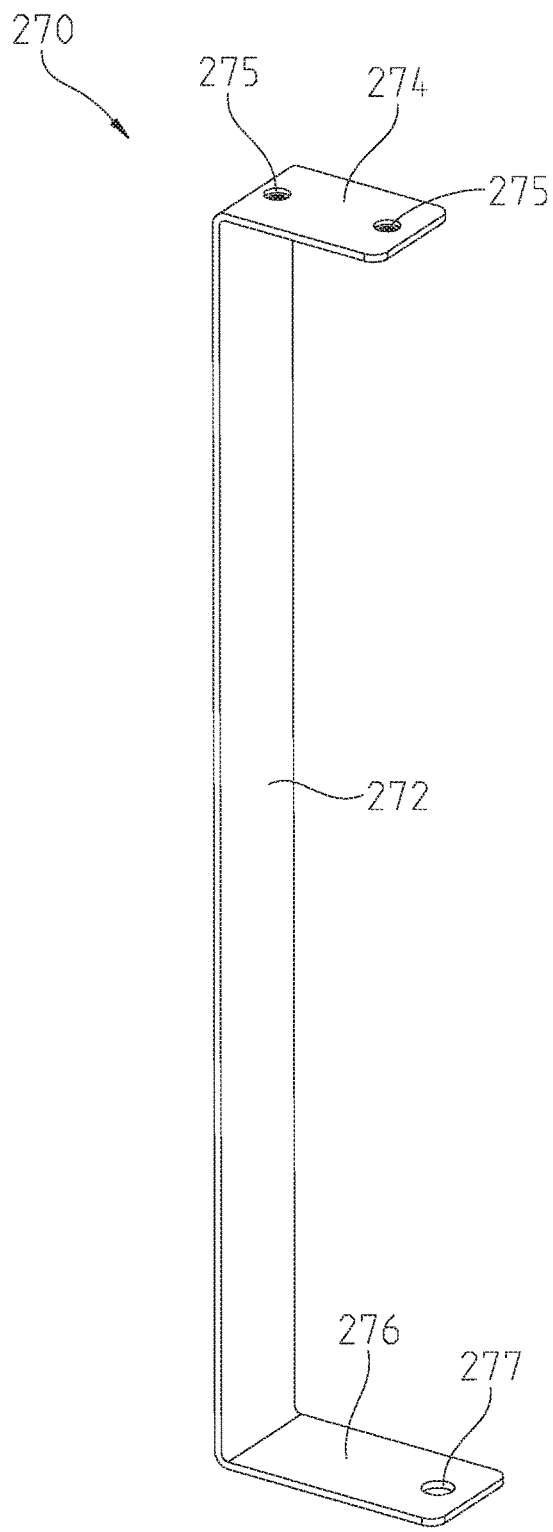
FIG. 25 is a perspective view of an illustrative front upright support bracket of the cargo storage system of FIG. 24.
Figure 26:
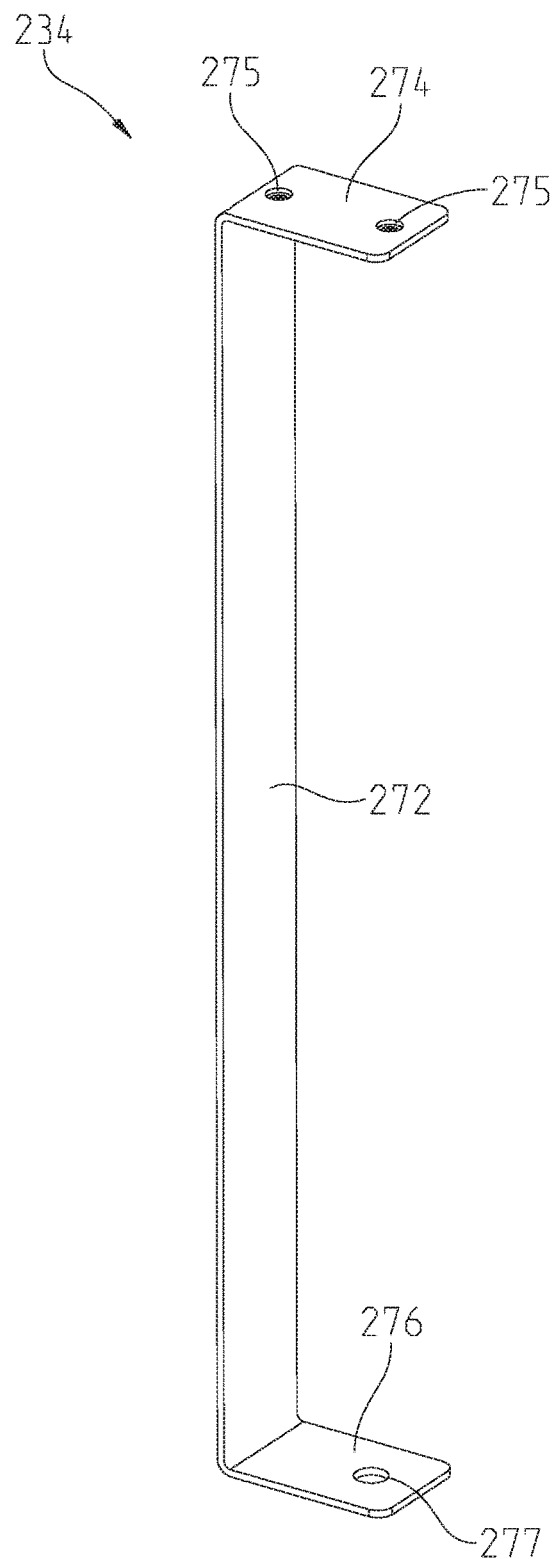
FIG. 26 is a perspective view of an illustrative center upright support bracket of the cargo storage system of FIG. 24.

The two front upright support brackets 270 and the two center upright support brackets 234 of FIGS. 25 and 26 illustratively comprise a generally C-shaped profile. That is, the front upright support brackets 270 and the center upright support brackets 234 include an elongated stem 272 extending generally downwardly from the cargo shelf 232. Each of the front upright support brackets 270 and the center upright support brackets 234 further includes an upper leg 274 integrally formed with a first end of the elongated stem 272. Further, each of the front upright support brackets 270 and the center upright support brackets 234 includes a lower leg 276 integrally formed with the elongated stem 272 opposite the upper leg 274. In the illustrative embodiment shown in FIG. 24, the upper and lower legs 274, 276 extend generally orthogonally from the elongated stem 272 generally towards the longitudinal axis 20 of the vehicle 10.

Figure 32:
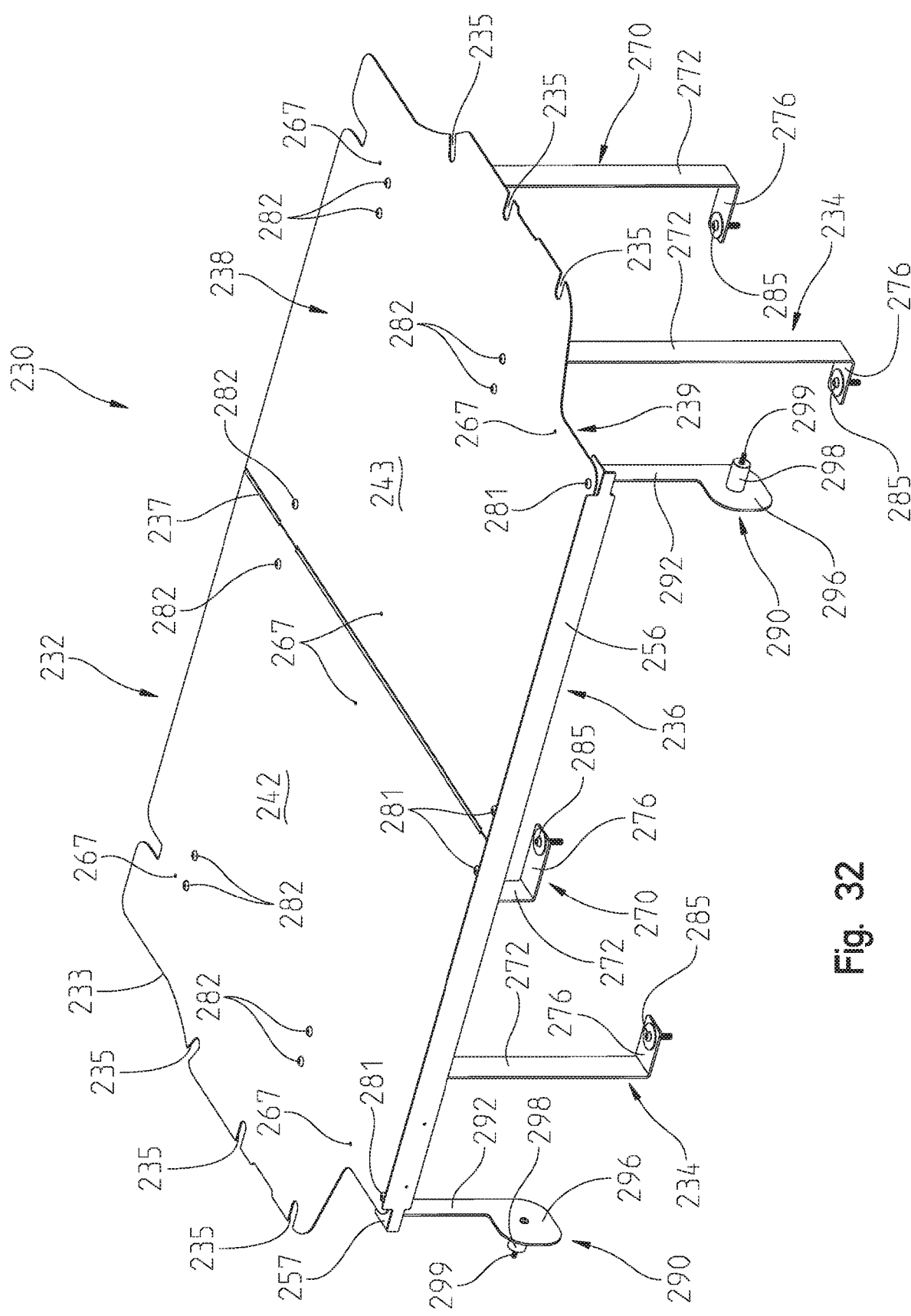
FIG. 32 is a perspective view of an illustrative step of installing an exemplary driver side cargo panel and an exemplary passenger side cargo panel of the cargo storage system of FIG. 24.

The upper legs 274 illustratively include at least one aperture 275 configured to receive a fastener 282 (see FIG. 32). Further, the lower legs 276 illustratively include at least one aperture 277 configured to receive a fastener 285 (see FIG. 24). In this way, a user may securely fasten the cargo shelf 232 to both the front upright support brackets 270 and the center upright support brackets 234. Moreover, the user may securely fasten the front upright support brackets 270 and the center upright support brackets 234 directly or indirectly to existing mounting points within the vehicle 10.

Figure 27:
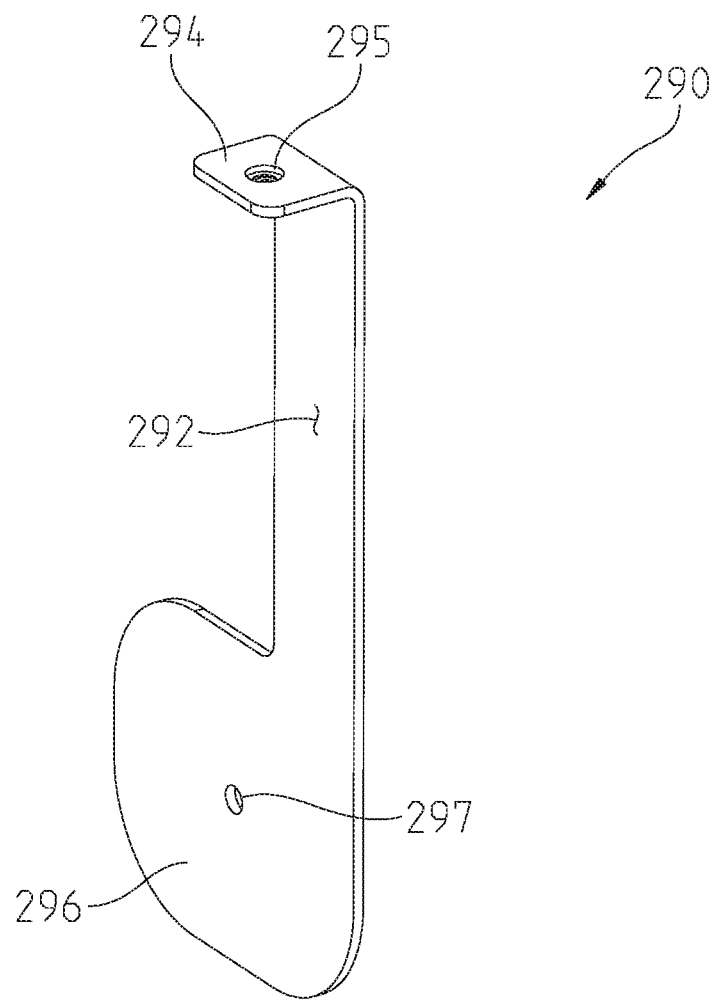
FIG. 27 is a perspective view of an illustrative rear support bracket of the cargo storage system of FIG. 24.

The rear support brackets 290 of FIG. 27 illustratively include an elongated stem 292 extending generally downwardly from the cargo shelf 232. The rear support brackets further include a mounting tab 294 integrally formed with a first end of the elongated stem 292 and extending generally orthogonally therefrom. Moreover, the mounting tab 294 illustratively includes at least one aperture 295 configured to receive a fastener 281 (see FIG. 24). In this way, a user may securely fasten the cargo shelf 232 to the rear support bracket 290.

In addition, the rear support brackets 290 include a securing flange 296 integrally formed with the elongated stem 292 opposite the mounting tab 294. In the illustrative embodiment of FIG. 24, the securing flange 296 extends from the elongated stem 292 in a direction parallel to the longitudinal axis 20 of the vehicle 10. Additionally, the securing flange 296 illustratively includes at least one aperture 297 configured to receive a fastener 299. Thus, a user may securely fasten the rear support bracket 290 to existing mounting points within the vehicle 10.

Depending on the type and model of the vehicle 10, a spacer 298 may be necessary to fill the distance between the securing flange 296 and an existing mounting point within the vehicle 10. In the illustrative embodiment of FIG. 24, the spacer 298 comprises a polymer. The spacer 298, however, may comprise any material suitable for bridging the distance between the securing flange 296 and an existing mounting points within the vehicle 10, including, for example, ceramics, composites, ferrous or non-ferrous metals, or elastomers.

Figure 28:
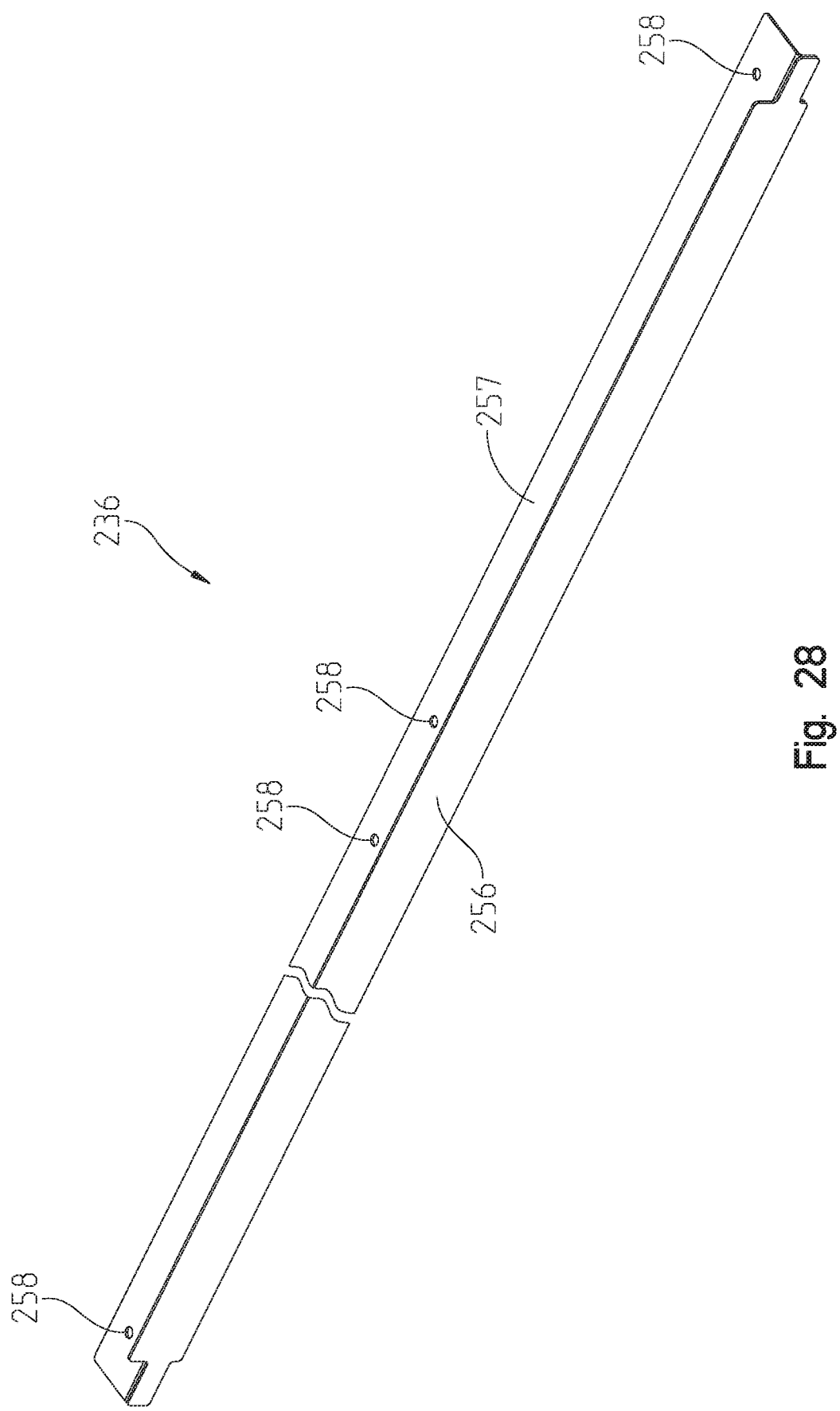
FIG. 28 is a perspective view of an illustrative rear cross bracket of the cargo storage system of FIG. 24.

In the illustrative embodiment shown in FIG. 28, a rear cross bracket 236 is illustratively coupled to a rear portion of the lower surface 239 of the cargo shelf 232. The rear cross bracket 236 illustratively comprises an elongated unitary body with a lateral cross-section having a generally T-shaped configuration. As illustrated in FIG. 28, the generally T-shaped configuration of the lateral cross-section includes a cap 256 coupled generally orthogonally to a stem 257. A portion of the cap 256 extends beyond the upper surface 238 of the cargo shelf 232. In one illustrative embodiment, the cap 256 extends beyond the upper surface 238 of the cargo shelf 232 and helps to prevent unsecured cargo stored on the upper surface 238 from striking the rear hatch 21 due to a change in the movement of the vehicle 10. Further, the rear cross bracket 236 illustratively comprises a narrowed section at each end, as shown in FIGS. 24 and 28.

In addition, the stem 257 is removably coupled to a rear portion of the lower surface 239 of the cargo shelf 232. In the illustrative embodiment shown in FIG. 28, the stem 257 illustratively includes at least one aperture 258 configured to receive a fastener 281 (see FIG. 24). In this way, a user may securely fasten the rear cross bracket 236 to the cargo shelf 232. Thus, the rear cross bracket 236 at least strengthens a rear portion of the cargo shelf 232 along its length.

Figure 29:
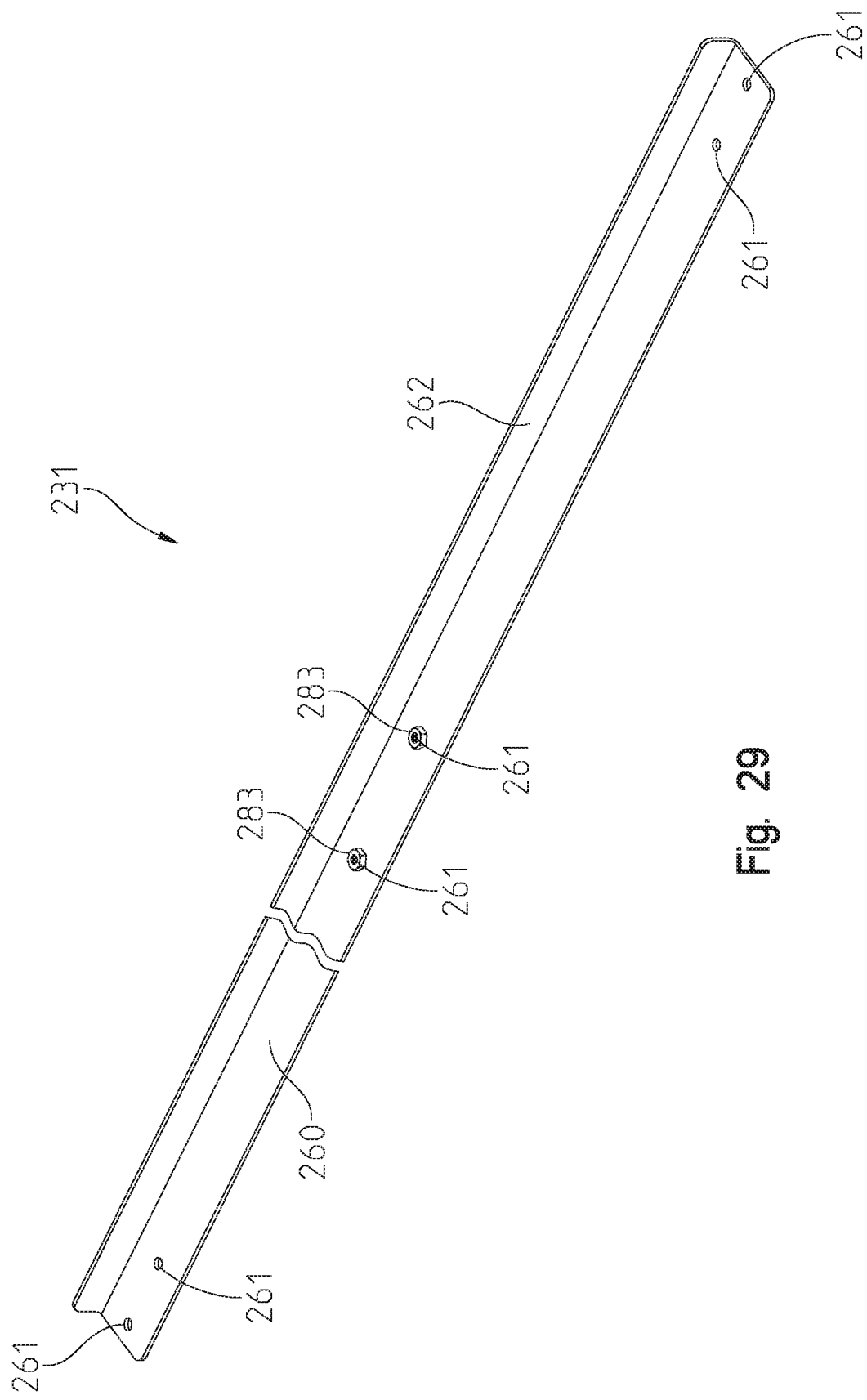
FIG. 29 is a perspective view of an illustrative front cross bracket of the cargo storage system of FIG. 24.

In the illustrative embodiment of FIG. 29, the cargo storage system further illustratively includes a front cross bracket 231 removably coupled to the cargo shelf 232. As shown in FIG. 24, the front cross bracket 231 illustratively extends from the driver side 22 to the passenger side 23 of vehicle 10. Further, the front cross bracket 231 removably couples to the front upright support brackets 270 at each end of the front cross bracket 231. In this way, the front cross bracket 231 at least strengthens a front portion of the cargo shelf 232 along its length proximate the position of the front upright support brackets 270.

In addition, the front cross bracket 231 illustratively comprises a lateral cross-section having a substantially L-shaped configuration. More specifically, the front cross bracket 231 comprises a mounting flange 260 and a strengthening flange 262 integrally formed with the mounting flange 260, as illustrated in FIG. 29. In the illustrative embodiment of FIG. 24, the strengthening flange 262 extends orthogonally downwardly from the mounting flange 260. This orientation of the strengthening flange 262 strengthens at least a front portion of the cargo shelf 232 along its length. Moreover, the mounting flange 260 illustratively includes at least one aperture 261 configured to receive a fastener 282. At least one of the apertures 261 may include a weldnut 283 for securing a threaded fastener. Thus, a user may securely fasten the front cross bracket 261 to the cargo shelf 232.

Referring to FIG. 24, the cargo storage system 230 illustratively further includes a mat 263 positioned adjacent to and supported by an upper surface 238 of the cargo shelf 232. As shown in FIG. 24, the mat 263 illustratively includes an exterior boundary 265 defined by an outer edge 264 of the mat 263. The exterior boundary 265 of the mat 263 at least partially mirrors the contoured perimeter 233 of the cargo shelf 232. Moreover, the exterior boundary 265 is illustratively proximate the contoured perimeter 233.

In the illustrative embodiment of FIG. 24, the mat 263 removably couples to the cargo shelf 232. Both the cargo shelf 232 and the mat 263 include at least one hole 267 (see FIG. 32) configured to receive a fastener 286 for securing the mat 263 to the cargo shelf 232. In the illustrative embodiment shown in FIG. 24, the cargo shelf 232 comprises a first material and the mat 263 comprises a second material softer than the first material. More specifically, the mat 263 illustratively comprises a heavy-duty elastomer.

Figure 30:
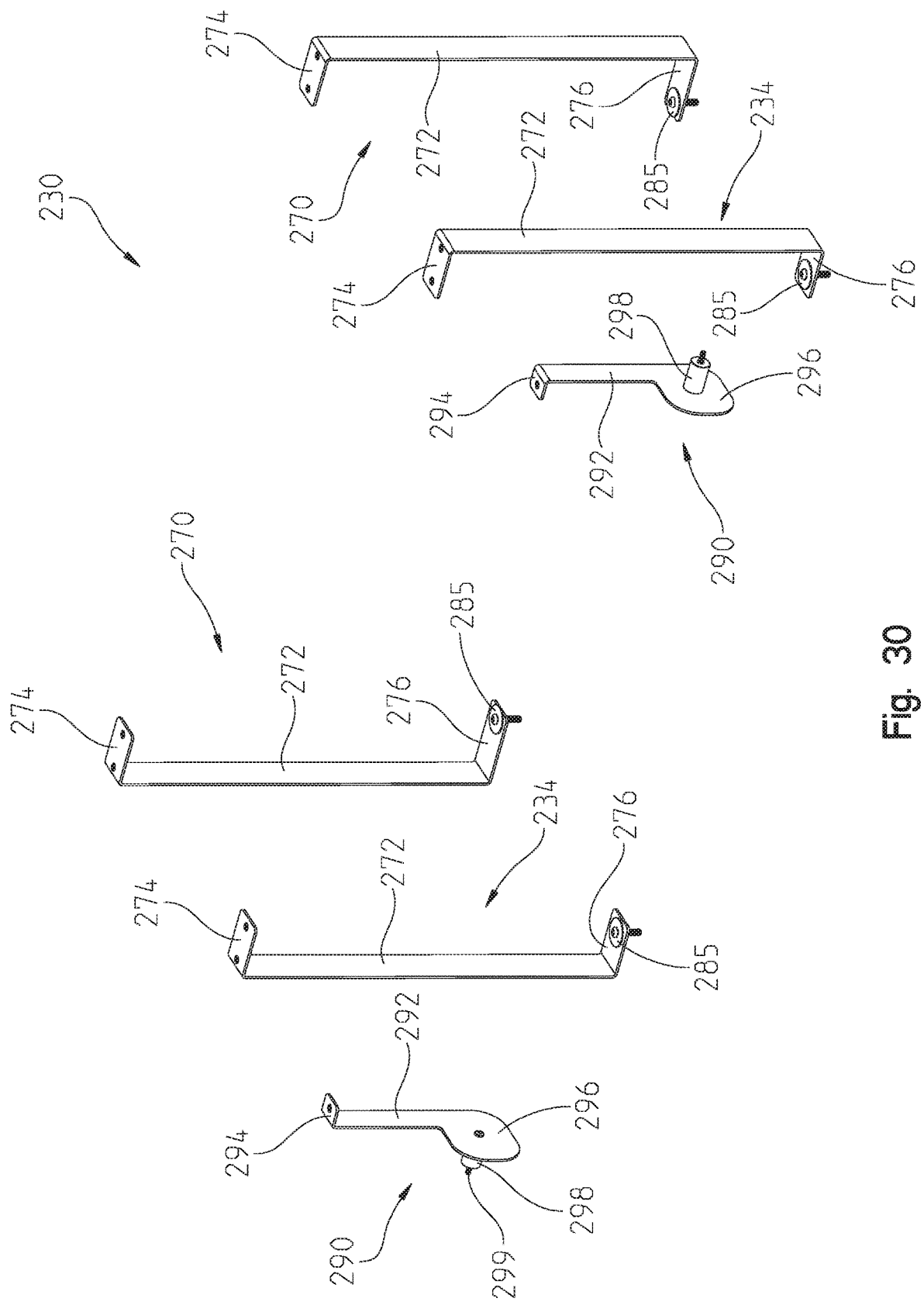
FIG. 30 is a perspective view of an illustrative step of installing the front upright support brackets, the center upright support brackets, and the rear support brackets of the cargo storage system of FIG. 24.

The design of the illustrative embodiment of FIG. 24 permits a user to easily and efficiently install the cargo storage system. As partially illustrated in FIG. 30, the user begins by placing one of the front upright support brackets 270 and one of the center upright support brackets 234 on the driver side 22 of the rear storage area 12 of the vehicle 10. The user removably couples the lower leg 276 of the front upright support bracket 270 and the lower leg 276 of the center upright support bracket 234 to existing mounting points in the floor 17 of the vehicle 10. The user then repeats the process for the remaining one of the front upright support brackets 270 and the remaining one of the center upright support brackets 234 on the passenger side 23 of the vehicle 10.

The user securely mounts one of the rear support brackets 290 in place of a driver side rear cargo hook (not shown). In the illustrative embodiment of FIG. 30, the user places the spacer 298 between the driver side rear cargo hook mounting hole and the securing flange 296 of the rear support bracket 290. The spacer 298 illustratively fills the trim indentation (not shown) for the driver side rear cargo hook. The user then repeats the process for the remaining rear support bracket 290 on the passenger side 23 of the vehicle 10.

Figure 31:
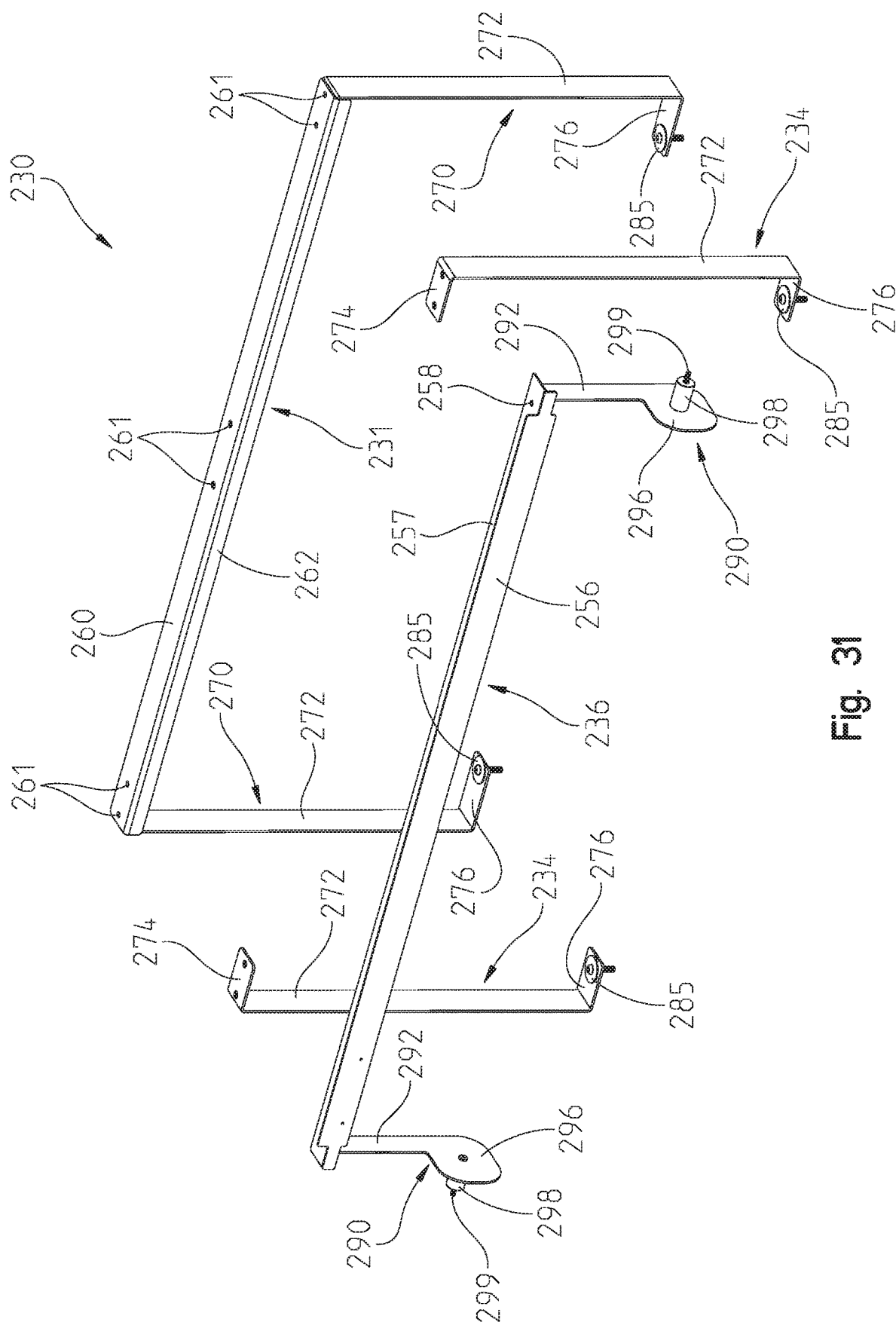
FIG. 31 is a perspective view of an illustrative step of installing the front cross bracket and the rear cross bracket of the cargo storage system of FIG. 24.

As illustrated in FIG. 31, the user positions the front cross bracket 231 into place over the upper leg 274 of the front upright support brackets 270. The user then positions the rear cross bracket 236 into place over the mounting tab 294 of the rear support brackets 290. Once the front cross bracket 231 and the rear cross bracket 236 are aligned with their respective support brackets 270, 290, the user illustratively places the driver side cargo panel 242 over the front cross bracket 231, the rear cross bracket 236, the front upright support brackets 270, and the center upright support brackets 234 on the driver side 22 of the vehicle 10. As illustrated in FIG. 32, the user illustratively couples the driver side cargo panel 242 to the front cross bracket 231, the rear cross bracket 236, the front upright support brackets 270, and the center upright support brackets 234 using threaded fasteners. Once the driver side cargo panel 242 is installed, the user repeats the process for the passenger side 23 of the vehicle 10 using the passenger side cargo panel 243. The front upright support brackets 270, the center upright support brackets 234, and the rear support brackets 290 include weldnuts 241 for securing threaded fasteners.

In the illustrative embodiment of FIG. 24, the user places the mat 263 adjacent the upper surface 238 of the cargo shelf 232 and aligns the mat 263 with the cargo shelf 232. As illustrated in FIG. 24, the user inserts a fastener 286 in each of the remaining holes 267 on the upper surface 238 of the cargo shelf 232 and the mat 263 to secure the mat 263 to the cargo shelf 232. The fastener 286 shown in FIG. 24 is illustratively a push-in rivet comprising a polymer. On the lower surface 239 of the cargo shelf 232, the user removably couples the driver side cargo panel 242 and the passenger side cargo panel 243 along the lateral seam 237 of the cargo shelf 232 using threaded fasteners.

While the installation instructions have recited installing either a passenger side or a driver side component prior to installing the other side, this order has been provided for illustrative purposes only. Thus, the recitation of installing a driver side component before a passenger side component does not limit the installation to that order unless necessary. Therefore, the user may be able to install a passenger side component prior to installing the driver side component.

Figure 33:
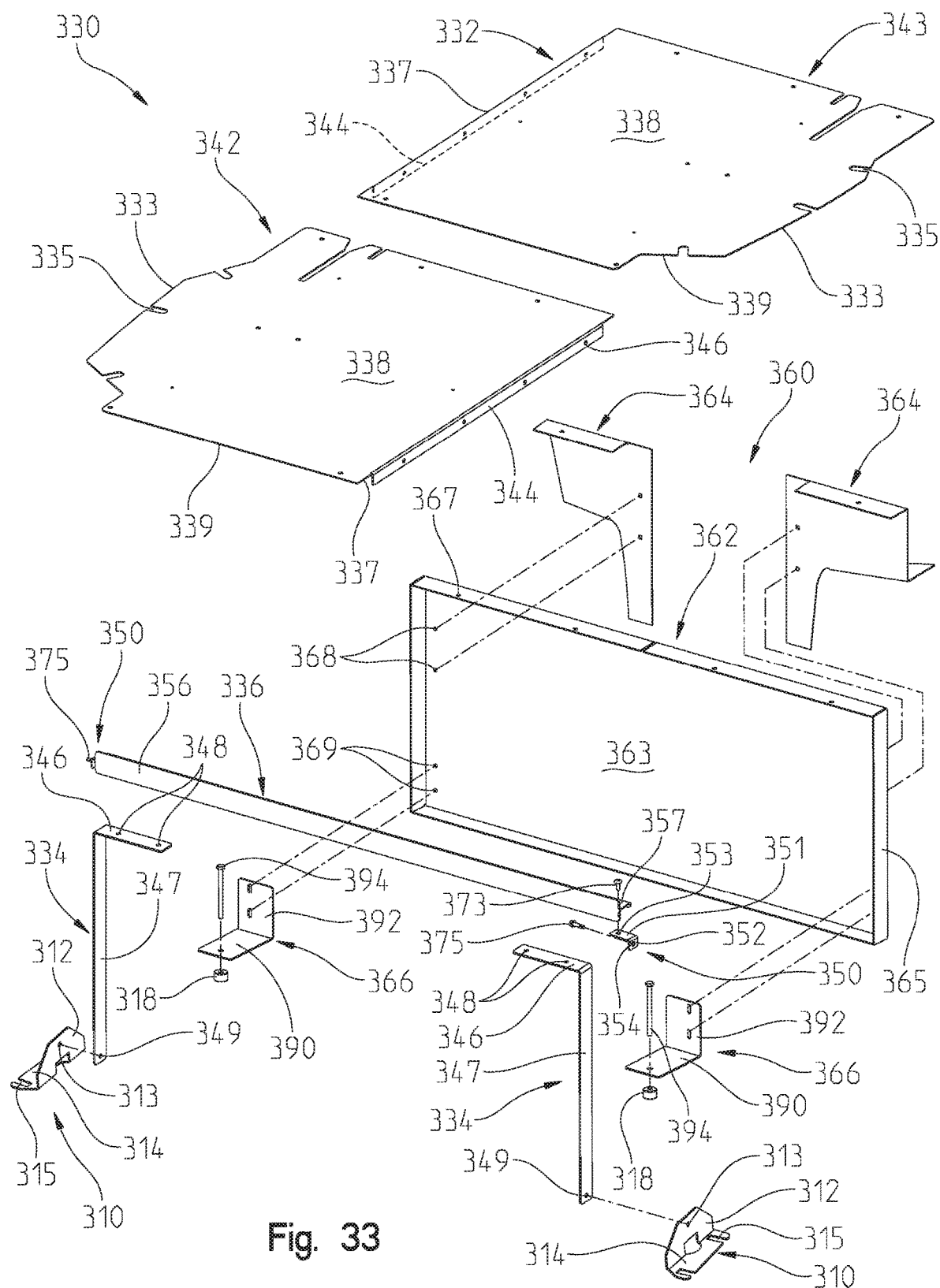
FIG. 33 is an exploded perspective view of another illustrative cargo storage system of the present disclosure.
Figure 36:
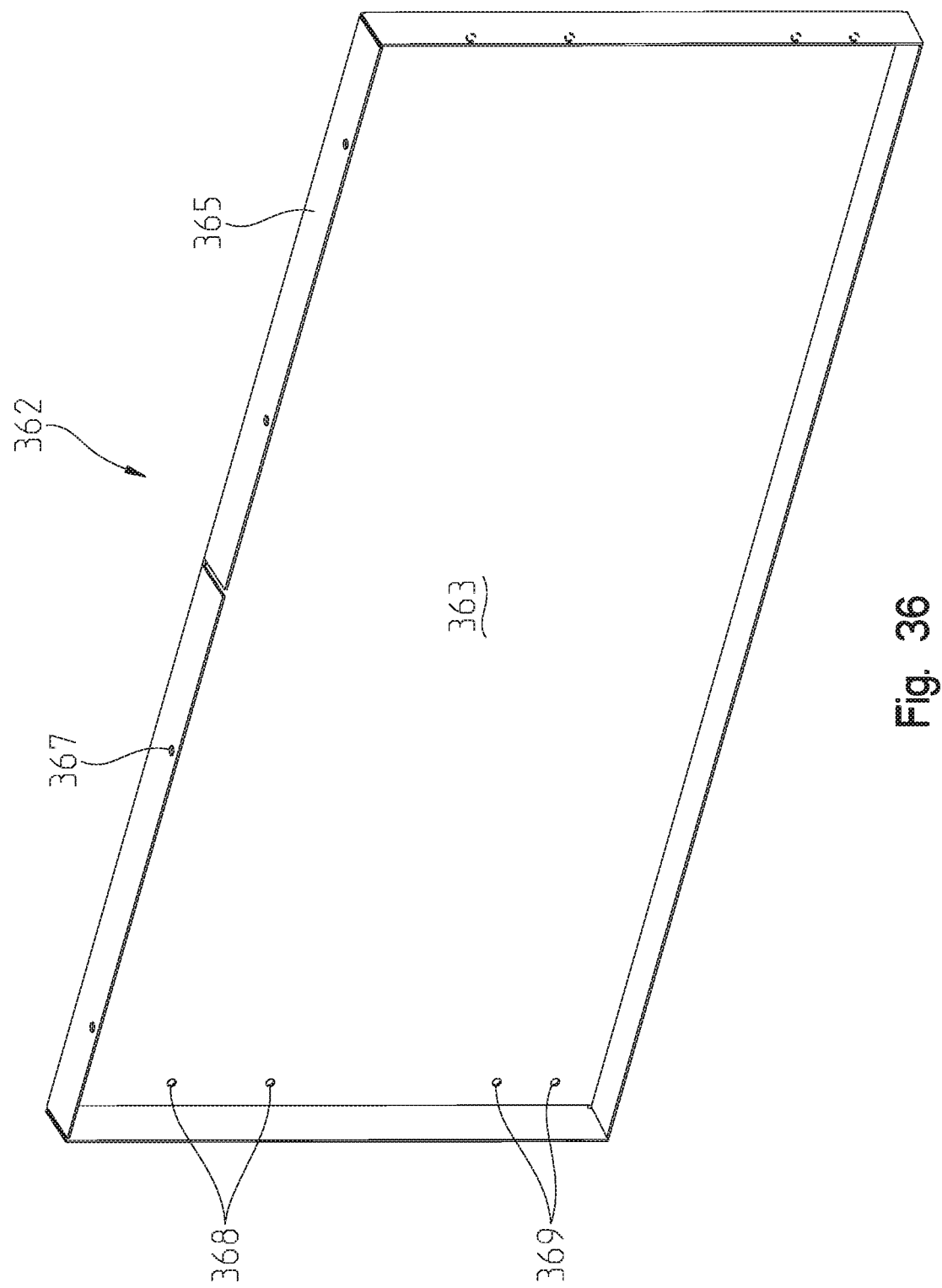
FIG. 36 is a rear perspective view of a middle partition of the cargo storage system of FIG. 33.
Figure 37:
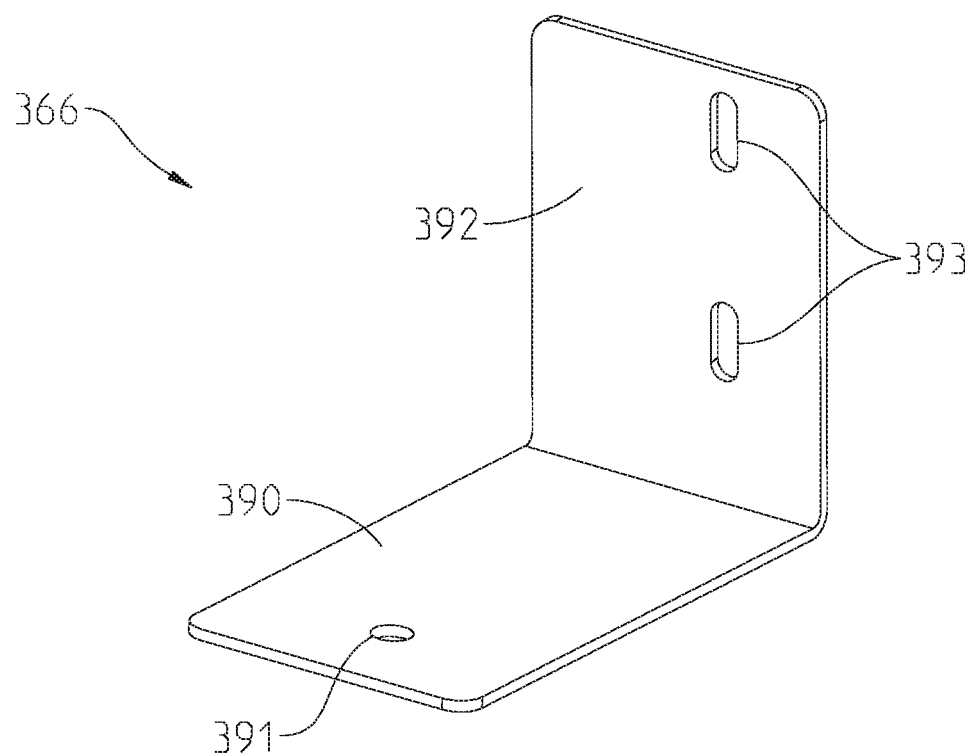
FIG. 37 is a perspective view of a floor bracket of the cargo storage system of FIG. 33.
Figure 38:
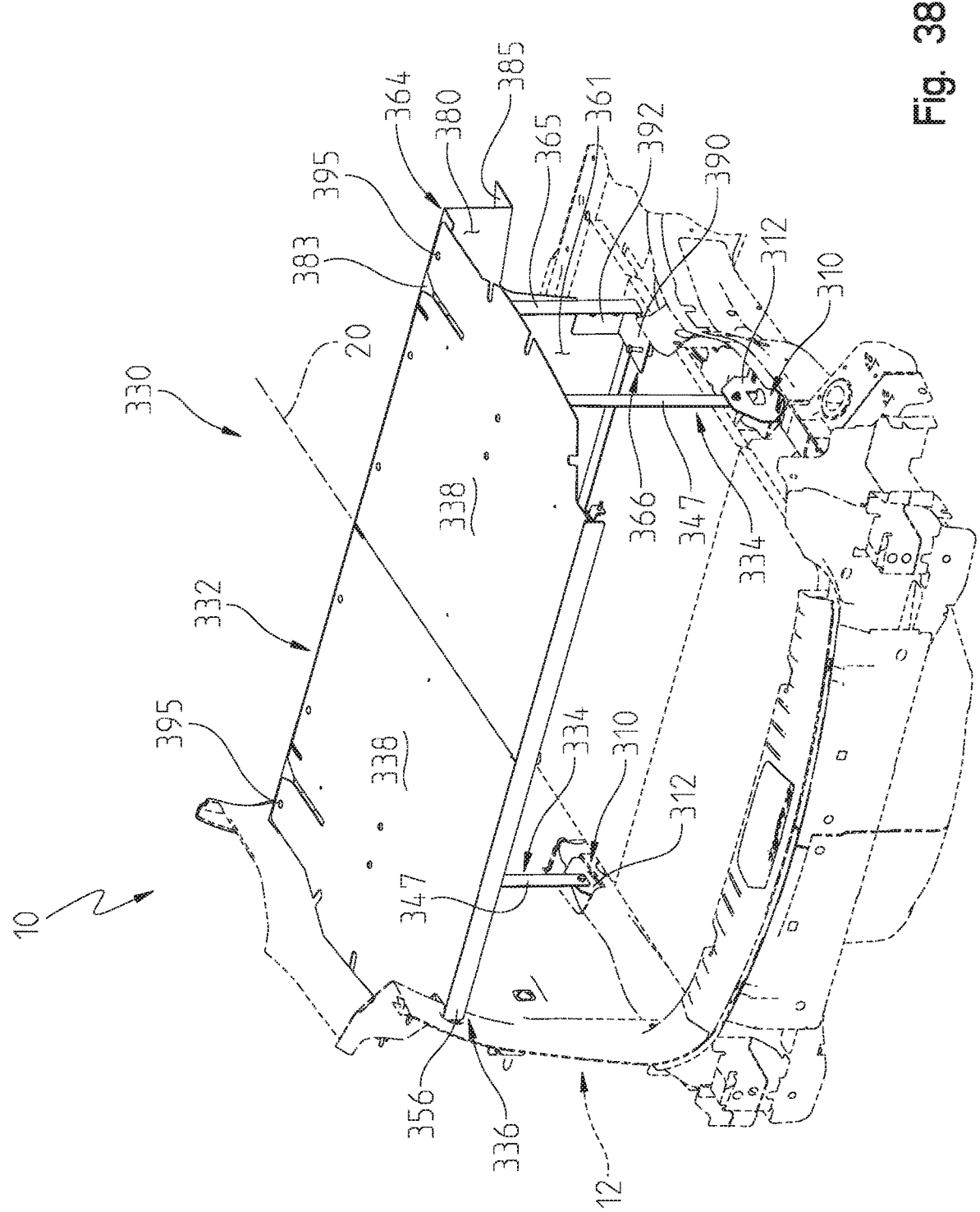
FIG. 38 is a rear perspective view of the cargo storage system of FIG. 33 installed in a rear storage area of a vehicle, shown with the rear storage area in phantom.
Figure 39:
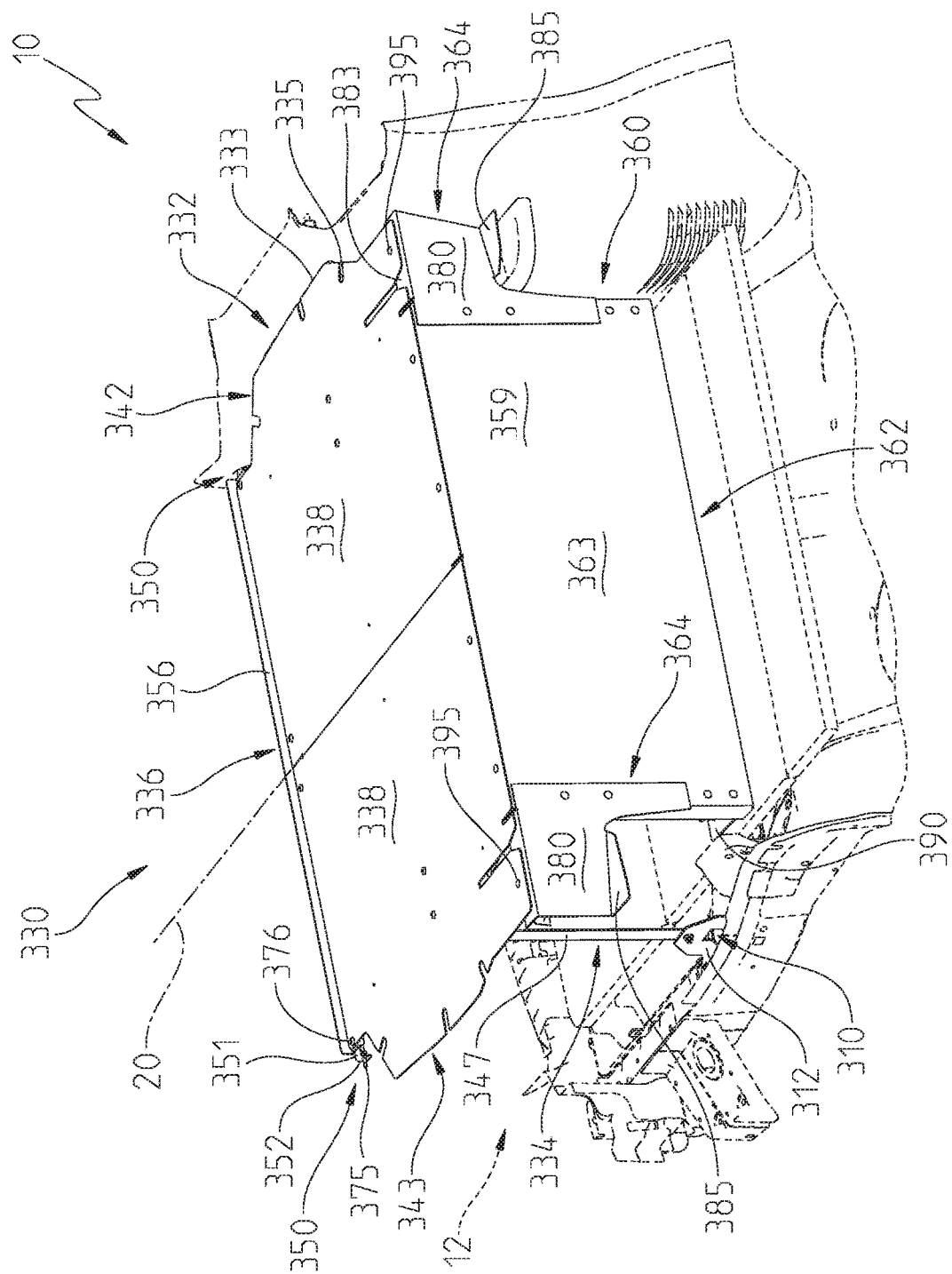
FIG. 39 is a front perspective view of the cargo storage system of FIG. 33 installed in the rear storage area of a vehicle, shown with the rear storage area in phantom.

Referring now to FIGS. 33-39, an illustrative cargo storage system 330 comprises a cargo shelf 332 having an upper surface 338 and a lower surface 339 opposite the upper surface 338. The upper and lower surfaces 338, 339 illustratively comprise substantially parallel surfaces. In another illustrative embodiment, the cargo shelf 332 comprises a rigid material, such as, for example, steel. In addition, the cargo shelf 332 includes a contoured perimeter 333 defined by a boundary edge of the cargo shelf 332, as illustrated in FIG. 33. The contoured perimeter 333 of the cargo shelf 332 is illustratively configured to at least partially track a contoured interior surface of the rear storage area 12. In this way, the cargo shelf 332 at least appears to be partially form-fitting to the contoured interior surface of the rear storage area 12. Further, the contoured perimeter 333 permits the cargo shelf 332 to fit around interior trim on vehicle frames and extend into window wells, as illustrated in FIGS. 38 and 39.

Additionally, the contoured perimeter 333 of the cargo shelf 332 is illustratively further configured to receive at least a portion of a cargo securing member (not shown). In the illustrative embodiment shown in FIG. 33, the contoured perimeter 333 includes at least one relief 335 therein. The at least one relief 335 illustratively includes a generally oblong shape. The cargo securing member illustratively includes a variety of implements used to temporarily secure cargo or other accessories. For example, the cargo securing member may comprise a rope, cord, strap, chain, bungee cord, or other suitable tie-down.

Many cargo securing members include a hook or other curvilinear structure at each end for anchoring the cargo securing member. Because the contoured perimeter 333 of the cargo shelf 332 at least partially tracks the contoured interior surface of the rear storage area 12, sufficient space between the contoured perimeter 333 and the interior surface of the rear storage area 12 may not exist in which to anchor the cargo securing member to the contoured perimeter 333 of the cargo shelf 332. Therefore, the at least one relief 335 provides a location for a user to anchor at least one end of the cargo securing member before securing cargo to either the upper or lower surfaces 338, 339 of the cargo shelf 332.

In the illustrative embodiment shown in FIG. 33, the cargo shelf 332 further includes a driver side cargo panel 342 and a passenger side cargo panel 343. The driver side cargo panel 342 is positioned on the driver side 22 of the vehicle 10. Conversely, the passenger side cargo panel 343 is positioned on the passenger side 23 of the vehicle 10. The passenger side cargo panel 343 removably couples to the driver side cargo panel 342 along a lateral seam 337 of the cargo shelf 332. The lateral seam 337 is proximate the longitudinal axis 20 of the vehicle 10. In the illustrative embodiment shown in FIG. 33, the lateral seam 337 of the cargo shelf 332 is coaxial to the longitudinal axis 20 of the vehicle 10. In addition, the driver side and passenger side cargo panels 342, 343 are illustratively asymmetrical about the lateral seam 337 (e.g., the left and right sides of the longitudinal axis 20).

Each of the driver side and passenger side cargo panels 342, 343 illustratively includes a strengthening rib or lip 344 along an edge adjacent the lateral seam 337 of the cargo shelf 332. Illustratively, the strengthening ribs 344 extend generally downwardly and orthogonally from their respective cargo panels 342, 343. In this way, the strengthening ribs 344 form a mating surface that abuts the other when the cargo shelf 332 is installed. In the illustrative embodiment shown in FIG. 33, each strengthening rib 344 includes at least one aperture 346 configured to receive a fastener (not shown).

The illustrative two-piece construction of the cargo shelf 332 shown in FIG. 33 permits a user to install the cargo shelf 332 one panel at a time. This installation method increases the ease of installation. Moreover, the two-piece construction permits the contoured perimeter 333 to more closely track an interior surface of the rear storage area 12, as opposed to a single-piece shelf. That is, the cargo shelf 332 presents an impression that the contoured perimeter 333 is scribed to the contoured interior surface of the rear storage area 12. Although the illustrative cargo storage system 330 shown in FIG. 33 comprises a cargo shelf 332 including two cargo panels 342, 343, a cargo shelf comprising more or fewer than two cargo panels is contemplated.

In the illustrative embodiment shown in FIG. 33, a plurality of upright support brackets 334 are removably coupled to and extend outwardly (e.g., downwardly) from the lower surface 339 of the cargo shelf 332. In addition, at least one end (e.g., a lower end of the lower leg 347) of the plurality of upright support brackets 334 is configured to removably couple to a portion of the vehicle 10. The plurality of upright support brackets 334 illustratively couple to the vehicle 10 using existing mounting points. In this way, the plurality of upright support brackets 334 may be easily and securely fastened to the vehicle 10. Moreover, while the cargo storage system 330 shown in FIGS. 33-39 removably couples to the vehicle 10 using threaded fasteners such as bolts or screws, the plurality of upright support brackets 334 may be attached to vehicle 10 using a variety of securing methods known in the art.

Referring to the illustrative embodiment shown in FIG. 33, the plurality of upright support brackets 334 includes two upright support brackets. The upright support brackets 334 are illustratively positioned adjacent opposing sides of cargo panels 342, 343 proximate rear portions thereof. The upright support brackets 334 illustratively comprise a generally L-shaped profile. That is, each of the upright support brackets 334 comprise a first or short leg 346 integrally formed with a second or long leg 347. In the illustrative embodiment shown, the short leg 346 is generally orthogonal to the long leg 347. More specifically, the short leg 346 illustratively extends in a horizontal direction and the long leg 347 extends in a vertical direction. Additionally, the short leg 346 illustratively further includes at least one aperture 348 configured to receive a fastener (not shown). The at least one aperture 348 may include a corresponding weldnut (not shown) for securing a fastener, particularly a threaded fastener such as, for example, a bolt or screw, to the upright support bracket 334 to the cargo shelf 332. The long leg 347 illustratively extends generally downwardly from the lower surface 339 of the cargo shelf 332 and includes at least one aperture 349 configured to receive a fastener (not shown) opposite the short leg 346. More particularly, the at least one aperture 349 of the long leg 347 illustratively receives a fastener (not shown) for securely mounting the upright support bracket 334 to the vehicle 10.

In the illustrative embodiment of FIG. 33, the cargo shelf 332 system further includes two rear barrier mount brackets 310. The rear barrier mount brackets 310 removably couple to existing mounting points (shown in FIG. 38) within the vehicle 10. The rear barrier mount brackets 310 illustratively include a vertical upper mounting flange 312 and a horizontal lower mounting flange 314 integrally formed therewith. The lower mounting flange 314 includes at least one aperture (e.g., an elongated slot) 315 for removably coupling the lower mounting flange 314 to the existing mounting points within the vehicle 10. Additionally, the upper mounting flange 312 illustratively includes at least one aperture 313 configured to receive a fastener (not shown) for removably coupling one of the upright support brackets 334 thereto via aperture 349. In this way, a user may securely fasten the upright support brackets 334 to the rear barrier mount brackets 310, which are securely fastened to the existing mounting points within the vehicle 10. In the illustrative embodiment shown, the upright support brackets 134 are securely fastened to the respective upper mounting flange 312. In turn, the lower mounting flange 314 is securely fastened to the existing mounting points within the vehicle 10.

In the illustrative embodiment shown in the FIG. 33, the cargo storage system 330 illustratively further includes at least one shelf support bracket 350 removably coupled to at least one of a rear cross bracket 336 and the cargo shelf 332. The shelf support bracket 350 illustratively includes a generally L-shaped profile comprising a horizontal long leg 351 and a vertical short leg 352 integrally formed therewith. In the illustrative embodiment shown in FIG. 33, the long leg 351 of the shelf support bracket 350 includes at least one aperture 353 configured to receive a fastener 373 for securing the shelf support bracket 350 to at least one of the rear cross bracket 336 and the cargo shelf 332. Further, the short leg 352 of the shelf support bracket 350 includes at least one aperture 354 configured to receive a fastener 375 for securely mounting the shelf support bracket 350 to an existing mounting point within the vehicle 10. The shelf support bracket 350 securely links a rear portion of the lower surface 339 of the cargo shelf 332 to the vehicle 10.

In the illustrative embodiment shown in FIG. 33, the rear cross bracket 336 is illustratively coupled to a rear portion of the lower surface 339 of the cargo shelf 332. The rear cross bracket 336 illustratively comprises an elongated unitary body with a lateral cross-section having a generally T-shaped configuration. As illustrated in FIG. 33, the generally T-shaped configuration of the lateral cross-section includes a cap 356 coupled generally orthogonally to a stem 357. A portion of the cap 356 extends beyond the upper surface 338 of the cargo shelf 332. In one illustrative embodiment, the cap 356 extends upwardly beyond the upper surface 338 of the cargo shelf 332 and helps to prevent unsecured cargo stored on the upper surface 338 from striking the rear hatch 21 due to a change in the movement of the vehicle 10.

In addition, the stem 357 is removably coupled to a rear portion of the lower surface 339 of the cargo shelf 332. The stem 357 illustratively includes at least one aperture (not shown) configured to receive a fastener 376 (see FIG. 39). In this way, a user may securely fasten the rear cross bracket 336 to the cargo shelf 332. Thus, the rear cross bracket 336 at least strengthens a rear portion of the cargo shelf 32 along the length of the rear cross bracket 336.

The cargo storage system 330 further illustratively includes a partition 360 removably coupled to a front portion of the cargo shelf 332 and the floor 17 of the vehicle 10. The partition 360 at least partially physically separates at least a portion of the rear seating area 18 and the rear storage area 12 of the vehicle 10. Moreover, the partition 360 illustratively includes a first generally planar surface 359 (see FIG. 39) facing the rear seating area 18 and a second generally planar surface 361 (see FIG. 38) opposite the first surface 359 and facing the rear storage area 12. An advantage, among others, of the partition 360 is that a user may fold down or store any seats in the rear seating area 18 while still providing a secured lower storage compartment 29 without a separate partition or barrier. In the exemplary embodiment shown, the partition 360 includes a central partition 362 and driver and passenger side partitions 364 removably coupled to the central partition 362. While partition 360 has been shown comprising multiple pieces, it is contemplated that partition 360 may be formed from a single, unitary piece or from more or fewer than the pieces shown in FIGS. 33-39.

Turning now to FIG. 36, the central partition 362 illustratively comprises a generally rectangular body 363 having an outer lip 365 extending generally perpendicular to and around the periphery of the body 363. Illustratively, the body 363 extends laterally from the driver side 22 to the passenger side 23 of the vehicle 10. The lip 365 defines an outer perimeter of the body 363. In addition, the lip 365 includes at least one aperture 367 configured to receive a fastener (not shown) for coupling the central partition 362 to the cargo shelf 332. More specifically, the central partition 362 is configured to couple to the lower surface 339 of the cargo shelf 332. In this way, at least a portion of the lip 365 forms a mounting flange for the central partition 362.

In addition, the body 363 of the central partition 362 includes at least one upper aperture 368 positioned along opposite sides of the body 363 and configured to receive a fastener (not shown) for coupling the side partitions 364 to the body 363. The body 363 further includes at least one lower aperture 369 positioned along opposite sides of the body 363 and configured to receive a fastener (not shown) for coupling a respective floor bracket 366 to the floor 17 of the vehicle 10. In the exemplary embodiment shown, the upper apertures 368 are positioned above the lower apertures 369 at each respective end of the body 363.

Figure 35:
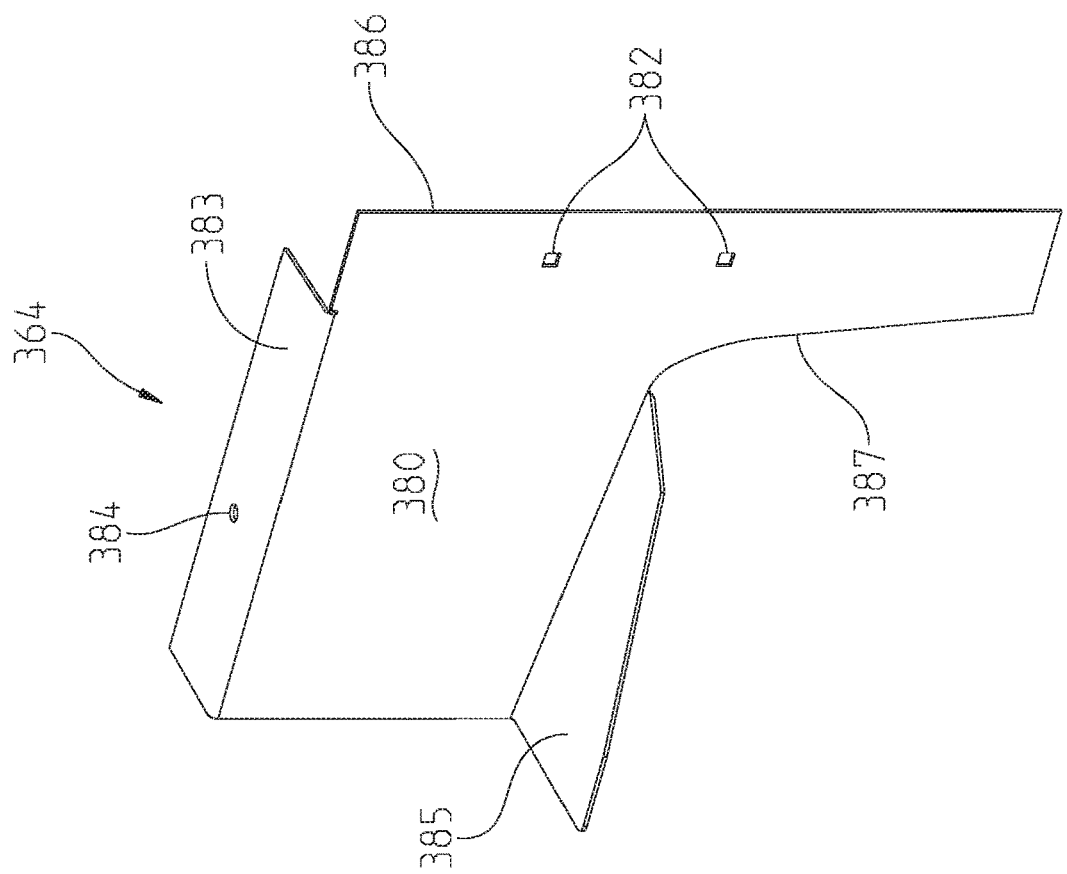
FIG. 35 is a front perspective view of a second side partition of the cargo storage system of FIG. 33.
Figure 34:
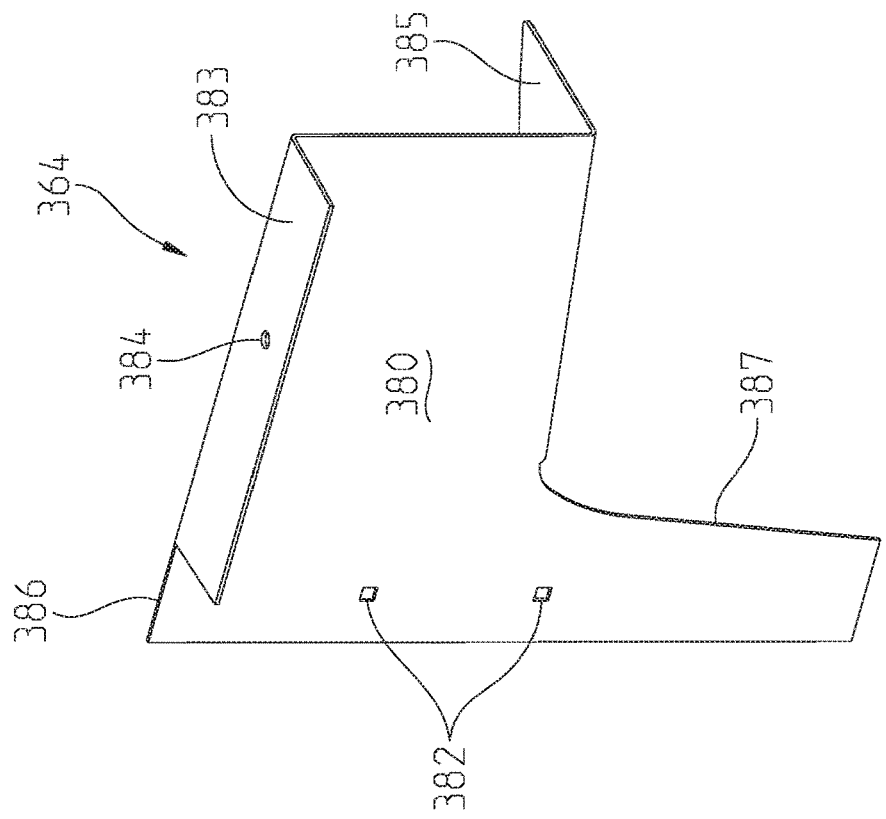
FIG. 34 is a rear perspective view of a first side partition of the cargo storage system of FIG. 33.

Turning now to FIGS. 34 and 35, the side partitions 364 each comprise a generally planar body 380. The body 380 illustratively includes at least one aperture 382 configured to receive a fastener (not shown) for coupling the respective side partition 364 to the body 363 of central partition 362. In the exemplary embodiment shown, the at least one aperture 382 is illustratively square in order to receive, for example, the square shank portion of a carriage bolt. The at least one aperture 382 is configured to cooperate with the respective at least one upper aperture 368 of central partition 362. The body 380 includes a perimeter 386 having a contoured portion 387 generally conforming to a contoured interior surface of the rear storage area 12 of the vehicle 10 (see FIG. 39). An advantage, among others, of the contoured portion 387 is that the side partitions 364 may closely track the interior surface of the rear storage area 12 thereby providing a secured lower storage compartment 29. Another advantage, of the contoured portion 387 is that gaps between the side partitions 364 and the interior surface of the rear storage area 12.

Extending rearwardly and perpendicularly from the body 380 is an upper mounting flange 383. The mounting flange 383 includes at least one aperture 384 configured to receive a fastener 395 (see FIG. 38) for coupling the respective one of the side partitions 364 to the lower surface 339 of the cargo shelf 332. Positioned below mounting flange 383 and extending forward and perpendicularly from the body 383 is a deflector 385. In the exemplary embodiment shown, the deflector 385 is illustratively sized and shaped to a gap formed by a storage well or cupholder in the vehicle 10. It is contemplated, however, that the deflector 385 may not be needed depending on the application of the cargo storage system 330.

Turning now to FIG. 37, the illustrative floor bracket 366 is shown in more detail. The floor bracket 366 illustratively includes a horizontal lower leg 390 and a vertical upper leg 392 coupled to the lower leg 390. In the exemplary embodiment shown, the upper leg 392 is oriented generally perpendicularly to the lower leg 390. The lower leg 390 includes at least one aperture 391 configured to receive a fastener 394 (see FIG. 33) for coupling the floor bracket 366 to a floor 17 of rear storage area 12 of the vehicle 10. As shown in FIG. 33, a spacer 318 may be placed between the floor 17 of the vehicle 10 and the lower leg 390 of each of the floor brackets 366 during installation of the partition 360.

The upper leg 392 illustratively includes at least one aperture 393 configured to receive a fastener (not shown) for coupling the central partition 362 to the floor bracket 366. In the exemplary embodiment shown, the at least one aperture 393 may be sized and shaped to permit adjustment of the floor bracket 336 relative to the central partition 362. Illustratively, the at least one aperture 393 is oblong (e.g., an elongated slot). An advantage, among others, of permitting adjustment of the floor bracket 366 relative to the central partition 362 is that it facilitates a more efficient installation.

Similar to the other embodiments discussed herein, the cargo storage system 330 may further include a mat (not shown) positioned adjacent to and supported by the by the upper surface 338 of the cargo shelf 332. The mat may illustratively include an exterior boundary defined by an outer edge of the mat. The exterior boundary may at least partially mirror the contoured perimeter 333 of the cargo shelf 332. In an exemplary embodiment, the exterior boundary is proximate the contoured perimeter 333. In addition, the mat may removably couple to the cargo shelf 332 using at least one fastener. For example, the mat may include at least one hole configured to receive a fastener for securing the mat to the cargo shelf 332. In an exemplary embodiment, the cargo shelf 332 may comprise a first material and the mat may comprise a second material softer than the first material. More specifically, the mat may comprise a heavy-duty elastomer.

The design of the illustrative embodiment of FIGS. 33-39 permits a user to easily and efficiently install the cargo storage system 330. The cargo storage system 330 is installed in a manner similar to the cargo storage system 30, as illustrated in FIGS. 11-14. Because the cargo storage system 330 is generally intended to be installed in a vehicle 10 without existing cargo barrier 40 and does not comprise a front cross bracket, a user illustratively couples the central partition 362 to the floor 17 of the vehicle 10 using the floor brackets 366 and couples the side partitions 364 to the central partition 362 prior to installing the cargo shelf 332. The cargo shelf 332 is then coupled to the upright support brackets 334, the rear cross bracket 336, and the partition 360.

More specifically, the user illustratively installs one of the floor brackets 366 on the passenger side 23 of the vehicle 10 in the rear storage area 12 proximate the rear seating area 18. The user illustratively installs the one of the floor brackets 366 to an existing mounting point within the floor 17 using the fastener 394. If the application requires it, the spacer 318 may be placed between the lower leg 390 of the floor bracket 366 and the floor 17. Once the using has installed the one of the floor brackets 366, the user repeats the installation process for the remaining one of the floor brackets 366 on the driver side 22 of the vehicle 10.

The user illustratively installs one of the plurality of upright support brackets 334 on the passenger side 23 of the vehicle 10 in the rear storage area 12. A user installs the long leg 347 of one of the plurality of upright support brackets 334 to an existing mounting point within the vehicle 10 using one of the rear mounting brackets 310. Once the user has installed the one of the upright brackets 334, the user repeats the installation process for the remaining one of the upright support brackets 334 on the driver side 22 of the vehicle 10.

The user installs the short leg 352 of the at least one shelf support bracket 350 in place of a rear cargo hook (not shown). In the illustrative embodiment of FIG. 33, the cargo storage system 330 comprises at least two rear shelf support brackets 350. The user illustratively installs the shelf support brackets 350 using a self-drilling fastener. The user places the rear cross bracket 336 into place over the long leg 351 of the shelf support brackets 350. Once the rear cross bracket 336 is aligned with the long leg 351 of the shelf support brackets 350, the user places the driver side cargo panel 342 over the rear cross bracket 336, the lip 365, and the upright support brackets 334 on the driver side 22 of the vehicle 10. The user illustratively couples the driver side cargo panel 342 to the rear cross bracket 336, the lip 365, and the upright support brackets 334 using threaded fasteners. Once the driver side cargo panel 342 is installed, the user repeats the process for the passenger side 23 of the vehicle 10 using the passenger side cargo panel 343. The user then removably couples the driver side cargo panel 342 and the passenger side cargo panel 343 along the lateral seam 337 of the cargo shelf 332 using threaded fasteners.

While the installation instructions have recited installing either a passenger side or a driver side component prior to installing the other side, this order has been provided for illustrative purposes only. Thus, the recitation of installing a driver side component before a passenger side component does not limit the installation to that order unless necessary. Therefore, the user may be able to install a passenger side component prior to installing the driver side component.

In the illustrated embodiments, various combinations of cargo storage systems including a plurality of upright support brackets coupled to the cargo shelf have been disclosed. Although the illustrative embodiments show a plurality of upright support brackets including two, four, and six upright support brackets, it is contemplated that more than two but less than four, more than four and less than six, and more than six upright support brackets may be coupled to the cargo shelf.

Additionally, the plurality of upright support brackets may be tailored to mount within different vehicle 10 types and models. For example, in the embodiment shown in FIG. 15, the cargo storage system 130 comprises four upright support brackets 134, 170. There, two of the upright support brackets 134, 170 are coupled to each of the driver side 22 and the passenger side 23 of the vehicle 10. Conversely in the illustrative embodiment shown in FIG. 24, the cargo storage system 230 comprises six upright support brackets 234, 270, 290. Three of the upright support brackets 234, 270, 290 are coupled to each of the driver side 22 and the passenger side 23 of the vehicle 10. Overall, the number, length, shape, or orientation of the upright support brackets may be tailored to fit the rear storage area of a variety of vehicles. Further, while various components discuss herein, including the upright support brackets, shelf support brackets, floor brackets, rear mounting brackets, and rear barrier mount brackets, have been described as coupling to existing mounting points within the vehicle 10, it is contemplated that the existing mounting points may be substituted with user-fabricated mounting points, such as, for example, drilled apertures or welded mounting points.

Additionally, the various cargo storage systems detailed above may be used independently of or in combination with cargo barriers or partitions (e.g., cargo partitions, seats, etc.) previously installed within the vehicle. For example, different embodiment cargo storage systems may attach to a pre-existing cargo barrier, may stand free of a pre-existing cargo barrier, or may stand free of a pre-existing cargo barrier but include a movable shelf extender to close potential gaps between the cargo shelf and the cargo barrier.

Moreover, while the invention has been described in detailed with reference to certain illustrative embodiments, variations of modifications exist within the spirit and scope of the invention as described and defined in the following claims.

The invention claimed is:

1. A cargo storage system for a vehicle including a rear storage area, comprising:
   a cargo shelf comprising an upper surface, a lower surface opposite the upper surface, and a perimeter having a contoured shape, the perimeter including at least one relief configured to receive at least a portion of a cargo securing member;
   a plurality of upright support brackets removably coupled to and extending outwardly from the cargo shelf, at least one end of the plurality of upright support brackets configured to removably couple to the vehicle; and
   a rear cross bracket removably coupled to a rear portion of the lower surface of the cargo shelf.

2. The cargo storage system of claim 1, wherein the cargo shelf further includes a first panel and a second panel removably coupled to the first panel along a lateral seam of the cargo shelf.

3. The cargo storage system of claim 2, wherein the first and second panel are asymmetrical about the lateral seam.

4. The cargo storage system of claim 1, wherein the perimeter of the cargo shelf is configured to at least partially track a contoured interior of the rear storage area.

5. The cargo storage system of claim 1, wherein a lateral cross-section of the rear cross bracket comprises a substantially T-shaped configuration.

6. The cargo storage system of claim 5, wherein the substantially T-shaped configuration of the lateral cross-section of the rear cross bracket comprises a stem coupled orthogonally to a cap, the cap extending beyond the upper and lower surfaces of the cargo shelf.

7. The cargo storage system of claim 1, further comprising a front cross bracket removably coupled to a front portion of the lower surface of the cargo shelf.

8. The cargo storage system of claim 7, wherein a lateral cross section of the front cross bracket comprises a substantially L-shaped configuration.

9. The cargo storage system of claim 1, further comprising a partition removably coupled to the cargo shelf, the plurality of upright support brackets positioned intermediate the rear cross bracket and the partition.

10. The cargo storage system of claim 9, wherein the partition includes a central partition and at least one side partition coupled to the central partition, the central partition removably coupled to the lower surface of the cargo shelf.

11. The cargo storage system of claim 1, further comprising a mat positioned adjacent an upper surface of the cargo shelf.

12. The cargo storage system of claim 11, wherein the cargo shelf comprises a first material and the mat comprises a second material, the second material softer than the first material.

13. The cargo storage system of claim 11, wherein the mat is removably coupled to the cargo shelf.

14. A cargo storage system for a vehicle including a rear storage area, comprising:
   a cargo shelf comprising an upper surface, a lower surface opposite the upper surface, and a perimeter;
   a plurality of upright support brackets removably coupled to the lower surface of the cargo shelf; and
   a shelf extender coupled to a front portion of the cargo shelf, the shelf extender configured to be movable from a retracted position to an extended position relative to the cargo shelf; and
   wherein the shelf extender includes a lower shelf configured to removably couple to the front portion of the lower surface of the cargo shelf and a rib coupled to at least a portion of a leading edge of the lower shelf.

15. The cargo storage system of claim 14, wherein the shelf extender removably couples to the cargo shelf intermediate the lower surface of the cargo shelf and at least one of the plurality of upright support brackets.

16. The cargo storage system of claim 14, wherein the plurality of upright support brackets includes at least four upright support brackets.

17. The cargo storage system of claim 14, wherein the cargo shelf further comprises a first panel and a second panel removably coupled to the first panel along a lateral seam of the cargo shelf, the shelf extender removably coupled to a least one of the first and second panel.

18. The cargo storage system of claim 14, wherein the rib extends from the portion of the leading edge of the lower shelf in a generally upright orientation.

19. A cargo storage system for a vehicle including a rear seating area adjacent a rear storage area, comprising:
   a cargo barrier positioned intermediate the rear seating area and the rear storage area, the cargo barrier configured to at least partially physically separate at least a portion of the rear seating area and the rear storage area, a first surface of the cargo barrier facing the rear seating area, a second surface of the cargo barrier facing the rear storage area;
   a cargo shelf removably coupled to the second surface of the cargo barrier, the cargo shelf comprising an upper surface and a lower surface opposite the upper surface;
   a plurality of upright support brackets removably coupled to a lower surface of the cargo shelf; and
   a rear cross bracket coupled to a rear portion of the cargo shelf.

20. The cargo storage system of claim 19, wherein the plurality of upright support brackets includes at least two upright support brackets.

21. The cargo storage system of claim 20, wherein the plurality of upright support brackets comprises six upright support brackets symmetrically distributed about a first and second end of the cargo shelf, the second end opposite the first.

22. The cargo storage system of claim 19, wherein the cargo shelf comprises a first panel and a second panel removably coupled to the first panel along a lateral seam of the cargo shelf.

23. The cargo storage system of claim 19, wherein a front portion of the cargo shelf includes a relief shaped to receive at least one support bracket coupled to the cargo barrier.

24. The cargo storage system of claim 23, further comprising a front cross bracket removably coupled to the lower surface of the cargo shelf adjacent a front edge of the cargo shelf.

25. A cargo storage system for a vehicle including a passenger side, a driver side, and a rear storage area, comprising:
- a driver side cargo panel positioned along the driver side of the vehicle and having a strengthening rib which extends along a lateral side of the driver side cargo panel;
- a passenger side cargo panel positioned along the passenger side of the vehicle and having a strengthening rib which extends along a lateral side of the passenger side cargo panel, adjacent the strengthening rib of the driver side cargo panel;
- wherein the driver side cargo panel strengthening rib, and the passenger side cargo panel strengthening rib form a coupling surface; and
- wherein the driver side cargo panel and the passenger side cargo panel are coupled together at the coupling surface to form a cargo shelf.

26. The cargo storage system of claim 25, wherein the strengthening ribs each include at least one aperture configured to receive a fastener.

27. The cargo storage system of claim 25, wherein the coupling surface forms a lateral seam along an upper surface of the cargo shelf.

28. The cargo storage system of claim 25, wherein the driver side cargo panel is further comprised of at least two panels.

29. The cargo storage system of claim 28, wherein the passenger side cargo panel is further comprised of at least two panels.

* * * * *